US012745019B2

(12) United States Patent
Yonemochi et al.

(10) Patent No.: US 12,745,019 B2
(45) Date of Patent: Sep. 22, 2026

(54) IMAGING ELEMENT AND IMAGING DEVICE

(71) Applicant: NIKON CORPORATION, Tokyo (JP)

(72) Inventors: Hajime Yonemochi, Tokyo (JP); Tomoki Hirata, Tokyo (JP); Shutaro Kato, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 106 days.

(21) Appl. No.: 18/685,633

(22) PCT Filed: Aug. 25, 2022

(86) PCT No.: PCT/JP2022/032036
§ 371 (c)(1),
(2) Date: May 21, 2024

(87) PCT Pub. No.: WO2023/027143
PCT Pub. Date: Mar. 2, 2023

(65) Prior Publication Data

US 2024/0381005 A1 Nov. 14, 2024

(30) Foreign Application Priority Data

Aug. 25, 2021 (JP) ................................ 2021-137343

(51) Int. Cl.
*H04N 25/78* (2023.01)
*H04N 25/535* (2023.01)
(Continued)

(52) U.S. Cl.
CPC ........... *H04N 25/78* (2023.01); *H04N 25/535* (2023.01); *H04N 25/766* (2023.01); *H04N 25/773* (2023.01); *H04N 25/79* (2023.01)

(58) Field of Classification Search
CPC ...... H04N 25/78; H04N 25/79; H04N 25/773; H04N 25/533; H04N 25/535;
(Continued)

(56) References Cited

U.S. PATENT DOCUMENTS 10,412,327 B2 9/2019 Takahashi
10,645,313 B2 5/2020 Takahashi
(Continued)

FOREIGN PATENT DOCUMENTS

EP 2833620 B1 * 1/2019 ............. H04N 25/79
JP 2014-075767 A 4/2014
(Continued)

OTHER PUBLICATIONS

Jun. 12, 2025 extended Search Report issued in European Patent Application No. 22861431.9.
(Continued)

*Primary Examiner* — Lin Ye
*Assistant Examiner* — Steven Daniel Barry
(74) *Attorney, Agent, or Firm* — Oliff PLC

(57) ABSTRACT

An imaging element includes a first semiconductor substrate having a pixel unit having disposed therein a plurality of pixels that each include a photoelectric conversion unit configured to convert light to an electric charge, and to output signals based on the electric charge converted by the photoelectric conversion unit and a second semiconductor substrate having an exposure processing unit configured to use the signals read from the pixels to calculate an accumulation time for accumulating the electric charge yielded by the conversion performed by the photoelectric conversion units.

21 Claims, 66 Drawing Sheets

(51) Int. Cl.
*H04N 25/766* (2023.01)
*H04N 25/773* (2023.01)
*H04N 25/79* (2023.01)

(58) Field of Classification Search
CPC ..... H04N 25/766; H10F 39/199; H10F 39/12; H10F 39/809; H10F 39/811
See application file for complete search history.

(56) References Cited

U.S. PATENT DOCUMENTS

| | | | | |
|---|---|---|---|---|
| 10,855,940 | B2 | 12/2020 | Matsumoto et al. | |
| 11,503,231 | B2 | 11/2022 | Matsumoto et al. | |
| 2017/0244913 | A1 | 8/2017 | Kobayashi | |
| 2018/0124335 | A1 | 5/2018 | Machida et al. | |
| 2018/0227514 | A1 | 8/2018 | Takahashi | |
| 2019/0103427 | A1 | 4/2019 | Matsumoto et al. | |
| 2019/0373188 | A1 | 12/2019 | Takahashi | |
| 2020/0099880 | A1* | 3/2020 | Kobayashi | H04N 25/533 |
| 2021/0051282 | A1 | 2/2021 | Matsumoto et al. | |

FOREIGN PATENT DOCUMENTS

| | | | | |
|---|---|---|---|---|
| JP | 2016171455 A | * | 9/2016 | H04N 25/535 |
| JP | 6485675 B1 | * | 3/2019 | G01S 17/894 |
| JP | 2019-068405 A | | 4/2019 | |
| JP | 2021-027488 A | | 2/2021 | |
| WO | 2017/018188 | | 2/2017 | |
| WO | 2017/169216 A1 | | 10/2017 | |

OTHER PUBLICATIONS

May 7, 2025 Office Action issued in Japanese Patent Application No. 2023-543976.

Oct. 25, 2022 International Search Report issued in International Patent Application No. PCT/JP2022/032036.

* cited by examiner

Figure 9:
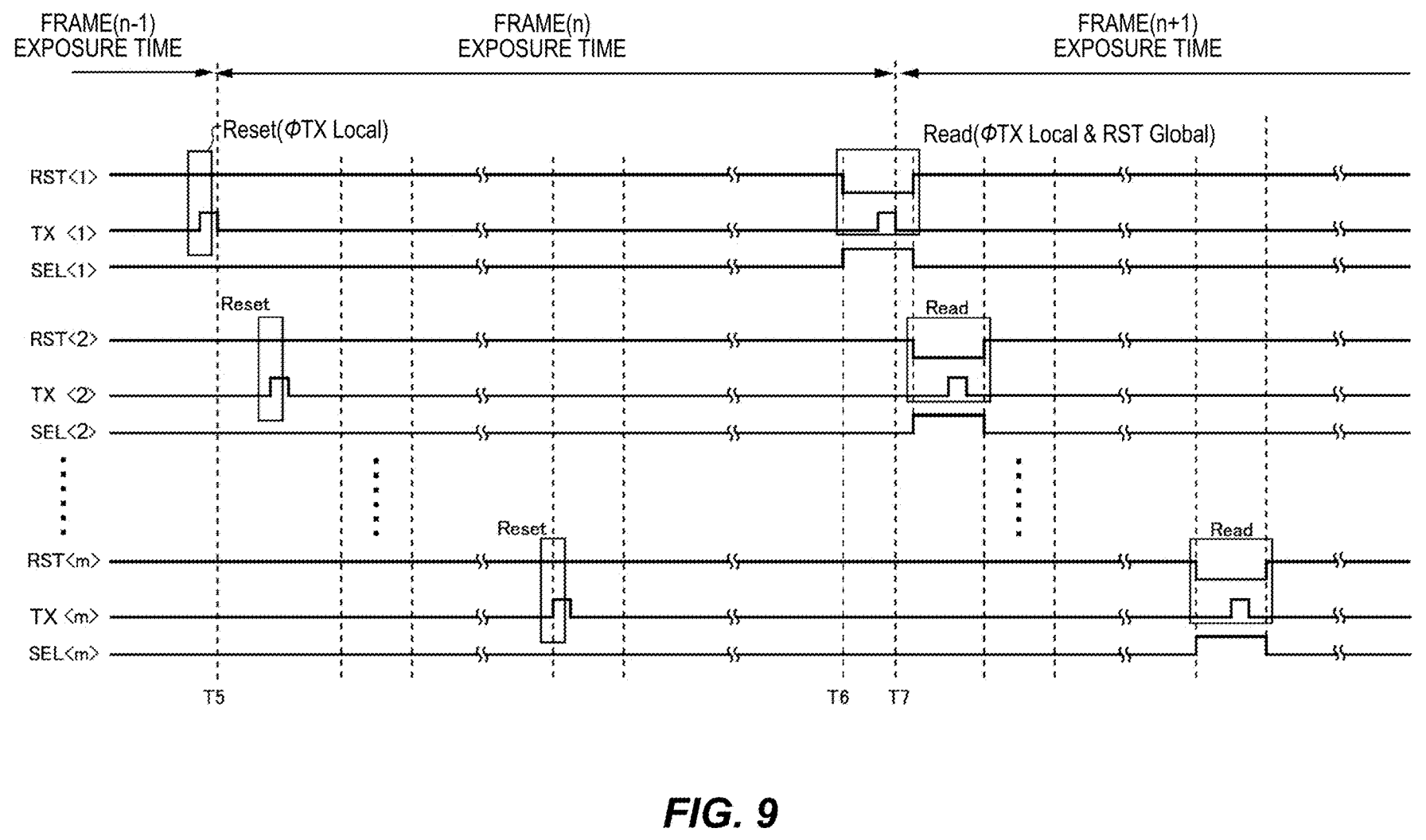

FRAME(n-1) EXPOSURE TIME

FRAME(n) EXPOSURE TIME

FRAME(n+1) EXPOSURE TIME

Reset(ΦTX Local)

Read(ΦTX Local & RST Global)

Reset

Read

RST⟨1⟩

TX ⟨1⟩

SEL⟨1⟩

RST⟨2⟩

TX ⟨2⟩

SEL⟨2⟩

RST⟨m⟩

TX ⟨m⟩

SEL⟨m⟩

COUNTER LATCH

| ADC COUNTER LATCH [13:0] | | | | | | | | | | | | |
|---|---|---|---|---|---|---|---|---|---|---|---|---|
| 12 | 11 | 10 | 9 | 8 | 7 | 6 | 5 | 4 | 3 | 2 | 1 | 0 |
| 0 | 0 | 0 | 0 | x | x | x | x | x | x | x | x | x |
| 0 | 0 | 0 | 1 | x | x | x | x | x | x | x | x | x |
| 0 | 0 | 1 | 0 | x | x | x | x | x | x | x | x | x |
| 0 | 0 | 1 | 1 | x | x | x | x | x | x | x | x | x |
| 0 | 1 | 0 | 0 | x | x | x | x | x | x | x | x | x |
| 0 | 1 | 0 | 1 | x | x | x | x | x | x | x | x | x |
| 0 | 1 | 1 | 0 | x | x | x | x | x | x | x | x | x |
| 0 | 1 | 1 | 1 | x | x | x | x | x | x | x | x | x |
| 1 | x | x | x | x | x | x | x | x | x | x | x | x |

*FIG. 42*

| ADC COUNTER LATCH[13:0] | | | | | | | | | | | | |
|---|---|---|---|---|---|---|---|---|---|---|---|---|
| 12 | 11 | 10 | 9 | 8 | 7 | 6 | 5 | 4 | 3 | 2 | 1 | 0 |
| 0 | 0 | 0 | x | x | x | x | x | x | x | x | x | x |
| 0 | 0 | 0 | x | x | x | x | x | x | x | x | x | x |
| 0 | 0 | 0 | x | x | x | x | x | x | x | x | x | x |
| 0 | 0 | 0 | x | x | x | x | x | x | x | x | x | x |
| 0 | 0 | 0 | x | x | x | x | x | x | x | x | x | x |
| 0 | 0 | 0 | x | x | x | x | x | x | x | x | x | x |
| 0 | 0 | 1 | x | x | x | x | x | x | x | x | x | x |
| 0 | 1 | x | x | x | x | x | x | x | x | x | x | x |
| 1 | x | x | x | x | x | x | x | x | x | x | x | x |

*FIG. 44*

| Gb | B | Gb | B | Gb | B | Gb | B |
|---|---|---|---|---|---|---|---|
| R | **W** | R | Gr | R | **W** | R | Gr |
| Gb | B | Gb | B | Gb | B | Gb | B |
| R | Gr | R | Gr | R | Gr | R | Gr |
| Gb | B | Gb | B | Gb | B | Gb | B |
| R | W | R | Gr | R | W | R | Gr |
| Gb | B | Gb | B | Gb | B | Gb | B |
| R | Gr | R | Gr | R | Gr | R | Gr |

IMAGING ELEMENT AND IMAGING DEVICE

CLAIM OF PRIORITY

The present application claims priority from Japanese patent application No. 2021-137343 filed on Aug. 25, 2021, the content of which is hereby incorporated by reference into this application.

TECHNICAL FIELD

The present invention relates to an imaging element and an imaging apparatus.

BACKGROUND ART

Solid state imaging devices that including a plurality of pixel cells are well-known (e.g., Patent Document 1). Increased dynamic range has been a goal for such devices.

RELATED ART DOCUMENTS

Patent Documents

Patent Document 1: JP 2014-75767 A

SUMMARY

A first disclosure of an imaging element includes a first semiconductor substrate having a pixel unit having disposed therein a plurality of pixels that each include a photoelectric conversion unit configured to convert light to an electric charge, and to output signals based on the electric charge converted by the photoelectric conversion unit; and a second semiconductor substrate having an exposure processing unit configured to use the signals read from the pixels to calculate an accumulation time for accumulating the electric charge yielded by the conversion performed by the photoelectric conversion units.

A second disclosure of an imaging device includes the first disclosure of an imaging element.

BRIEF DESCRIPTION OF THE DRAWINGS

FIG. 9 is a timing chart showing an imaging operation example 2 of the imaging element.

FIG. 42 is a descriptive view showing an example of a counter latch in the speed increase example 1 for autonomous exposure control in the control block.

FIG. 44 is a descriptive view showing an example of a counter latch in the speed increase example 2 for autonomous exposure control in the control block 400A.

FIG. 55 is a descriptive diagram showing an example of the pixel block in the color offset reduction example 2.

DETAILED DESCRIPTION OF EMBODIMENTS

The present invention will be described below with embodiments of the invention, but the embodiments below do not limit the invention according to the claims. Also, not all combinations of characteristics described in the embodiments are necessarily required as a solution provided by the invention.

In this specification, the X axis and the Y axis are perpendicular to each other, and the Z axis is perpendicular to the XY plane. The X, Y, and Z axes constitute a right hand system. The direction parallel to the Z axis is sometimes referred to as the lamination direction of an imaging element 100. In this specification, terms such as "up" or "down" are not limited to being in reference to the direction of gravitational force. Such terms merely indicate the direction relative to the Z axis direction. In this specification, arrays in the X axis direction are referred to as "rows" and arrays in the Y axis direction are referred to as "columns" but the row and column directions are not limited thereto.

<Configuration of Imaging Element>

First, a configuration of the imaging element will be described with reference to FIGS. 1 to 22. The imaging element may be of a back-illuminated type or a front-illuminated type.

Figure 1:
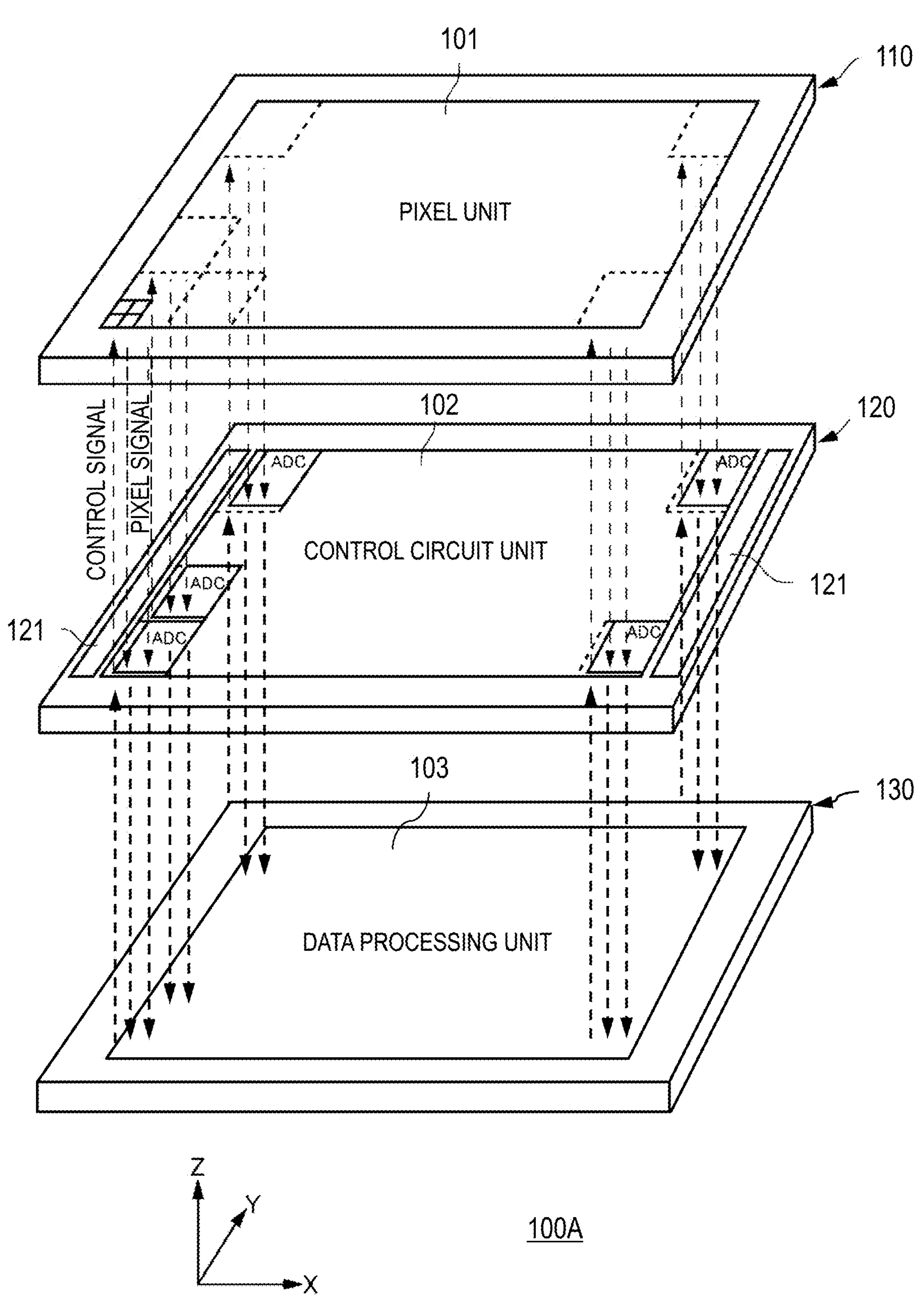
FIG. 1 is an exploded perspective view showing an example of an imaging element.

FIG. 1 is an exploded perspective view showing an example of an imaging element 100A. The imaging element 100A captures subjects. The imaging element 100A generates image data of the captured subject. The imaging element 100A includes a first semiconductor substrate 110, a second semiconductor substrate 120, and a third semiconductor substrate 130. As shown in FIG. 1, the first semiconductor substrate 110 is stacked on the second semiconductor substrate 120, and the second semiconductor substrate 120 is stacked on the third semiconductor substrate 130.

The first semiconductor substrate 110 has a pixel unit 101. The pixel unit 101 outputs pixel signals based on incident light.

The second semiconductor substrate 120 has a control circuit unit 102 and peripheral circuit units 121.

The control circuit unit 102 receives input of the pixel signals outputted from the first semiconductor substrate 110. The control circuit unit 102 processes the inputted pixel signals. The control circuit unit 102 is disposed at a position in the second semiconductor substrate 120 opposing the pixel unit 101. The control circuit unit 102 is disposed so as to overlap the pixel unit 101 in the direction in which the first semiconductor substrate 110 and the second semiconductor substrate 120 are stacked, for example. The control circuit unit 102 may output, to the pixel unit 101, a control signal for controlling the driving of the pixel unit 101.

The peripheral circuit units 121 control the driving of the control circuit unit 102. The peripheral circuit units 121 are disposed on the second semiconductor substrate 120 at positions in the periphery of the control circuit unit 102. Specifically, the peripheral circuit units 121 are disposed on the second semiconductor substrate 120 at regions arranged outside of the region where the control circuit unit 102 is disposed. Also, the peripheral circuit units 121 may be electrically connected to the first semiconductor substrate 110 and control the driving of the pixel unit 101. The peripheral circuit units 121 are disposed along two sides of the second semiconductor substrate 120, but the method for arranging the peripheral circuit units 121 is not limited to this example.

The third semiconductor substrate 130 has a data processing unit 103. The data processing unit 103 uses digital data outputted from the second semiconductor substrate 120 to perform addition, thinning, and other types of image processing.

Figure 2:
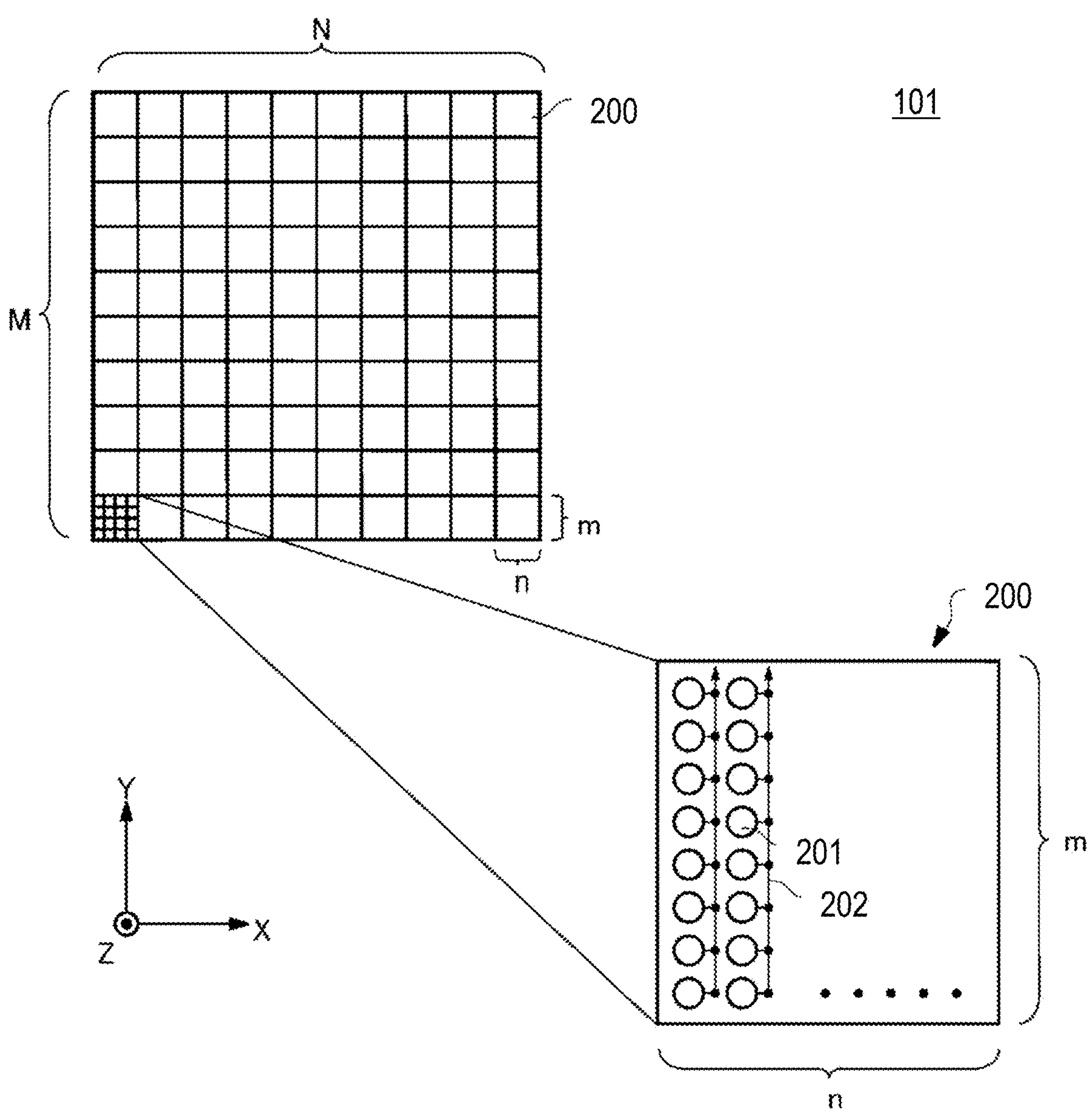
FIG. 2 is a descriptive view showing an example of a specific configuration of the pixel unit.

FIG. 2 is a descriptive view showing an example of a specific configuration of the pixel unit 101. The pixel unit 101 has a plurality of pixel blocks 200. The plurality of pixel blocks 200 are arranged in the row direction and the column direction of the pixel unit 101. Specifically, the plurality of pixel blocks 200 include M×N pixel blocks 200 (M and N being natural numbers) that are arranged in the row direction and the column direction of the pixel unit 101. In the example illustrated, M and N are equal, but M and N may differ from each other.

The pixel blocks 200 each have a plurality of pixels 201. The plurality of pixels 201 are arranged in the row direction and the column direction of the pixel block 200. The pixel blocks 200 include m×n pixels 201 (m and n being natural numbers) that are arranged in the row direction and the column direction. The pixel blocks 200 each include 16×16 pixels 201 that are arranged in the row direction and the column direction, for example. The number of pixels 201 per pixel block 200 is not limited thereto. In the example illustrated, m and n are equal, but m and n may differ from each other.

The pixel blocks 200 have the plurality of pixels 201, which are connected to the same control line (e.g., transfer control line 311, discharge control line 312 to be described later) in the row direction. The pixels 201 of the pixel blocks 200 are connected to the same control line so as to have set thereto the same exposure time. Specifically, for example, n pixels 201 arranged in the row direction are connected to the same control line.

Meanwhile, among different pixel blocks 200, one pixel block 200 may be set to a different exposure time than another pixel block 200. If, for example, one pixel block 200 and another pixel block 200 are arranged in the row direction, then the plurality of pixels 201 of the one pixel block 200 are connected to different control lines than the plurality of pixels 201 of the other pixel block 200. The plurality of pixels 201 in the mth row of the one pixel block 200 are all connected to a different control line than the control line to which the plurality of pixels 201 in the mth row of the other pixel block 200 are connected. Also, if one pixel block 200 and another pixel block 200 are arranged in the column direction, then the plurality of pixels 201 of the one pixel block 200 are connected to different control lines than the plurality of pixels 201 of the other pixel block 200. The plurality of pixels 201 in the mth row of the one pixel block 200 are all connected to a different control line than the control line to which the plurality of pixels 201 in the mth row of the other pixel block 200 are connected.

Also, if one pixel block 200 and another pixel block 200 are arranged in the row direction, for example, then the plurality of pixels 201 of the one pixel block 200 are connected to different signal lines 202 than the plurality of pixels 201 of the other pixel block 200. The plurality of pixels 201 in the nth column of the one pixel block 200 are all connected to a different signal line 202 than the signal line 202 to which the plurality of pixels 201 in the nth column of the other pixel block 200 are connected. Also, if one pixel block 200 and another pixel block 200 are arranged in the column direction, then the plurality of pixels 201 of the one pixel block 200 are connected to different signal lines 202 than the plurality of pixels 201 of the other pixel block 200. The plurality of pixels 201 in the nth column of the one pixel block 200 are all connected to a different signal line 202 than the signal line 202 to which the plurality of pixels 201 in the nth column of the other pixel block 200 are connected.

The pixel blocks 200 are disposed so as to correspond to control blocks 400A or 400B (see FIGS. 4 and 17) to be described later. That is, one pixel block 200 is arranged for each control block 400A or 400B.

Alternatively, a plurality of pixel blocks 200 may be arranged for each control block 400A or 400B. Even if a plurality of pixel blocks 200 are arranged for each control block 400A or 400B, different exposure times may be set for the respective pixel blocks 200. If two pixel blocks 200 arranged in the column direction are provided for each control block, then the control block 400A or 400B controls 2m×n pixels 201. Specifically, for example, the control block 400A or 400B controls 32×16 pixels 201. The number of pixels 201 per control block 400A or 400B is not limited thereto.

Figure 3:
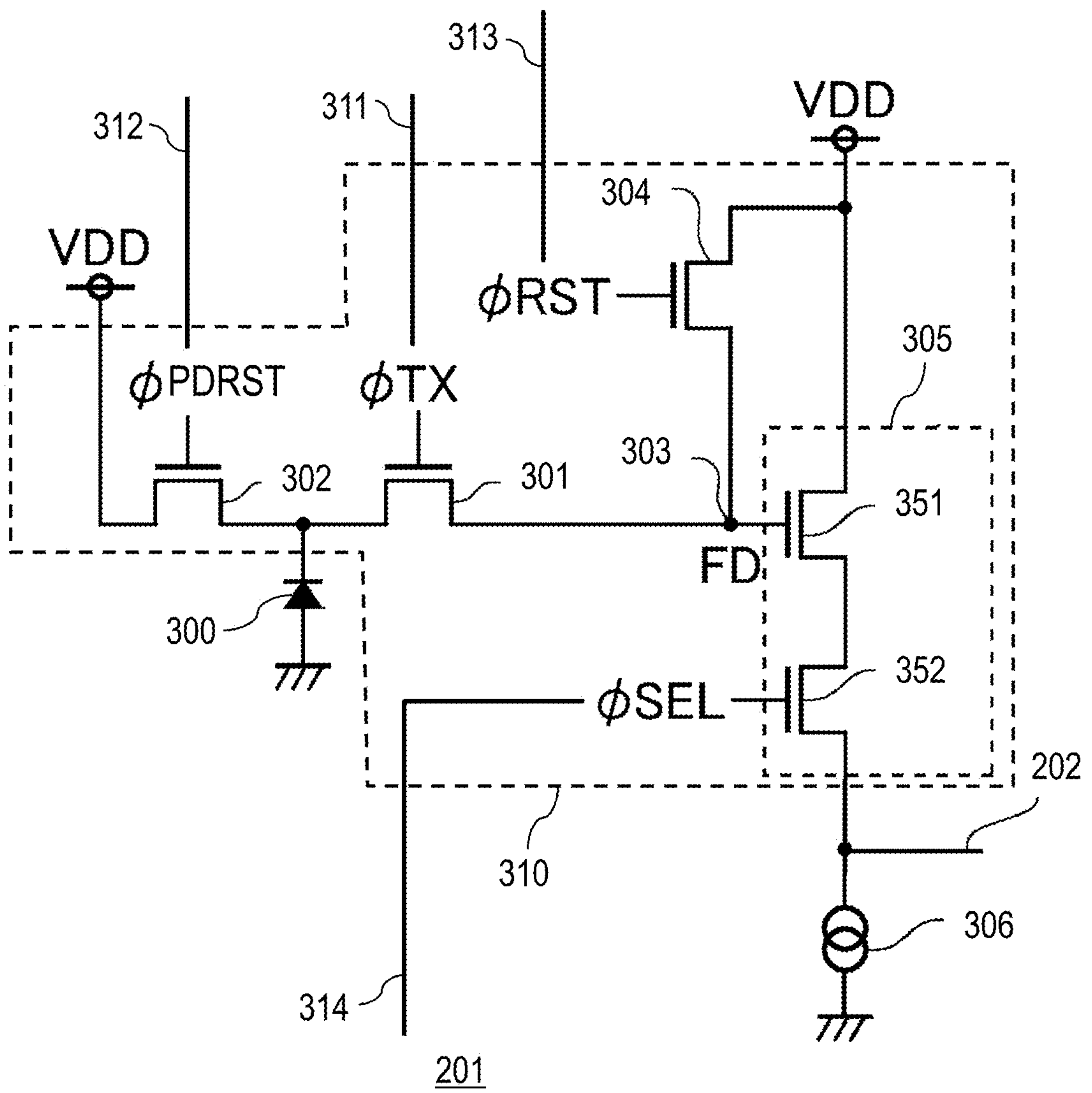
FIG. 3 is a circuit diagram showing an example of a circuit configuration of the pixel.

FIG. 3 is a circuit diagram showing an example of a circuit configuration of the pixel 201. The pixel 201 includes a photoelectric conversion unit 300 and a read unit 310. The read unit 310 has a transfer unit 301, a discharge unit 302, a floating diffusion (FD) 303, a reset unit 304, and a pixel output unit 305, and reads a pixel signal based on an electric charge yielded by conversion by the photoelectric conversion unit 300 to the signal line 202. The pixel output unit 305 has an amplification unit 351 and a selection unit 352. The transfer unit 301, the discharge unit 302, the FD 303, the reset unit 304, the amplification unit 351, and the selection unit 352 are collectively referred to as the read unit 310. The read unit 310 is described as an N-channel FET, but the transistor type is not limited thereto.

The photoelectric conversion unit 300 has a photoelectric conversion function for converting light to electric charge. The photoelectric conversion unit 300 accumulates an electric charge yielded by photoelectric conversion. The photoelectric conversion unit 300 is constituted of a photodiode, for example.

The transfer unit 301 transfers the electric charge of the photoelectric conversion unit 300 to the FD 303. The transfer unit 301 controls the electric connection between the photoelectric conversion unit 300 and the FD 303. The transfer unit 301 is constituted of a transistor, for example. The transfer unit 301 has at least a gate terminal, and may be an element constituting a portion of a transistor where a portion of the photoelectric conversion unit 300 serves as the source terminal and a portion of the FD 303 serves as the drain terminal. The gate terminal of the transfer unit 301 is connected to a transfer control line 311 for receiving input of a transfer control signal φTX. The transfer control line 311 will be described later.

The discharge unit 302 discharges the electric charge accumulated in the photoelectric conversion unit 300 to a power source line to which a power source voltage VDD is supplied. The discharge unit 302 controls the connection between the photoelectric conversion unit 300 and the power source line. The discharge unit 302 is constituted of a transistor, for example. The discharge unit 302 has at least a gate terminal, and may be an element constituting a portion of a transistor where a portion of the photoelectric conversion unit 300 serves as the source terminal and a portion of a diffusion region connected to the power source line serves as the drain terminal. The gate terminal of the discharge unit 302 is connected to a discharge control line 312 for receiving input of a discharge control signal φPDRST. The discharge unit 302 has been described as discharging the electric charge of the photoelectric conversion unit 300 to the power source line to which the power source voltage VDD is supplied, but may instead discharge the electric charge to a power source line to which a power source voltage differing from the power source voltage VDD is supplied.

The FD 303 is transferred from the transfer unit 301 to the photoelectric conversion unit 300. The FD 303 accumulates the electric charge transferred from the photoelectric conversion unit 300.

The reset unit 304 discharges the electric charge accumulated in the FD 303 to the power source line to which the power source voltage VDD is supplied. The reset unit 304 resets the potential of the FD 303 to the power source voltage VDD, which is the reference potential. The reset unit 304 controls the electric connection between FD 303 and the power source line. The reset unit 304 is constituted of a transistor, for example. The reset unit 304 has at least a gate terminal, and may be an element constituting a portion of a transistor where a portion of the FD 303 serves as the source terminal and a portion of a diffusion region connected to the power source line serves as the drain terminal. The gate terminal of the reset unit 304 is connected to a reset control line 313 for receiving input of a reset control signal φRST. The reset control line 313 will be described later.

The pixel output unit 305 outputs a pixel signal based on the potential of the FD 303 to the signal line 202. The pixel output unit 305 has an amplification unit 351 and a selection unit 352. The amplification unit 351 is constituted of a transistor. In the amplification unit 351, the gate terminal is connected to the FD 303, the drain terminal is connected to the power source line to which the power source voltage VDD is supplied, and the source terminal is connected to the drain terminal of the selection unit 352.

The selection unit 352 controls the electric connection between the pixel 201 and the signal line 202. When the selection unit 352 causes the pixel 201 to be connected to the signal line 202, the pixel signal is outputted from the pixel 201 to the signal line 202. The selection unit 352 is constituted of a transistor. The selection unit 352 has at least a gate terminal, and may be an element constituting a portion of a transistor where a portion of the amplification unit 351 serves as the source terminal and a portion of a diffusion region connected to the signal line 202 serves as the drain terminal. The gate terminal of the selection unit 352 is connected to a selection control line 314 for receiving input of a selection control signal φSEL and that spans a plurality of pixel blocks 200. The source terminal of the selection unit 352 is connected to a load current source 306.

The load current source 306 is connected to the signal line 202 and supplies a current for reading the pixel signal from the pixel 201. As a result, it is possible to stabilize the operation of the amplification unit 351. Also, the load current source 306 is connected to the signal line 202. The load current source 306 may be provided to the first semiconductor substrate 110 or to the second semiconductor substrate 120.

Also, the FD 303 may share the pixel output unit 305 with another pixel 201. The FD 303 and the pixel output unit 305 may be shared among a plurality of pixels 201 arranged in the row direction or the column direction, for example. Also, the pixel 201 may be constituted of a plurality of photoelectric conversion units 300 and the transfer unit 301.

Figure 4:
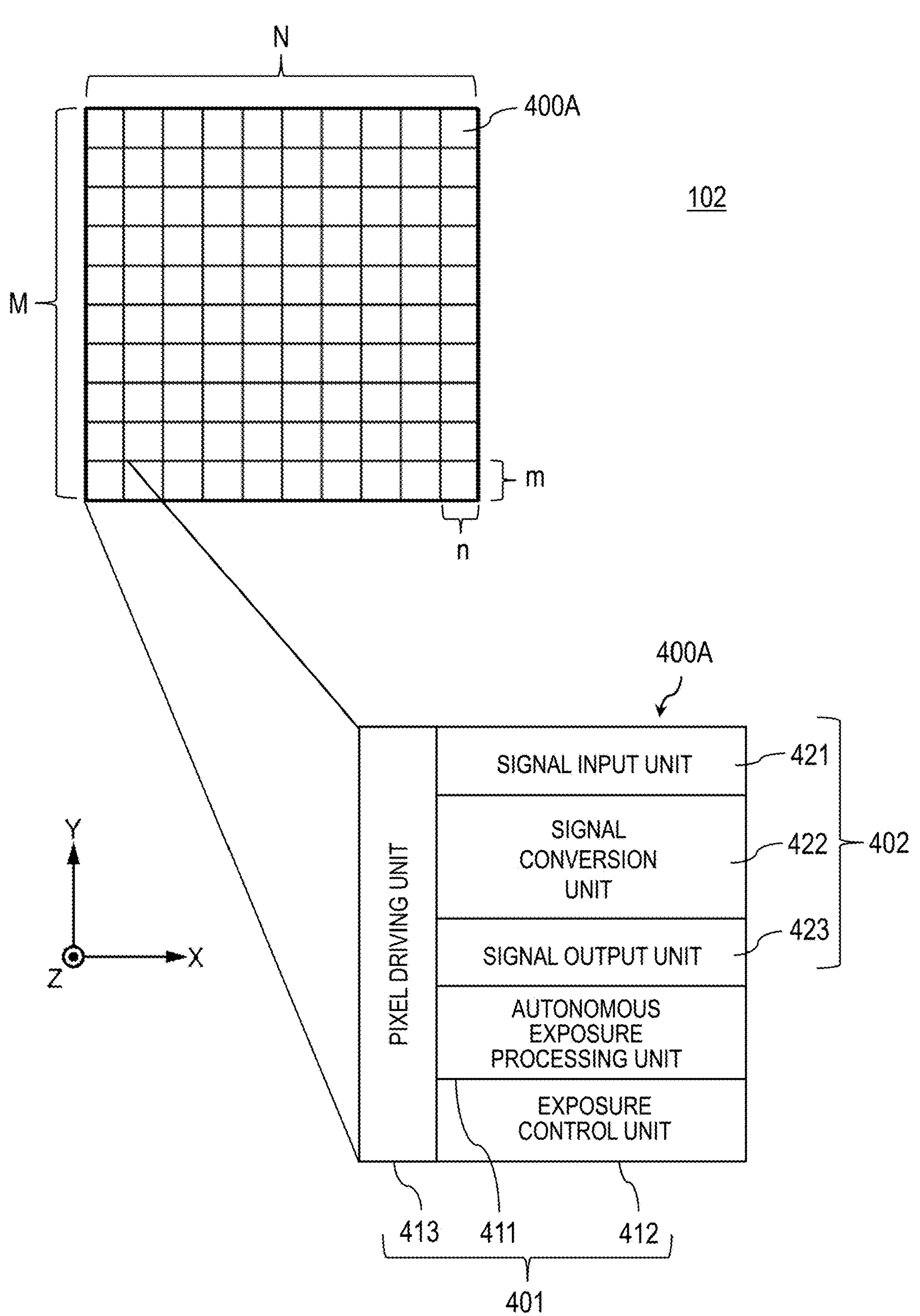
FIG. 4 is a descriptive view showing an example of a specific configuration of the control circuit unit.

FIG. 4 is a descriptive view showing an example of a specific configuration of the control circuit unit 102. The control circuit unit 102 has a plurality of control blocks 400A. The plurality of control blocks 400A are arranged in the row direction and the column direction of the control circuit unit 102. Specifically, the control circuit unit 102 has M×N control blocks 400A. If one pixel block 200 is arranged for each control block 400A, the control circuit unit 102 has the control block 400A directly below the pixel block 200. The one pixel block 200 and the one control block 400A are the same shape and size. Also, if a plurality of pixel blocks 200 aligned in the column direction are arranged for each control block 400A, the control circuit unit 102 has one control block 400A directly below the plurality of pixel blocks 200 arranged in the column direction.

The control block 400A is provided so as to correspond to the pixel block 200. As one example of the relationship between the control block and the pixel block, the control block 400A is disposed directly below the pixel block 200 in the direction in which the first semiconductor substrate 110 and the second semiconductor substrate 120 are stacked (lamination direction), for example. Also, the control block 400A is electrically connected to the pixel block 200 via the signal line 202, the transfer control line 311, and the discharge control line 312. Specifically, the control block 400A positioned directly below the pixel block 200 in the lamination direction is electrically connected to the pixel block 200 directly thereabove (hereinafter referred to as the corresponding pixel block 200) via local control lines such as the transfer control line 311 and the discharge control line 312. Also, the control block 400A receives input of the pixel signal outputted from the pixel 201 of the corresponding pixel block 200 via the signal line 202.

The control block 400A controls the driving of the corresponding pixel block 200. The control block 400A controls the exposure time of the pixel 201 included in the corresponding pixel block 200, for example. Also, the control block 400A has a signal processing unit 402 that processes the inputted signal and processes the pixel signal outputted from the pixel 201 included in the corresponding pixel block 200. The control block 400A converts the analog pixel signal outputted from the pixel 201 included in the corresponding pixel block 200 to a digital signal, for example.

The control block 400A has a pixel control unit 401 and the signal processing unit 402. The pixel control unit 401 has an autonomous exposure processing unit 411, an exposure control unit 412, and a pixel driving unit 413, and controls the pixels 201 of the pixel unit 101. The signal processing unit 402 has a signal input unit 421, a signal conversion unit 422, and a signal output unit 423, converts the analog pixel signals from the pixel unit 101 into digital signals, and transfers the resultant digital signals to the pixel control unit 401 and the data processing unit 103.

The autonomous exposure processing unit 411 is a circuit that calculates the exposure time of the pixels 201 included in the corresponding pixel block 200 on the basis of the pixel signals converted to digital signals by the signal processing unit 402. Details regarding the autonomous exposure processing unit 411 will be described later.

The exposure control unit 412 is a circuit that controls the exposure of the pixels 201 included in the corresponding pixel block 200 on the basis of the exposure time calculated by the autonomous exposure processing unit 411. Specifically, the exposure control unit 412 generates a control signal for controlling the exposure time of the pixels 201 included in the corresponding pixel block 200 (the charge accumulation time of the photoelectric conversion unit 300). The exposure control unit 412 adjusts the start timing or the end timing for exposure of the pixels 201 included in the corresponding pixel block 200 to control the exposure time of each pixel block 200, for example. The exposure control unit 412 is provided so as to be elongated in the row direction in the control block 400A.

The pixel driving unit 413 outputs the control signal generated by the exposure control unit 412 to the pixels 201 included in the corresponding pixel block 200. The pixel driving unit 413 is a driver circuit that drives the pixels 201 included in the corresponding pixel block 200. The pixel driving unit 413 drives the pixels 201 of a selected pixel row among the pixels 201 included in the corresponding pixel block 200. The pixel driving unit 413 is provided so as to extend in the column direction. As a result, the pixel driving unit 413 is disposed at a position corresponding to m pixels 201 arranged in the column direction. The autonomous exposure processing unit 411, the exposure control unit 412, and the pixel driving unit 413 are arranged in an L-shape in the control block 400A, where the pixel driving unit 413 extends in the column direction, and the autonomous exposure processing unit 411 and the exposure control unit 412 extend in the row direction.

The signal input unit 421 receives input of pixel signals outputted from the pixels 201 included in the corresponding pixel block 200. The signal input unit 421 outputs the inputted pixel signals to the signal conversion unit 422. The signal input unit 421 may be provided for each of the n pixels 201 arranged in the row direction in the corresponding pixel block 200. The signal input unit 421 may have a processing circuit that performs signal processing such as noise removal on the pixel signals outputted from the first semiconductor substrate 110. Also, the signal input unit 421 may have a voltage adjustment circuit that adjusts the voltage of the signal line 202 connected to the pixels 201 included in the corresponding pixel block 200 so as not to reach a prescribed value or less. If disposed on the second semiconductor substrate, the load current source 306 may be disposed in the signal input unit 421 included in the corresponding control block 400A.

The signal conversion unit 422 converts the pixel signals outputted from the signal input unit 421 into digital signals. The signal conversion unit 422 sequentially converts the pixel signals outputted respectively from the m pixels 201 arranged in the column direction in the corresponding pixel block 200 into digital signals. The signal conversion unit 422 converts, in a parallel fashion, the pixel signals outputted from the pixels 201 arranged in n columns in the row direction of the corresponding pixel block 200 into digital signals.

The signal output unit 423 stores the pixel signals converted by the signal conversion unit 422 into digital signals. The signal output unit 423 may have a latch circuit for storing the digital signals. The signal output unit 423 is disposed between the signal conversion unit 422 and the autonomous exposure processing unit 411 in the column direction. The signal output unit 423 outputs the pixel signals converted into digital signals to the outside of the control circuit unit 102. The signal output unit 423 is provided so as to extend in the row direction of the control block 400A. The signal output unit 423 is disposed between the signal conversion unit 422 and the autonomous exposure processing unit 411 in the column direction.

Figure 5:
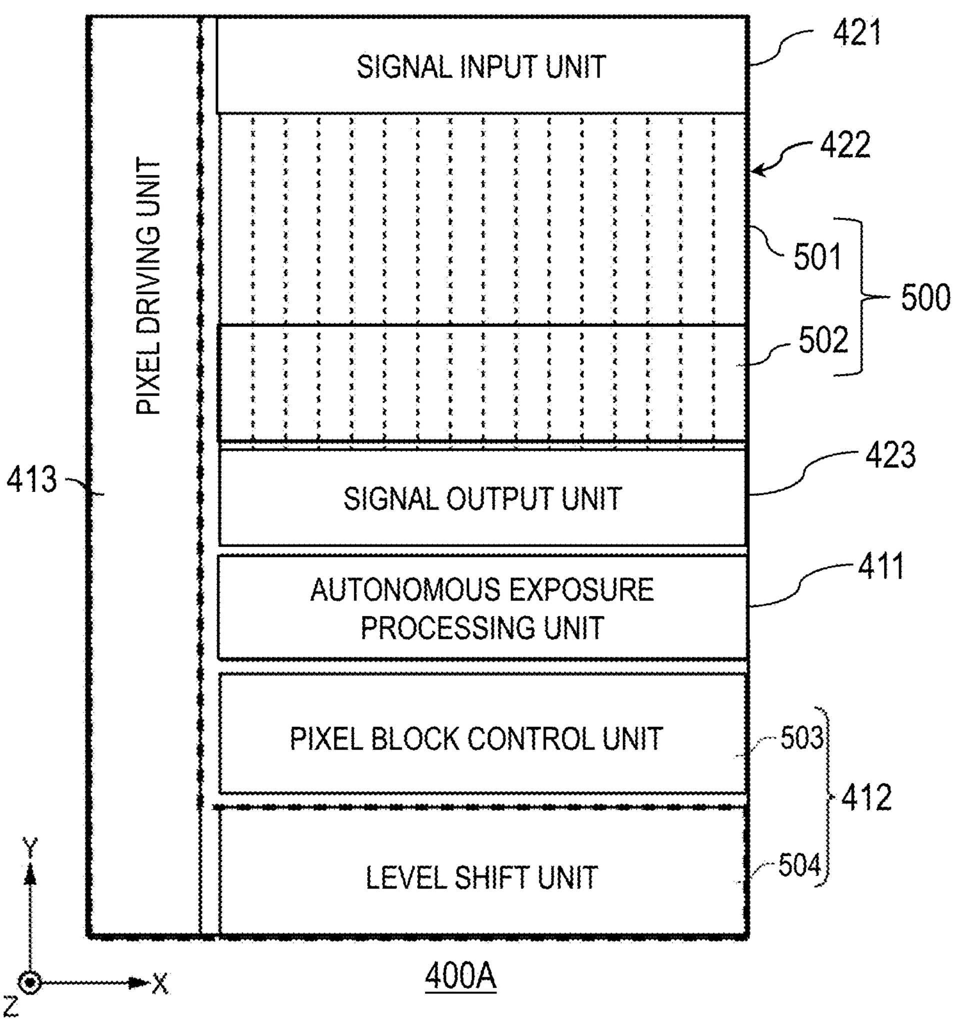
FIG. 5 is a descriptive view showing an example of an internal configuration of the control block.

FIG. 5 is a descriptive view showing an example of an internal configuration of the control block 400A. The signal conversion unit 422 includes n comparators 501 and n storage units 502. The exposure control unit 412 includes a pixel block control unit 503 and a level shift unit 504. A combination of one comparator 501 and a storage unit 502 connected to the comparator 501 constitutes one analog-to-digital converter (ADC) 500.

The comparator 501 is provided so as to extend in the column direction of the control block 400A. The n comparators 501 are arranged in the row direction. The comparators 501 are arranged for each of the m pixels 201 arranged in the column direction in the corresponding pixel block 200. The comparators 501 sequentially read the pixel signals of the m pixels 201 arranged in the column direction in the corresponding pixel block 200 and convert the pixel signals into digital signals.

The storage unit 502 stores the pixel signals converted into digital signals by using the comparator 501. The storage unit 502 is provided in the signal conversion unit 422 on the load side further in the Y axis direction than the comparator 501. The storage unit 502 has a latch circuit, for example. The storage unit 502 may have a memory constituted of an SRAM or the like.

The pixel block control unit 503 controls the operation of the transfer units 301 and the discharge units 302 of the pixels 201 included in the corresponding pixel block 200. Specifically, the pixel block control unit 503 outputs the transfer control signal φTX for controlling the transfer units 301 of the pixels 201 included in the corresponding pixel block 200 and the discharge control signal φPDRST for controlling the discharge units 302 of the pixels 201 included in the corresponding pixel block 200. The pixel block control unit 503 is provided so as to extend in the row direction in the control block 400A. The pixel block control unit 503 is disposed between the level shift unit 504 and the autonomous exposure processing unit 411 in the column direction.

The level shift unit 504 adjusts the voltage level of the control signals outputted from the pixel block control unit 503. Specifically, the level shift unit 504 raises the voltage level of the transfer control signal φTX outputted from the pixel block control unit 503. Also, the level shift unit 504 raises the voltage level of the discharge control signal φPDRST outputted from the pixel block control unit 503.

The transfer unit 301 receives, via the transfer control line 311, input of the transfer control signal φTX, the voltage of which was raised by the pixel block control unit 503. Also, the discharge unit 302 receives, via the discharge control line 312, the discharge control signal φPDRST, the voltage of which was raised by the pixel block control unit 503.

In this manner, the pixel block control unit 503 raises the voltages of the transfer control signal φTX and the discharge control signal φPDRST so as to reach voltage levels used by the transfer units 301 and the discharge units 302 of the read units 310 of the pixels 201. The level shift unit 504 is provided so as to extend in the row direction of the control block 400A.

The level shift unit 504 is provided further to the outer periphery of the control block 400A than the pixel block control unit 503. The edge on the positive side in the X axis direction of the level shift unit 504 and the edge on the negative side in the Y axis direction are positioned furthest to the outside of the control block 400A. The edge on the negative side in the X axis direction of the level shift unit 504 is in contact with the pixel driving unit 413.

The level shift unit 504 and the pixel driving unit 413 handle the signals subjected to level shifting. Meanwhile, the autonomous exposure processing unit 411, the pixel block control unit 503, the level shift unit 504, and the pixel driving unit 413 handle pixel signals outputted from the first semiconductor substrate 110.

Here, the components of the control block 400A are formed in well regions provided in the second semiconductor substrate 120. The well regions are provided separately according to the voltage level of the signal handled. The well regions are divided by whether the power source used thereby is a digital power source or an analog power source. Also, even if the signal conversion unit 422 uses the same analog power source, the signal conversion unit 422 is sometimes separated from regions that use another analog power source from the perspective of noise prevention. The separation of the well regions requires a well separation region with a gap based on manufacturing process rules.

The control block 400A separates the well region forming the level shift unit 504 and the pixel driving unit 413 from other well regions. The level shift unit 504 and the pixel driving unit 413 are arranged in an L shape, for example, thereby enabling the sharing of a well region between the level shift unit 504 and the pixel driving unit 413. As a result of sharing the well region, it is possible to omit a well separation region, thereby improving layout efficiency.

The L-shaped pixel control unit 401 constitutes a portion of the outer periphery of the control block 400A. As a result, it is possible to share a well region with another control block 400A that is adjacent thereto in the row direction and the column direction.

Figure 6:
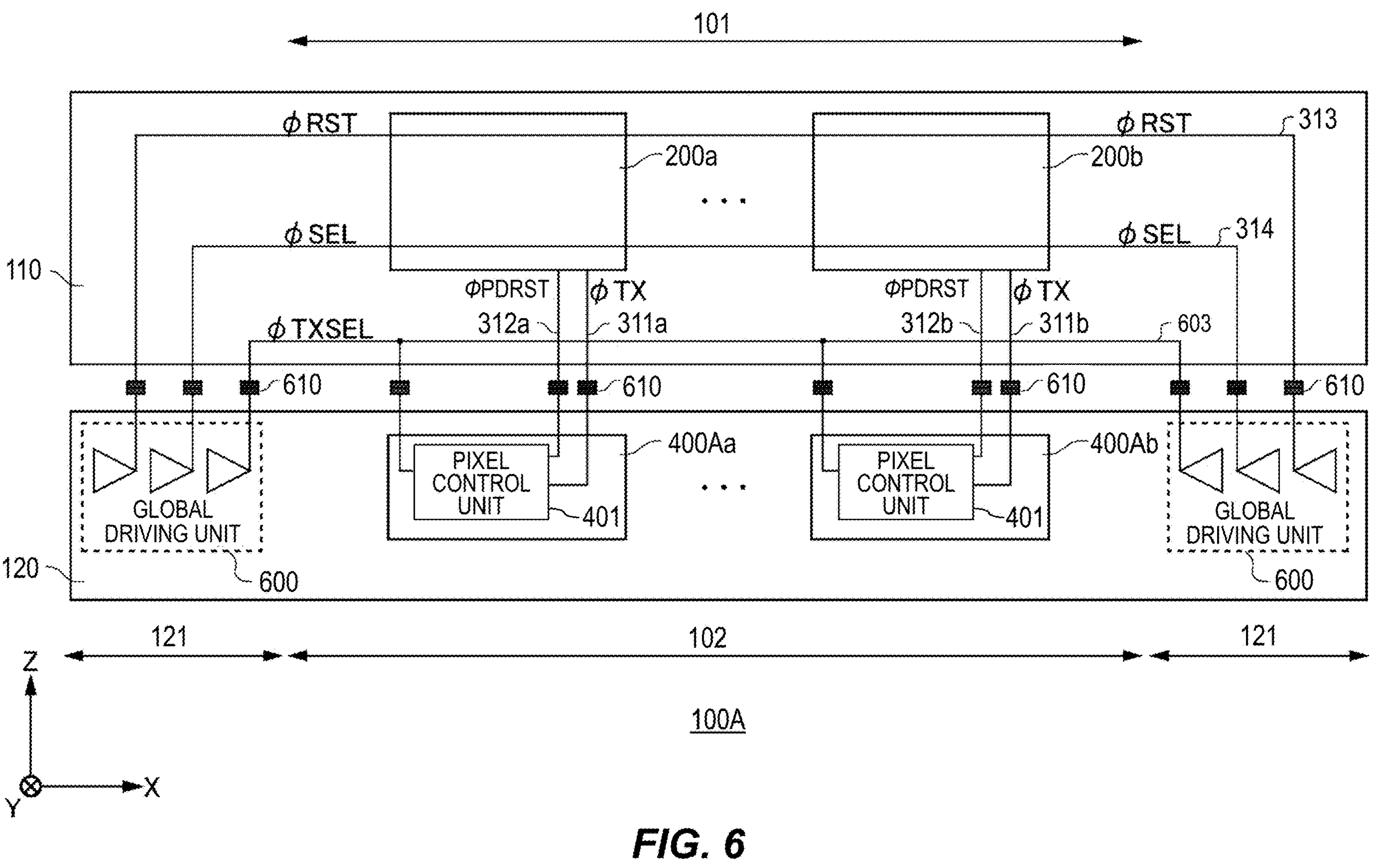
FIG. 6 is a descriptive view showing a transmission example for signals between the first semiconductor substrate and the second semiconductor substrate 120 in the imaging element.

FIG. 6 is a descriptive view showing a transmission example for signals between the first semiconductor substrate 110 and the second semiconductor substrate 120 in the imaging element 100A. Global driving units 600 are provided at the peripheral circuit units 121 that sandwich the control circuit unit 102 from both ends thereof.

A transfer control line 311*a* and a discharge control line 312*a* are respectively connected to the pixels 201 included in a pixel block 200*a*. The transfer control line 311*a* is connected to the gate terminals of the transfer units 301 of the pixels 201 included in the pixel block 200*a*, and the discharge control line 312*a* is connected to the gate terminals of the discharge control line 302 of the pixels 201 included in the pixel block 200*a*. The transfer control line 311*a* supplies the transfer control signal φTX outputted from a control block 400Aa to the transfer units 301 of the pixels 201 included in the pixel block 200*a*. The discharge control line 312*a* supplies the discharge control signal φPDRST outputted from the control block 400Aa to the discharge units 302 of the pixels 201 included in the pixel block 200*a*.

Similarly, a transfer control line 311*b* and a discharge control line 312*b* are respectively connected to the pixels 201 included in a pixel block 200*b*. The transfer control line 311*b* is connected to the gate terminals of the transfer units 301 of the pixels 201 included in the pixel block 200*b*, and the discharge control line 312*b* is connected to the gate terminals of the discharge control line 302 of the pixels 201 included in the pixel block 200*b*. The transfer control line 311*b* supplies the transfer control signal φTX outputted from a control block 400Ab to the transfer units 301 of the pixels 201 included in the pixel block 200*b*. The discharge control line 312*b* supplies the discharge control signal φPDRST outputted from the control block 400Ab to the discharge units 302 of the pixels 201 included in the pixel block 200*b*.

If not distinguishing between the transfer control lines 311*a* and 311*b*, the transfer control lines are collectively referred to as the transfer control lines 311. If not distinguishing between the discharge control lines 312*a* and 312*b*, the discharge control lines are collectively referred to as the discharge control lines 312.

The transfer control lines 311 and the discharge control lines 312 are examples of local control lines connected to first pixels of the pixel block 200. The transfer control lines 311 and the discharge control lines 312 are connected to the same n pixels 201 arranged in the row direction in the pixel block 200.

The global driving unit 600 outputs a reset control signal φRST, a selection control signal φSEL, and a transfer selection control signal φTXSEL. The global driving unit 600 is connected to the reset control line 313, the selection control line 314, and a transfer selection control line 603 that output control signals to the respective pixel blocks 200.

The global driving unit 600 supplies the reset control signal φRST and the selection control signal φSEL to the plurality of pixel blocks 200 via the reset control line 313 and the selection control line 314. The global driving unit 600 supplies the transfer selection control signal φTXSEL to the plurality of control blocks 400A via the transfer selection control line 603.

The transfer selection control signal φTXSEL is supplied from the global driving unit 600 to the control block 400A in order to control the exposure time for each pixel block 200. The control block 400A to which the transfer selection control signal φTXSEL was supplied outputs the transfer selection control signal φTXSEL to the corresponding pixel block 200. The control block 400A determines whether to input, to the pixels 201, the transfer selection control signal φTXSEL as the transfer control signal φTX or the discharge control signal φPDRST. As a result, the input of the transfer control signal φTX or the discharge control signal φPDRST to the pixels 201 is skipped.

If the transfer control signal φTX determines the end time for exposure, for example, then the control block 400A extends the exposure time by skipping the transfer control signal φTX. If the transfer control signal φTX determines the start time for exposure, then the control block 400A can shorten the exposure time by skipping the transfer control signal φTX. In this manner, the transfer selection control signal φTXSEL can be used to adjust the exposure time of the pixel block 200. This similar applies to cases in which the discharge control signal φPDRST determines the start time or the end time for exposure.

The reset control line 313, the selection control line 314, and the transfer selection control line 603 are shared by the plurality of pixel blocks 200. The reset control line 313, the selection control line 314, and the transfer selection control line 603 are wired so as to cross the first semiconductor substrate 110 in the row direction. The reset control line 313, the selection control line 314, and the transfer selection control line 603 may alternatively be wired so as to cross the first semiconductor substrate 110 in the column direction.

The reset control line 313 is connected to the gate terminals of the reset units 304 of the pixels 201 in the pixel block 200 and supply thereto the reset control signal φRST. The selection control line 314 is connected to the gate terminals of the selection units 352 of the pixels 201 in the pixel block 200 and supply thereto the selection control signal φSEL. The transfer selection control line 603 is connected to the plurality of control blocks 400A and supplies the transfer selection control signal φTXSEL to the pixel control unit 401.

The global driving unit 600 outputs the transfer selection control signal φTXSEL from the second semiconductor substrate 120 to the control block 400A via the first semiconductor substrate 110, but may output the transfer selection control signal φTXSEL to the control block 400A without passing through the first semiconductor substrate 110. In this case, the transfer selection control line 603 is provided to the second semiconductor substrate 120.

Junction units 610 are provided at a junction surface at which the first semiconductor substrate 110 and the second semiconductor substrate 120 are joined. The junction units 610 match the positions of the transfer control line 311, the discharge control line 312, and the transfer selection control line 603 between the first semiconductor substrate 110 and the second semiconductor substrate 120. The junction units 610 are each constituted of a pair of conductive junction pads, are joined by a pressurization treatment or the like between the first semiconductor substrate 110 and the second semiconductor substrate 120, and are electrically connected to each other.

The imaging element 100A changes the timing of the transfer unit 301 and/or the discharge unit 302 using local control lines such as the transfer control line 311 and the discharge control line 312, thereby controlling the exposure time for each pixel block 200. The imaging element 100A can control the exposure time with fewer control lines by combining local control lines such as the transfer control line 311 and the discharge control line 312 with global control lines such as the reset control line 313, the selection control line 314, and the transfer selection control line 603.

Figure 7:
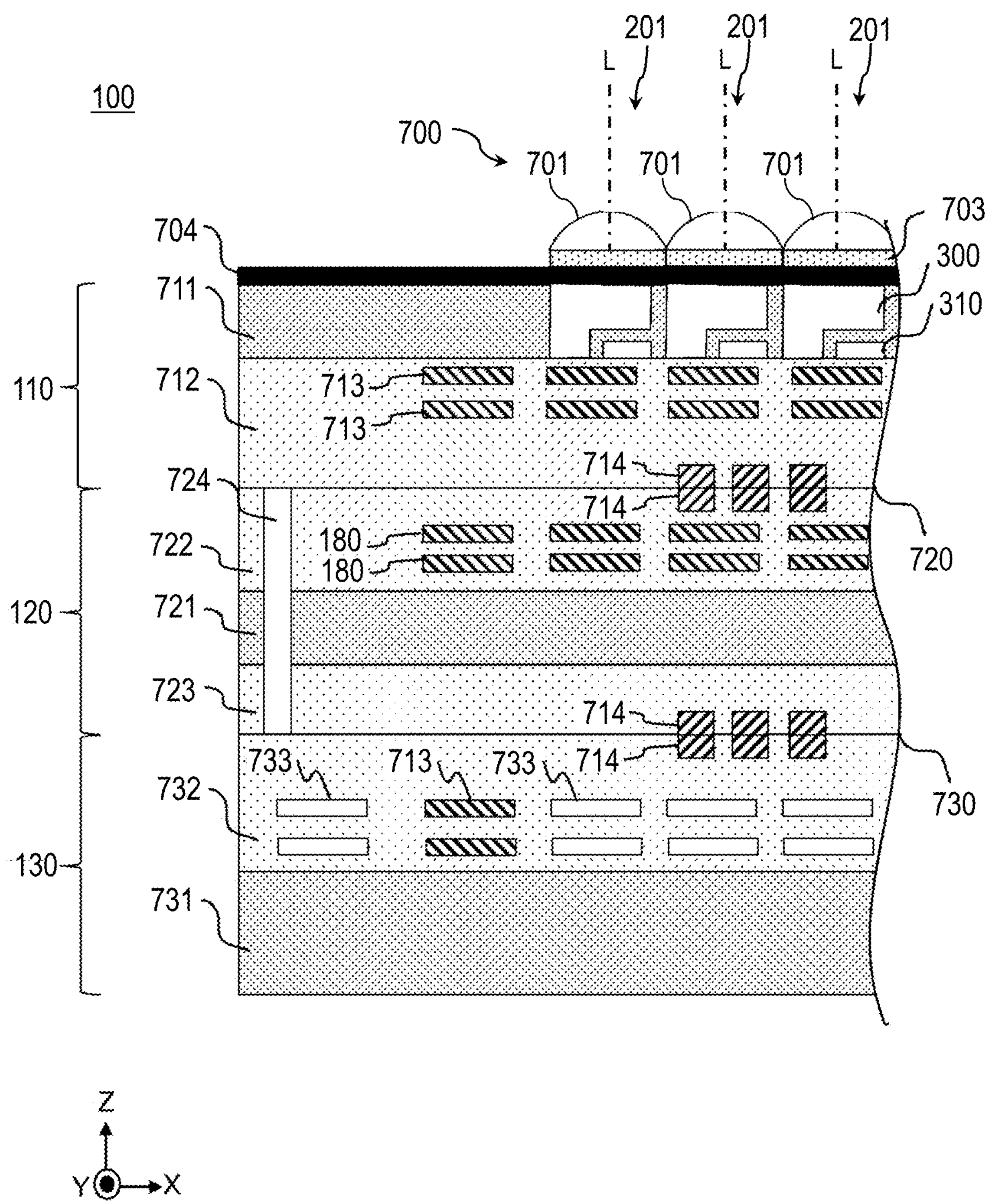
FIG. 7 is a descriptive view showing an example of an X-Z cross section of the imaging element according to the present embodiment.

FIG. 7 is a descriptive view showing an example of an X-Z cross section of the imaging element 100A according to the present embodiment. In FIG. 7, a back-illuminated imaging element 100A is shown, but the imaging element 100A is not limited to being of a back-illuminated type. The imaging element 100A includes a microlens layer 700, a color filter layer 702, the first semiconductor substrate 110, the second semiconductor substrate 120, and the third semiconductor substrate 130. As shown, light from the subject enters via the direction indicated by the white arrows (the negative Z axis direction in the drawing). The side of the first semiconductor substrate 110 at which the light enters (the positive Z axis side in the drawing) is sometimes referred to as the front surface, and the side opposite thereto (the negative Z axis side in the drawing) is sometimes referred to as the rear surface.

The microlens layer 700 has a plurality of microlenses 701. The plurality of microlenses 701 are layered on the positive Z axis side of the color filter layer 702. Light enters the microlenses 701. The microlenses 701 condense the incident light onto the photoelectric conversion units 300. The microlens 701 may be provided for each photoelectric conversion unit 300. The optical axis L of the microlens 701 is the lamination direction (direction parallel to the Z axis) of the first semiconductor substrate 110, the second semiconductor substrate 120, and the third semiconductor substrate 130.

The color filter layer 702 has a plurality of color filters 703 and a passivation film 704. The color filter layer 702 is stacked on the positive Z axis side of a first semiconductor layer 711. The color filters 703 are optical filters that allow through light in specific wavelength regions. The color filters 703 are optical filters having specific spectral characteristics. The plurality of color filters 703 have a plurality of optical filters with differing spectral characteristics, and allow through light of different wavelength regions from each other. The plurality of color filters 703 are provided in a specific arrangement (e.g., a Bayer array).

An example of the first semiconductor substrate 110 is a back-illuminated CMOS image sensor. The first semiconductor substrate 110 has the first semiconductor layer 711 and a first wiring layer 712. The first semiconductor layer 711 is provided on the positive Z axis side of the first wiring layer 712. The first semiconductor layer 711 has a plurality of pixel blocks 200 that are arranged in two dimensions: the row direction and the column direction. The first semiconductor layer 711 has the plurality of pixels 201 that are arranged in two dimensions: the row direction and the column direction. The plurality of pixels 201 have, respectively, the plurality of photoelectric conversion units 300 that accumulate an electric charge on the basis of the incident light, and the plurality of read units 310.

The first wiring layer 712 is provided on the second semiconductor substrate 120 side of the first semiconductor layer 711 (the negative Z axis side in the drawing). The first wiring layer 712 has a plurality of wiring lines 713 made of a conductive film (metal film), a plurality of junction pads 714, and an insulating film (insulating layer).

The first wiring layer 712 has the plurality of wiring lines 713 that are electrically connected to a power source, a circuit, or the like. In the first semiconductor substrate 110, the wiring lines 713 are specifically a power source line to which a prescribed power source voltage is supplied, the signal line 202 that transfers pixel signals from the first semiconductor substrate 110 (pixels) to the second semiconductor substrate 120, the transfer control line 311 that transfers the control signal from the second semiconductor substrate 120 to the first semiconductor substrate 110 (pixels), the discharge control line 312, the reset control line 313, the selection control line 314, and the transfer selection control line 603, for example. The first wiring layer 712 may be multiple layers, and may be provided with a passive element and an active element.

The junction pad 714 is provided to the surface of the first wiring layer 712 (the surface on the negative Z axis side) and the wiring line 713. As will be described later, the junction pad 714 is used to aid the connection between layers. The junction pad 714 is made of an electrically conductive material such as copper, for example. Alternatively, the junction pad 714 may be made of gold, silver, or aluminum. An insulating layer (insulating film) is formed between the plurality of wiring lines 713 and between the plurality of junction pads 714.

The second semiconductor substrate 120 has a second semiconductor layer 721, a second wiring layer 722, and a wiring layer 723. The second wiring layer 722 is provided on the first semiconductor substrate 110 side of the second semiconductor layer 721 (the positive Z axis side in the drawing). The wiring layer 723 is provided on the third semiconductor substrate 130 side of the second semiconductor layer 721 (the negative Z axis side in the drawing), and is provided between the second semiconductor layer 721 and the third semiconductor substrate 130. The second semiconductor layer 721 has the control circuit unit 102 and the peripheral circuit units 121. The control circuit unit 102 has the plurality of control blocks 400A that are arranged in two dimensions: the row direction and the column direction.

Similar to the first semiconductor substrate 110, the second semiconductor substrate 120 has the plurality of wiring lines 713 provided in the second wiring layer 722, the plurality of junction pads 714 provided in the second wiring layer 722 and the wiring layer 723, and the insulating film (insulating layer) provided on the second wiring layer 722 and the wiring layer 723.

The second wiring layer 722 has the plurality of wiring lines 713 and junction pads 714 in order to be electrically connected to a power source, a circuit, or the like, to transmit signals from the pixel unit 101 to the control circuit unit 102, and to transmit signals from the control circuit unit 102 to the pixel unit 101. In the second semiconductor substrate 120, the wiring lines 713 are specifically a power source line to which a prescribed power source voltage is supplied, the signal line 202 that transfers pixel signals from the first semiconductor substrate 110 (pixels) to the second semiconductor substrate 120, the transfer control line 311 that transfers the control signal from the second semiconductor substrate 120 to the first semiconductor substrate 110 (pixels), the discharge control line 312, the reset control line 313, the selection control line 314, and the transfer selection control line 603, for example. The second wiring layer 722 may be multiple layers, and may be provided with a passive element and an active element. The wiring lines 713 and the junction pads 714 may be further provided in the wiring layer 723.

The second semiconductor substrate 120 further has a through-silicon via (TSV) 724 that connects the circuits provided on the front and rear surfaces thereof. It is preferable that the TSV 724 be provided in a peripheral region. The TSV 724 transmits image data and the like generated by the data processing unit 103 to the first semiconductor substrate 110. The TSV 724 may be provided to the first semiconductor substrate 110 and to the third semiconductor substrate 130.

The third semiconductor substrate 130 has a third semiconductor layer 731 provided with the data processing unit 103, and a third wiring layer 732. The third wiring layer 732 is provided between the first semiconductor layer 731 and the second semiconductor substrate 120.

Similar to the first semiconductor substrate 110, the third semiconductor substrate 130 has the wiring lines 713 and the plurality of junction pads 714 provided in the third wiring layer 732. The third wiring layer 732 has the plurality of wiring lines 713 and junction pads 714 in order to be electrically connected to a power source, a circuit, or the like, to transmit signals from the control circuit unit 102 to the data processing unit 103, and to transmit the signals from the data processing unit 103 to the control circuit unit 102 of the second semiconductor substrate 120.

The first semiconductor substrate 110, the second semiconductor substrate 120, and the third semiconductor substrate 130 are stacked so as to electrically connect the junction pads 714 provided in the respective layers and the junction between the wiring layers (insulating layers) of the respective layers.

When the first semiconductor substrate 110 and the second semiconductor substrate 120 are stacked, the negative Z axis-side surface of the first wiring layer 712 and the positive Z axis-side surface of the second wiring layer 722 constitute a boundary surface 720. Similarly, when the second semiconductor substrate 120 and the third semiconductor substrate 130 are stacked, the negative Z axis-side surface of the wiring layer 723 and the positive Z axis-side surface of the third wiring layer 732 constitute a boundary surface 730. The boundary surface 720 and the boundary surface 730 have disposed thereon the plurality of junction pads 714. Specifically, opposing junction pads 714 are position-matched to each other as the two layers are stacked, thereby forming an electric connection between the position-matched junction units.

The first semiconductor substrate 110, the second semiconductor substrate 120, and the third semiconductor substrate 130 may be stacked as wafers prior to be formed into chips, with the stacked wafers being diced, or the first semiconductor substrate 110, the second semiconductor substrate 120, and the third semiconductor substrate 130, as wafers, may be diced and then stacked.

Figure 8:
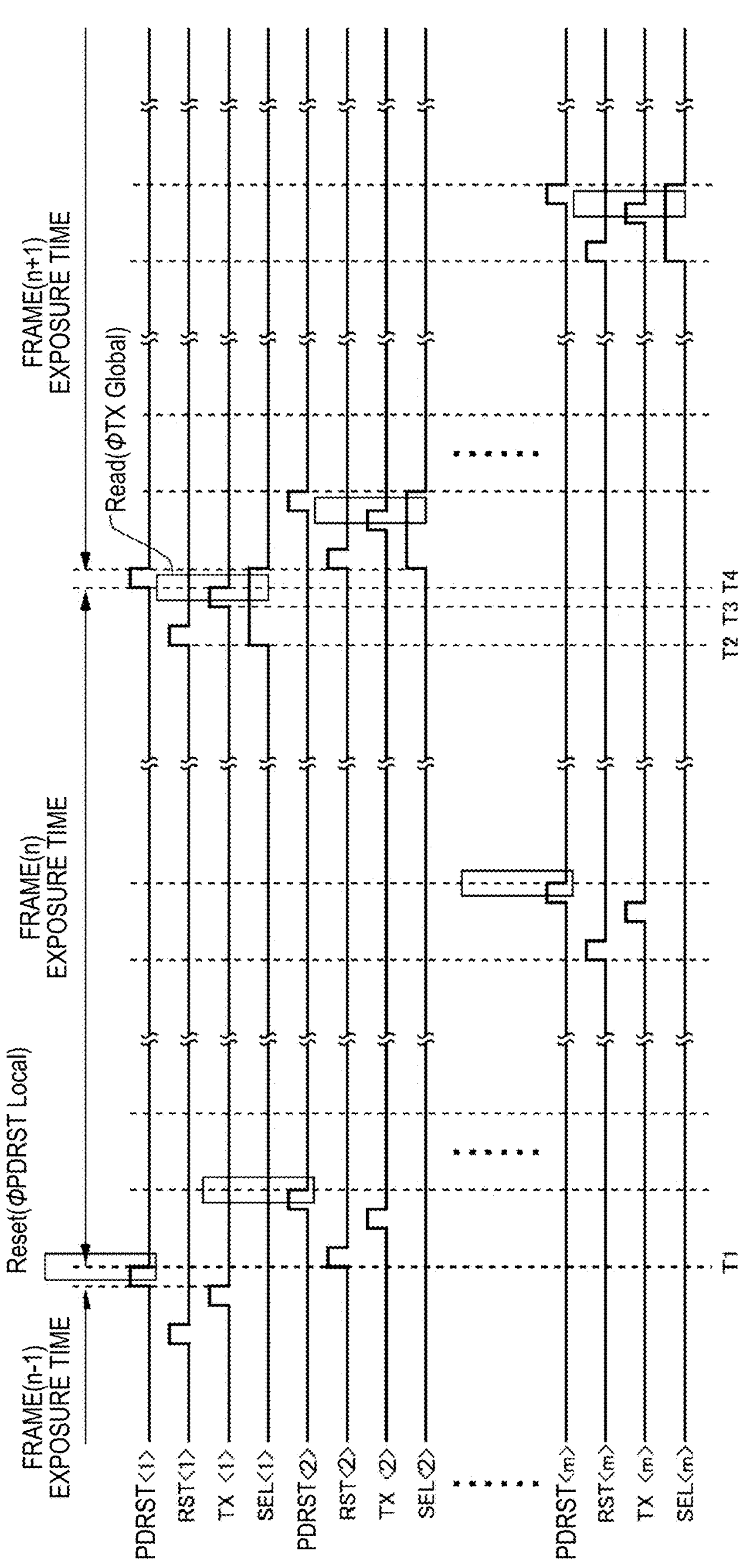
FIG. 8 is a timing chart showing an imaging operation example 1 of the imaging element.

FIG. 8 is a timing chart showing an imaging operation example 1 of the imaging element 100A. FIG. 8 is an imaging operation example by which the driving of the imaging element 100A is controlled by the transfer control signal φTX, the discharge control signal φPDRST, the reset control signal φRST, and the selection control signal φSEL. In FIG. 8, the discharge control signal φPDRST is locally controlled, and the transfer control signal φTX, the reset control signal φRST, and the selection control signal φSEL are globally controlled. The suffixes <1>, <2> . . . <m> of each signal on the left-hand side indicate the row numbers of the pixels 201 in the pixel block.

The discharge control signal φPDRST controls the timing at which exposure is started. The exposure start timing corresponds to the fall timing of the discharge control signal φPDRST (e.g., time T1). In other words, prior to the start time T1 for exposure, the discharge control signal φPDRST causes the discharge unit 302 to turn ON, resulting in the electric charge accumulated in the photoelectric conversion unit 300 to be discharged, and the fall of the discharge control signal φPDRST results in the start of exposure. The discharge control signal φPDRST is locally controlled, and thus, it is possible to adjust the exposure time for each pixel block 200.

The transfer control signal φTX controls the timing at which exposure is ended. At the time T3, the transfer control signal φTX turns ON the transfer unit 301, thereby transferring the accumulated electric charge in the photoelectric conversion unit 300 to the FD 303. The exposure end timing corresponds to the fall timing of the transfer control signal φTX (e.g., time T4). The transfer control signal φTX is a globally controlled signal, and thus, the timing at which exposure is ended is the same for all pixel blocks 200.

The reset control signal φRST controls the timing of discharge of the electric charge accumulated in the FD 303. At the time T2, the reset control signal φRST turns ON the reset unit 304, thereby discharging the electric charge of the FD 303. By discharging the electric charge in the FD 303 prior to the exposure end timing, it is possible to mitigate the effect of electric charge remaining in the FD 303 when the electric charge is transmitted from the photoelectric conversion unit 300.

The selection control signal φSEL is a signal for selecting a given pixel 201. The selection control signal φSEL controls the selection unit 352 so as to be ON or OFF. At the time T2, the selection control signal φSEL is set to high. At the time T3, pixels 201 for which the selection control signal φSEL is set to high output a pixel signal to the signal line 202 as the transfer control signal φTX turns ON. Meanwhile, no pixel signal is outputted from pixels 201 for which the selection control signal φSEL is not set to high.

The imaging element 100A locally controls the discharge control signal φPDRST to change the exposure start timing for each pixel block 200, thereby enabling control of the exposure time for each pixel block 200. Also, the imaging element 100A may locally control the transfer control signal φTX, thereby enabling control of the exposure end timing for each pixel block 200. Additionally, the imaging element 100A may locally control both the transfer control signal φTX and the discharge control signal φPDRST, thereby enabling control of both the start timing and end timing of exposure for each pixel block 200.

FIG. 9 is a timing chart showing an imaging operation example 2 of the imaging element 100A. FIG. 9 is an imaging operation example by which the driving of the imaging element 100A is controlled by the transfer control signal φTX, the reset control signal φRST, and the selection control signal φSEL. This example differs from that of FIG. 8 in that the imaging element 100A controls the start timing of exposure using the transfer control signal φTX. Differences from the FIG. 8 will be described in particular.

The transfer control signal φTX controls the timing at which exposure is started and ended. During a frame (n), exposure is started at the time T5 and exposure is ended at the time T7.

At the exposure start time T5, the transfer control signal φTX falls, thereby starting exposure. In other words, prior to the start time T5 for exposure, the transfer control signal φTX causes the transfer unit 301 to turn ON in a state where the reset control signal φRST is turned ON, resulting in the electric charge accumulated in the photoelectric conversion unit 300 to be discharged, and the fall of the transfer control signal φTX results in the start of exposure. The transfer control signal φTX is a locally controlled signal, and thus, it is possible to change the timing at which exposure is started for each pixel block 200. However, the same timing for starting exposure may be used for all pixel blocks 200.

Also, at the exposure end time T7, the transfer control signal φTX falls, thereby ending exposure. In other words, prior to the end time T5 for exposure, the transfer control signal φTX causes the transfer unit 301 to turn ON in a state where the reset control signal φRST is turned OFF, resulting in the electric charge accumulated in the photoelectric conversion unit 300 to be transferred to the FD 303, and the fall of the transfer control signal φTX results in the end of exposure. The transfer control signal φTX is a locally controlled signal, and thus, it is possible to change the timing at which exposure is ended for each pixel block 200. However, the same timing for ending exposure may be used for all pixel blocks 200.

The selection control signal φSEL is a signal for selecting a given pixel 201. At the time T6, pixels 201 for which the selection control signal φSEL is set to high output a pixel signal to the signal line 202.

The reset control signal φRST controls the timing of discharge of the electric charge accumulated in the FD 303. The reset control signal φRST may be a globally controlled signal. The reset control signal φRST is set to ON at all times except for the read timing, and thus, no electric charge accumulates in the FD 303. By turning OFF the reset control signal φRST at the read timing and then turning ON the transfer control signal φTX, electric charge is transferred from the photoelectric conversion unit 300 to the FD 303. The reset control signal φRST has the same timing for switching during reading as the selection control signal φSEL, and thus, the same pulse timing as the selection control signal φSEL can be used.

The imaging element 100A locally controls the transfer control signal φTX to change the exposure start or end timing for each pixel block 200, thereby enabling control of the exposure time for each pixel block 200. Also, the imaging element 100A uses the same pulse timing for the reset control signal φRST and the selection control signal φSEL, and thus, it is possible to further simplify the control circuit.

Figure 10:
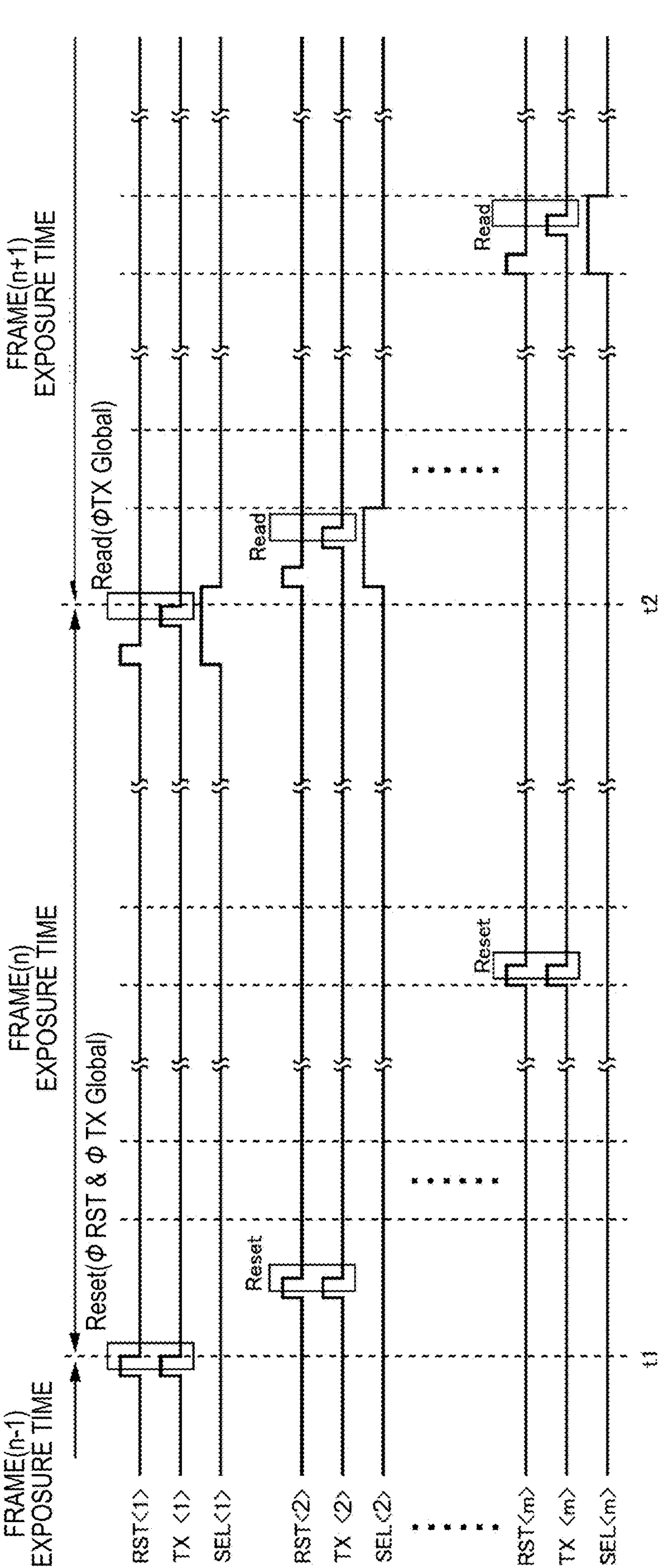
FIG. 10 is a timing chart showing an imaging operation of an imaging element according to a comparison example.

FIG. 10 is a timing chart showing an imaging operation of an imaging element according to a comparison example. FIG. 10 is an imaging operation example by which the driving of the imaging element is controlled by the transfer control signal φTX, the reset control signal φRST, and the selection control signal φSEL, and the exposure time is not individually controlled for each pixel block 200.

In the comparison example, the transfer control signal φTX and the reset control signal φRST is used to control the start of exposure. The exposure start timing is the fall timing (time T1) of the transfer control signal φTX and the reset control signal φRST. The exposure end timing is the fall timing of the transfer control signal φTX (time t2). In the comparison example, the start timing and end timing of exposure are globally controlled, and the exposure time is not individually controlled for each pixel block 200.

Figure 11:
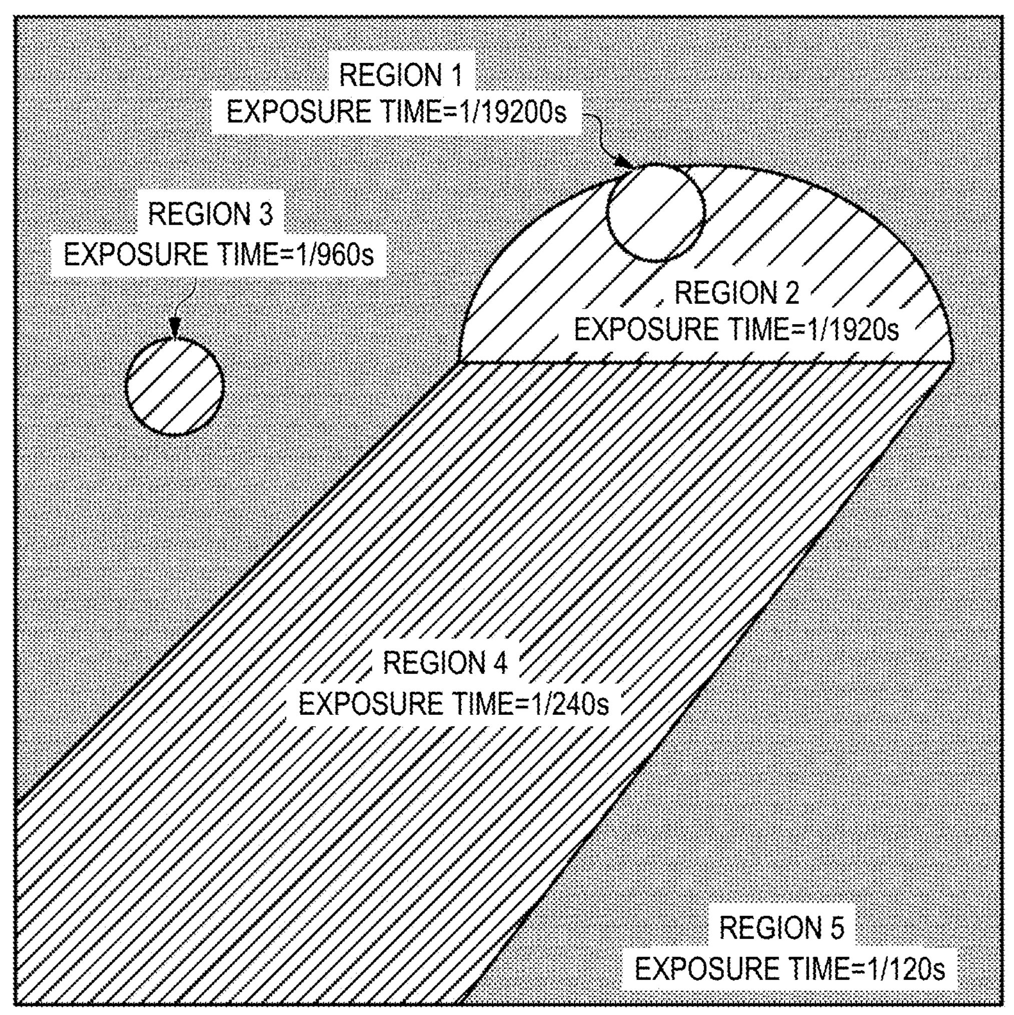
FIG. 11 is a descriptive view showing an example of a subject captured by the imaging element.

FIG. 11 is a descriptive view showing an example of a subject captured by the imaging element 100A. In FIG. 11, the imaging element 100A controls the exposure time for each pixel block 200 in a state where the sun in the west shines into a tunnel.

Regions 1 to 5 are five regions divided according to brightness. The regions 1 to 5 are assigned a number in order of brightness. The region 1 is the brightest region where the sun in the west is directly visible. The region 2 is a region corresponding to the exit of the tunnel, and is darker than the region 1. The region 3 is a region in the tunnel where the sun in the west is reflected, and is darker than the region 2. The region 4 is a region in the tunnel illuminated by the sun in the west through the exit, and is darker than the region 3. The region 5 is a region in the tunnel not illuminated by the sun in the west through the exit, and is the darkest region.

The imaging element 100A controls the exposure time for each pixel block 200 according to the brightnesses of the respective regions. The imaging element 100A controls the exposure times so as to be shorter for pixel blocks 200 in brighter regions. The exposure time for the region 1 is set to be the shortest, and the exposure time for the region 5 is set to be the longest. For example, the exposure times for the regions 1 to 5 are set to $1/19200$ s, $1/1920$ s, $1/960$ s, $1/240$ s, and $1/120$ s, respectively.

Figure 12:
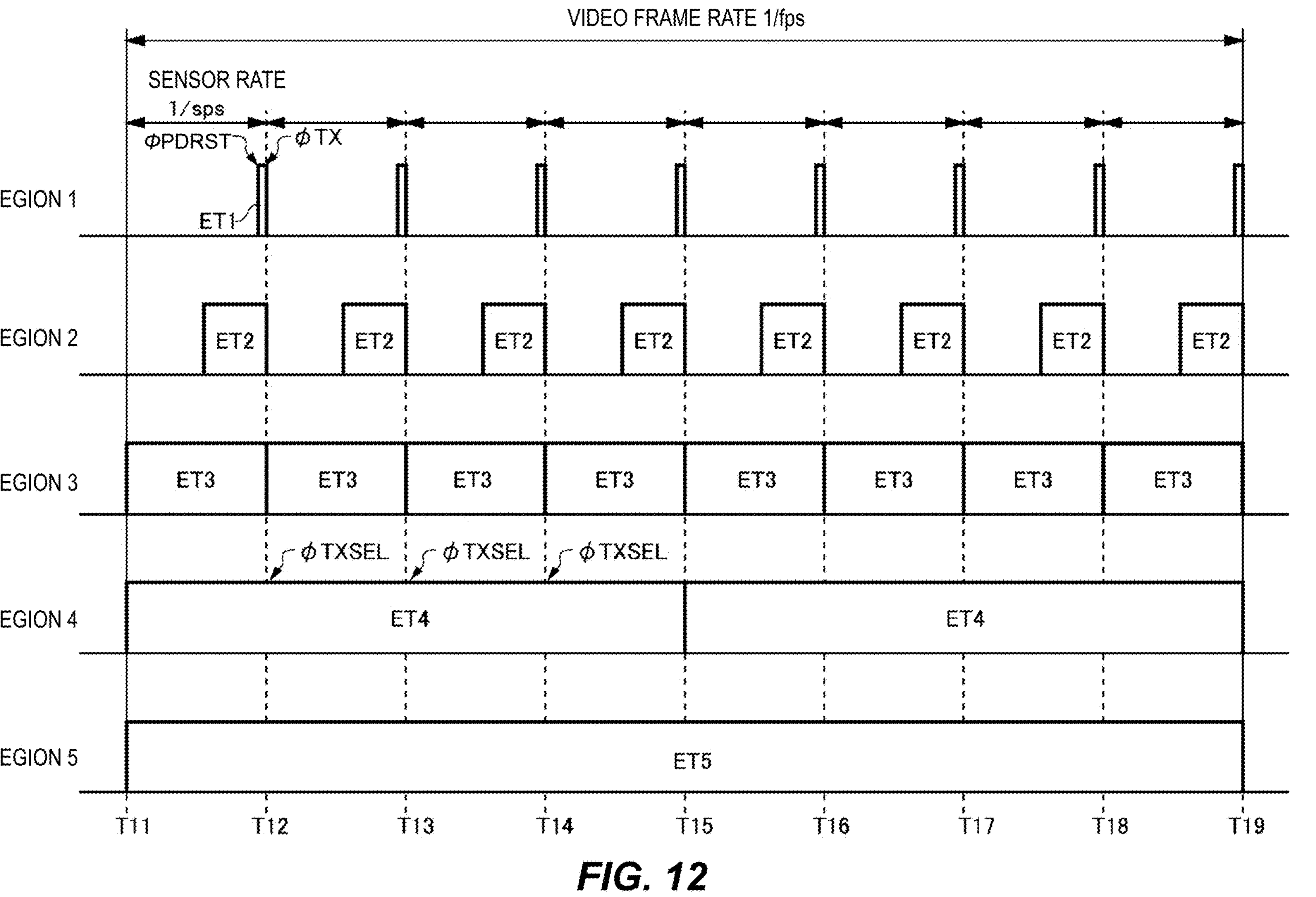
FIG. 12 is a timing chart showing the exposure times for the regions 1 to 5 shown in FIG. 11.

FIG. 12 is a timing chart showing the exposure times for the regions 1 to 5 shown in FIG. 11. In FIG. 12, the imaging element 100A controls the exposure time for each pixel block 200 in regions 1 to 5 shown in FIG. 11. The period from the time T11 to the time T19 corresponds to a video frame rate.

In the region 1, the control block 400A performs control for driving such that the exposure time in the pixel blocks 200 is a predetermined exposure time ET1. The control block 400A controls the start of exposure using the discharge control signal φPDRST and controls the end of exposure using the transfer control signal φTX. In the region 1, exposure ends at each of the times T12 to T19.

In the region 2, the control block 400A performs control for driving such that the exposure time in the pixel blocks 200 is an exposure time ET2, which is longer than the exposure time ET1. The control block 400A sets the exposure start time of the region 2 to be earlier than for the region 1 while matching the exposure end time of the region 2 with that of the region 1. Thus, in the region 2, exposure ends at each of the times T12 to T19. The exposure time ET2 of the region 2 is shorter than the sensor rate period.

In the region 3, the control block 400A performs control for driving such that the exposure time in the pixel blocks 200 is an exposure time ET3, which is longer than the exposure time ET2. The control block 400A sets the exposure start time of the region 3 to be earlier than for the region 2 while matching the exposure end time of the region 3 with that of the region 2. Thus, in the region 3, exposure ends at each of the times T12 to T19. The exposure time ET3 of the region 3 is set to be the same as the sensor rate period.

In the region 4, the control block 400A performs control for driving such that the exposure time in the pixel blocks 200 is an exposure time ET4, which is longer than the exposure time ET3. The control block 400A sets the exposure start time of the region 4 to be the same as that of region 3, while skipping the exposure end time using the transfer selection control signal φTXSEL. The control block 400A skips the exposure end time three times using the transfer selection control signal φTXSEL, causing the region 4 to have quadruple the exposure time of the region 3. In the region 4, the transfer selection control signal φTXSEL is supplied at each of the times T12 to T14.

In the region 5, the control block 400A performs control for driving such that the exposure time in the pixel blocks 200 is an exposure time ET5, which is longer than the exposure time ET4. The control block 400A sets the exposure start time of the region 5 to be the same as that of region 4, while increasing the number of instances that the exposure end time is skipped using the transfer selection control signal φTXSEL. The control block 400A skips the exposure end time seven times using the transfer selection control signal φTXSEL, causing the region 5 to have double the exposure time of the region 4. The exposure time ET5 of the region 5 is set to be the same as the sensor rate period. In the region 5, the transfer selection control signal φTXSEL is supplied at each of the times T12 to T18.

The imaging element 100A realizes short exposure by bringing the intervals of the transfer control signal φTX and the discharge control signal φPDRST to be closer to each other. Also, the imaging element 100 skips control by the transfer control signal φTX using the transfer selection control signal φTXSEL, resulting in a long exposure. This enables expansion of the dynamic range.

Figure 13:
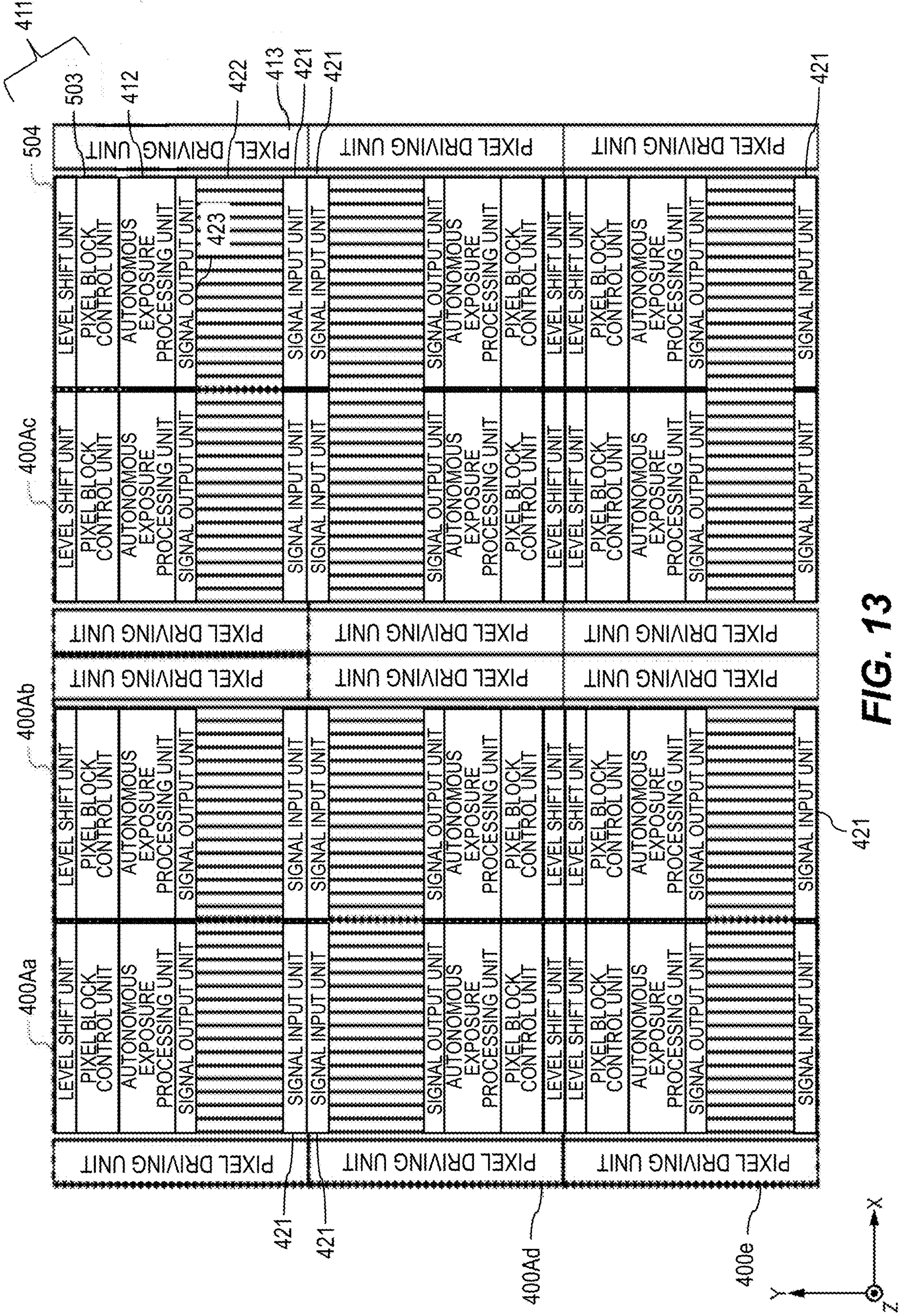
FIG. 13 is a plan view showing an example of a layout of the plurality of control blocks.

FIG. 13 is a plan view showing an example of a layout of the plurality of control blocks 400A. The plurality of control blocks 400A are disposed such that adjacent control blocks 400A are in an inverted arrangement to each other. FIG. 13 shows, as an example 12 control blocks 400A among the plurality of control blocks 400A provided in the control circuit unit 102.

An inverted arrangement refers to an arrangement whereby regions where components of the control block 400A are formed (e.g., the exposure control unit 412, the pixel driving unit 413, the signal input unit 421, the signal conversion unit 422, and the signal output unit 423) are mirrored from each other about the boundary line between the control blocks 400A. The circuits of the respective components of the control block 400A need not be in an inverted arrangement. Also, the order of reading each pixel in the control blocks 400A need not necessarily be inverted.

For example, in a case where a plurality of control blocks 400A disposed adjacent to each other in the row direction are in an inverted arrangement, the components of the control block 400A are inverted in the row direction, and thus, the respective pixel driving units 413 both control blocks 400A are arranged adjacent to each other at the boundary therebetween. As a result, the plurality of pixel driving units 413 arranged adjacent to each other in the row direction can be laid out as one pixel driving unit 413, thereby improving the layout efficiency of the control blocks 400A.

Similarly, in a case where a plurality of control blocks 400A disposed adjacent to each other in the column direction are in an inverted arrangement, the components of the control block 400A are inverted in the column direction, and thus, the same components of both control blocks 400A are arranged adjacent to each other at the boundary therebetween. As a result, the plurality of signal input units 421 arranged adjacent to each other in the column direction can be laid out as one signal input unit 421, thereby improving the layout efficiency of the control blocks 400A.

The control blocks 400A are each in an inverted arrangement with control blocks 400A disposed adjacent thereto. All control blocks 400A are in an inverted arrangement with each other in the row direction and the column direction, but may alternatively be in an inverted arrangement in either one of the row direction and the column direction. For example, the signal conversion unit 422 of the control block 400A is in an inverted arrangement with the signal conversion units 422 of the control blocks 400A adjacent thereto in the row direction. The signal conversion unit 422 of the control block 400A is also in an inverted arrangement with the signal conversion units 422 of the control blocks 400A that are adjacent thereto in the column direction.

The control block 400Aa and the control block 400Ab are arranged adjacent to each other in the row direction. The control block 400Aa is in an inverted arrangement with the control block 400Ab. The level shift unit 504 of the control block 400Aa is provided in the same well region as the level shift unit 504 of the control block 400Ab. Similarly, the pixel block control unit 503, the storage unit 502, and the signal output unit 423 are provided in the same well region for the control block 400Aa and the control block 400Ab.

The control block 400Ab and the control block 400Ac are arranged adjacent to each other in the row direction. The control block 400Ab is in an inverted arrangement with the control block 400Ac. The pixel driving unit 413 of the control block 400Ab is provided in the same well region as the pixel driving unit 413 of the control block 400Ac. The well region of the pixel driving unit 413 may be shared with the well region of the level shift unit 504.

The control block 400Aa and the control block 400Ad are arranged adjacent to each other in the column direction. The control block 400Aa is in an inverted arrangement with the control block 400Ad. The pixel driving unit 413 of the control block 400Aa is provided in the same well region as the pixel driving unit 413 of the control block 400Ad. Also, the signal conversion unit 422 of the control block 400Aa is provided in the same well region as the signal conversion unit 422 of the control block 400Ad.

The control block 400Ad and the control block 400Ae are arranged adjacent to each other in the column direction. The control block 400Ad is in an inverted arrangement with the control block 400Ae. The pixel driving unit 413 and the level shift unit 504 of the control block 400Ad is provided in the same well region as the pixel driving unit 413 and the level shift unit 504 of the control block 400Ae.

As a result of the control blocks 400A being in an inverted arrangement, the imaging element 100 can achieve increased layout efficiency even if the signals are processed in parallel between the control blocks 400A. As a result of a plurality of the control blocks 400A being in an inverted arrangement on the XY plane, the imaging element 100A can have shared well regions between adjacent control blocks 400A. As a result, the number of instances of switching of the well region is decreased and the area efficiency is improved.

Figure 14:
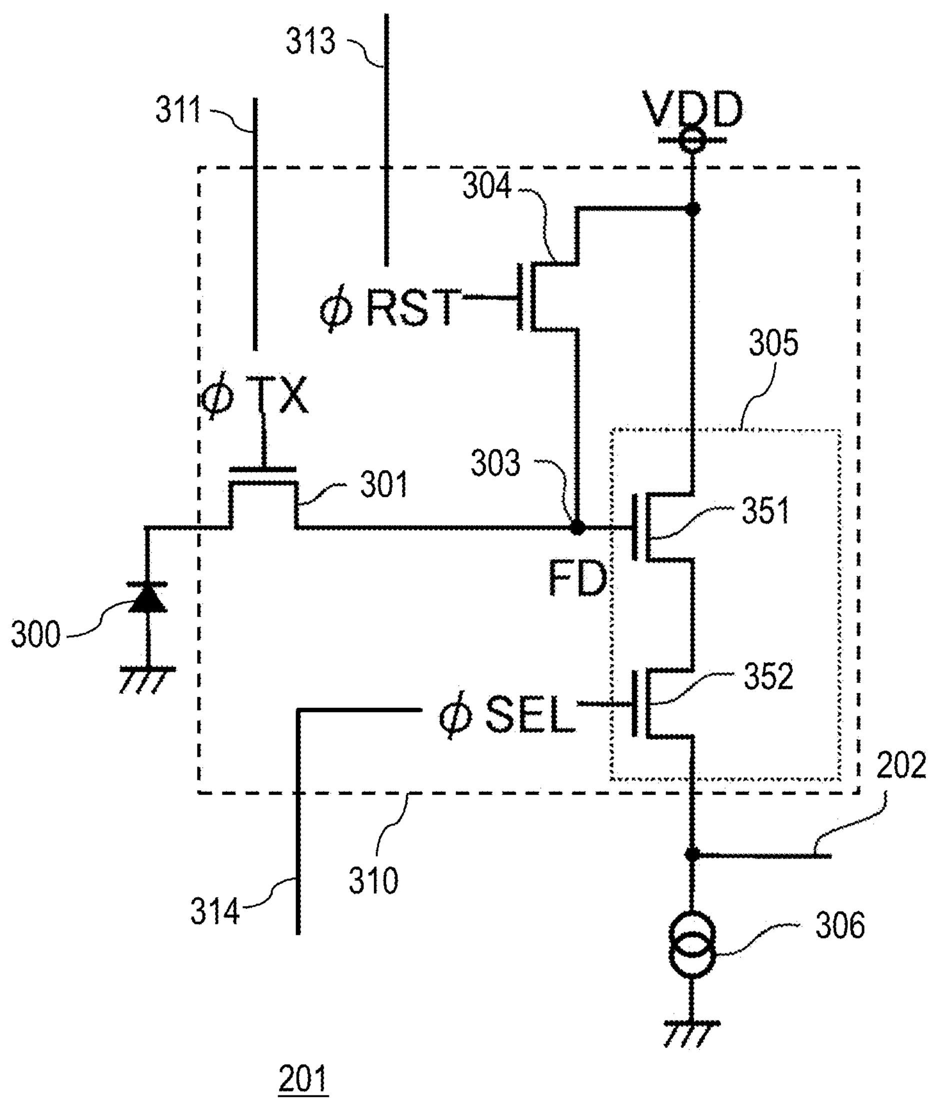
FIG. 14 is a circuit diagram showing another example of a circuit configuration of the pixel.

FIG. 14 is a circuit diagram showing another example of a circuit configuration of the pixel 201. In the pixel 201, components that are the same as those of FIG. 3 are assigned the same reference characters and explanations thereof are omitted. In the pixel 201, the discharge unit 302 provided in the previously described pixel 201 is omitted. If discharging the electric charge accumulated in the photoelectric conversion unit 300 to the power source line to which the power source voltage VDD is supplied, the transfer control signal φTX is inputted to the gate terminal of the transfer unit 301, and the reset control signal φRST is inputted to the gate terminal of the reset unit 304.

Figure 15:
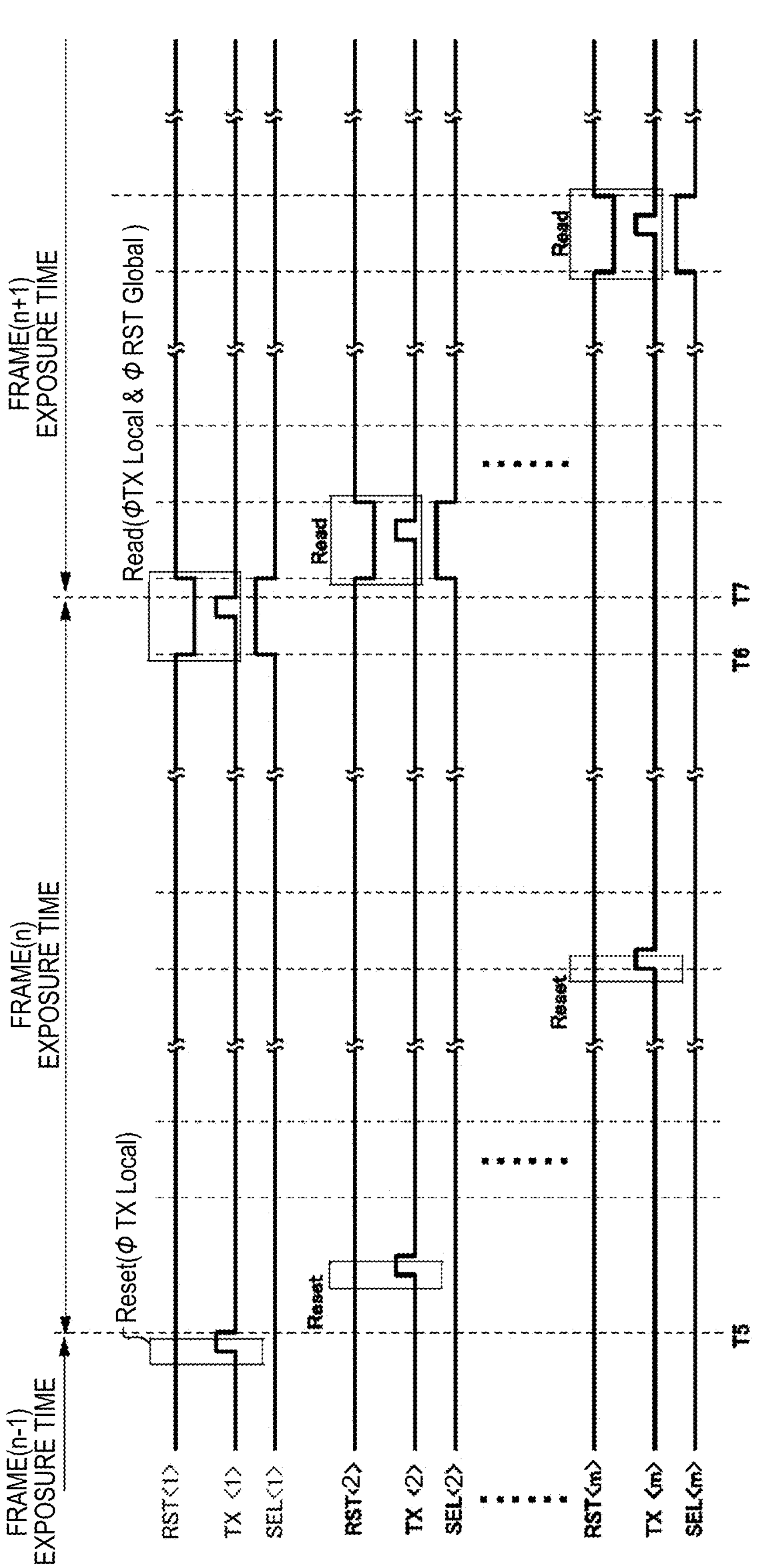
FIG. 15 is a timing chart showing an imaging operation example 3 of the imaging element.

FIG. 15 is a timing chart showing an imaging operation example 3 of the imaging element 100A. FIG. 15 is an imaging operation example by which the pixel 201 shown in FIG. 14 is used and the driving of the imaging element 100A is controlled by the transfer control signal φTX, the reset control signal φRST, and the selection control signal φSEL. This example differs from that of FIG. 12 in that the imaging element 100A controls the start timing of exposure using the transfer control signal φTX. Differences from the FIG. 12 will be described in particular.

The transfer control signal φTX controls the timing at which exposure is started and ended. During a frame (n), exposure is started at the time T5 and exposure is ended at the time T7.

At the exposure start time T5, the transfer control signal φTX falls, thereby starting exposure. In other words, prior to the start time T5 for exposure, the transfer control signal φTX causes the transfer unit 301 to turn ON in a state where the reset control signal φRST is turned ON, resulting in the electric charge accumulated in the photoelectric conversion unit 300 to be discharged, and the fall of the transfer control signal φTX results in the start of exposure. The transfer control signal φTX is a locally controlled signal, and thus, it is also possible to change the timing at which exposure is started for each pixel block 200.

Also, at the exposure end time T7, the transfer control signal φTX falls, thereby ending exposure. In other words, prior to the end time T5 for exposure, the transfer control signal φTX causes the transfer unit 301 to turn ON in a state where the reset control signal φRST is turned OFF, resulting in the electric charge accumulated in the photoelectric conversion unit 300 to be transferred to the FD 303, and the fall of the transfer control signal φTX results in the end of exposure. The transfer control signal φTX is a locally controlled signal, and thus, it is also possible to change the timing at which exposure is ended for each pixel block 200.

The selection control signal φSEL is a signal for selecting a given pixel 201. At the time T6, pixels 201 for which the selection control signal φSEL is set to high output a pixel signal to the signal line 202.

The reset control signal φRST controls the timing of discharge of the electric charge accumulated in the FD 303. The reset control signal φRST may be a globally controlled signal. The reset control signal φRST is set to ON at all times except for the read timing, and thus, no electric charge accumulates in the FD 303. By turning OFF the reset control signal φRST at the read timing and then turning ON the transfer control signal φTX, electric charge is transferred from the photoelectric conversion unit 300 to the FD 303. The reset control signal φRST has the same timing for switching during reading as the selection control signal φSEL, and thus, the same pulse timing as the selection control signal φSEL can be used.

Thus, according to the configuration of the imaging element 100A shown in FIGS. 1 to 15, exposure can be performed for each pixel block 200 constituted of the plurality of pixels 201, with pixel signals from the pixel blocks 200 being read by each control block 400A corresponding to each pixel block 200 and the analog pixel signals being converted to digital signals. Also, the imaging element 100A uses the control blocks 400A provided for each of the pixel blocks 200 to read the pixel signals from the pixel blocks 200 in parallel. Thus, the imaging element 100A can set the exposure time for each pixel block 200 according to the intensity of incident light, and thus, can expand the dynamic range.

Next, using FIGS. 16 to 22, the configuration of an imaging element 100B will be described in which exposure is performed for each pixel block 200 individually, but the pixel signals are sequentially read for each pixel row, and A/D conversion is performed for each pixel column.

Figure 16:
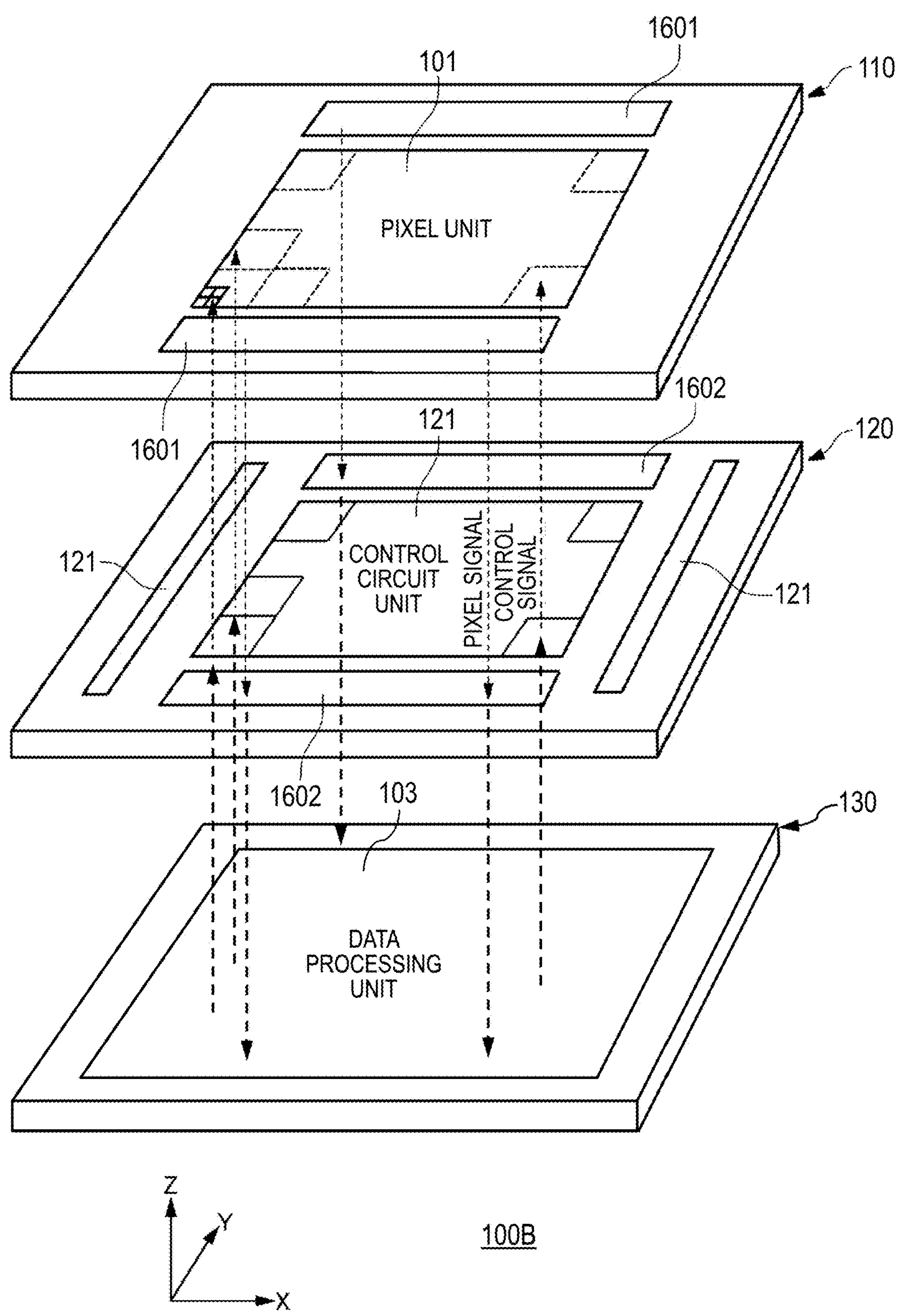
FIG. 16 is an exploded perspective view showing another example of an imaging element.

FIG. 16 is an exploded perspective view showing another example of an imaging element. The imaging element 100B includes a first semiconductor substrate 110, a second semiconductor substrate 120, and a third semiconductor substrate 130. As shown in FIG. 16, the first semiconductor substrate 110 is stacked on the second semiconductor substrate 120, and the second semiconductor substrate 120 is stacked on the third semiconductor substrate 130.

The first semiconductor substrate 110 has a pixel unit 101 and connection regions 1601. The pixel unit 101 outputs pixel signals based on incident light. The connection regions 1601 are disposed to the sides of the pixel unit 101. In the example of FIG. 16, a pair of connection regions 1601 are disposed along two opposing sides of the first semiconductor substrate 110 to the front and rear of the pixel unit 101.

The second semiconductor substrate 120 has a control circuit unit 102, peripheral circuit units 121, and signal processing units 1602.

The control circuit unit 102 outputs, to the pixel unit 101, a control signal for controlling the driving of the pixel unit 101. The control circuit unit 102 is disposed at a position in the second semiconductor substrate 120 opposing the pixel unit 101.

The peripheral circuit units 121 control the driving of the control circuit unit 102. The peripheral circuit units 121 are on the second semiconductor substrate 120 at positions in the periphery of the control circuit unit 102. Also, the peripheral circuit units 121 may be electrically connected to the first semiconductor substrate 110 and control the driving of the pixel unit 101. The peripheral circuit units 121 are disposed along two opposing sides of the second semiconductor substrate 120, but the method for arranging the peripheral circuit units 121 is not limited to this example.

The signal processing units 1602 receive input of an analog pixel signal outputted from the first semiconductor substrate 110. The signal processing units 1602 perform signal processing of the pixel signals. The signal processing units 1602 perform processing to convert the analog pixel signals to digital signals, for example. The signal processing units 1602 may perform other signal processes. Examples of other signal processes include noise removal processing such as analog or digital correlated double sampling (CDS). The signal processing units 1602 are provided in the periphery, or in other words, the outer sides of the control circuit unit 102. In the example of FIG. 16, a pair of signal processing units 1602 are disposed along two opposing sides of the second semiconductor substrate 120 to the front and rear of the control circuit unit 102. The signal processing units 1602 may be circuits included in the peripheral circuit units 121.

The third semiconductor substrate 130 has a data processing unit 103. The data processing unit 103 uses digital data outputted from the second semiconductor substrate 120 to perform addition, thinning, and other types of image processing.

Figure 17:
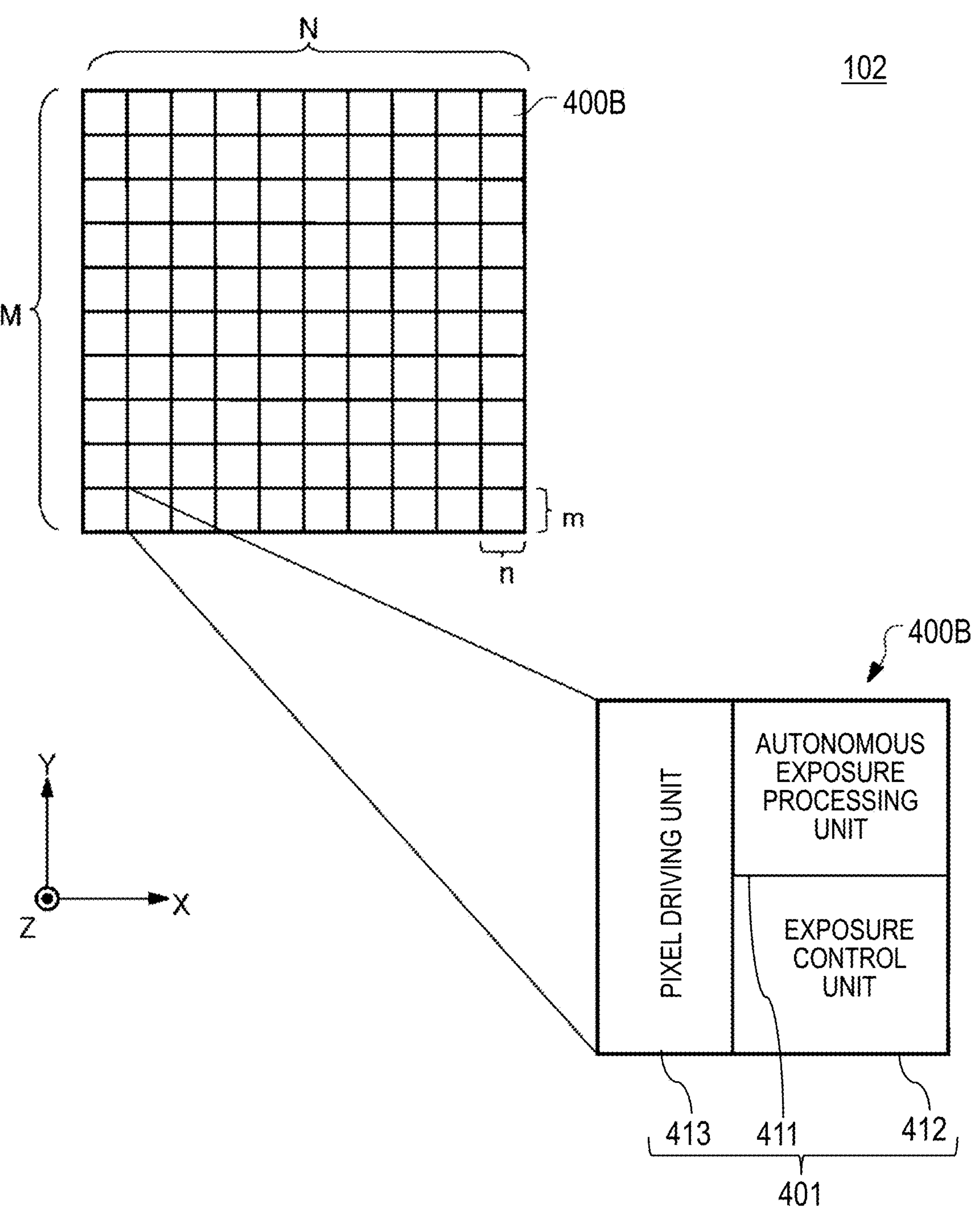
FIG. 17 is a descriptive view showing another example of a specific configuration of the control circuit unit.

FIG. 17 is a descriptive view showing another example of a specific configuration of the control circuit unit 102. In FIG. 17, the control block 400A has a pixel control unit 401 (autonomous exposure processing unit 411, exposure control unit 412, and pixel driving unit 413) but does not have the signal processing unit 402.

Instead of providing one control block 400B for each pixel block 200, one control block 400B may be provided for N (N being a natural number of 2 or greater) pixel blocks 200. The N pixel blocks 200 corresponding to each pixel block are sometimes collectively referred to as a pixel block group. For example, one control block 400B may be provided to correspond to two pixel blocks 200 arranged along the column direction as one pixel block group. In this case, the control block B may control the exposure time of the pixel blocks 200 individually.

In addition, the control block 400B is electrically connected to at least one pixel block 200, and is the minimum unit for a circuit that controls the exposure of the pixels 201 of the at least one pixel block 200.

Figure 18:
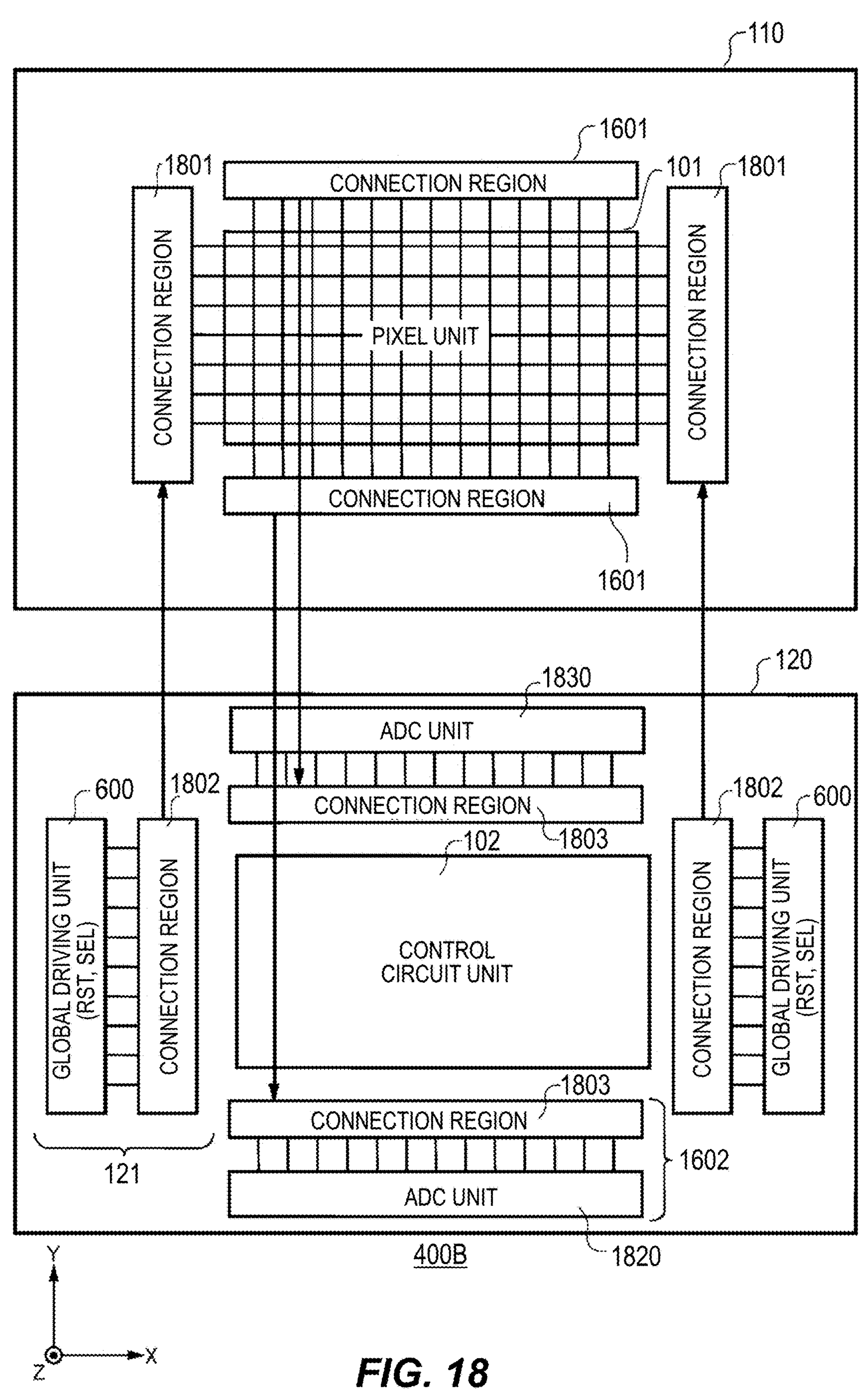
FIG. 18 is a descriptive view showing a connective relationship between the first semiconductor substrate and the second semiconductor substrate in the imaging element.

FIG. 18 is a descriptive view showing a connective relationship between the first semiconductor substrate 110 and the second semiconductor substrate 120 in the imaging element 100B. The first semiconductor substrate 110 includes connection regions 1801 that are provided in the periphery of the pixel unit 101 and that are electrically connected to the pixel unit 101, and connection regions 1601. The second semiconductor substrate 120 includes connection regions 1802 that are provided in the periphery of the control circuit unit 102 and that are electrically connected to the control circuit unit 102, and connection regions 1803.

The pair of connection regions 1801 are respectively connected to the pair of connection regions 1802 at opposing positions thereto. The connection regions 1801 and the connection regions 1802, which are connected to each other, input control signals from the global driving unit 600 to the pixel unit 101 using global control lines.

The pair of connection regions 1601 are respectively connected to the pair of connection regions 1803 at opposing positions thereto. The connection regions 1601 and the connection regions 1803, which are connected to each other, input pixel signals from the pixel unit 101 to an ADC unit 1820 and an ADC unit 1830 corresponding thereto using shared signal lines.

Figure 19:
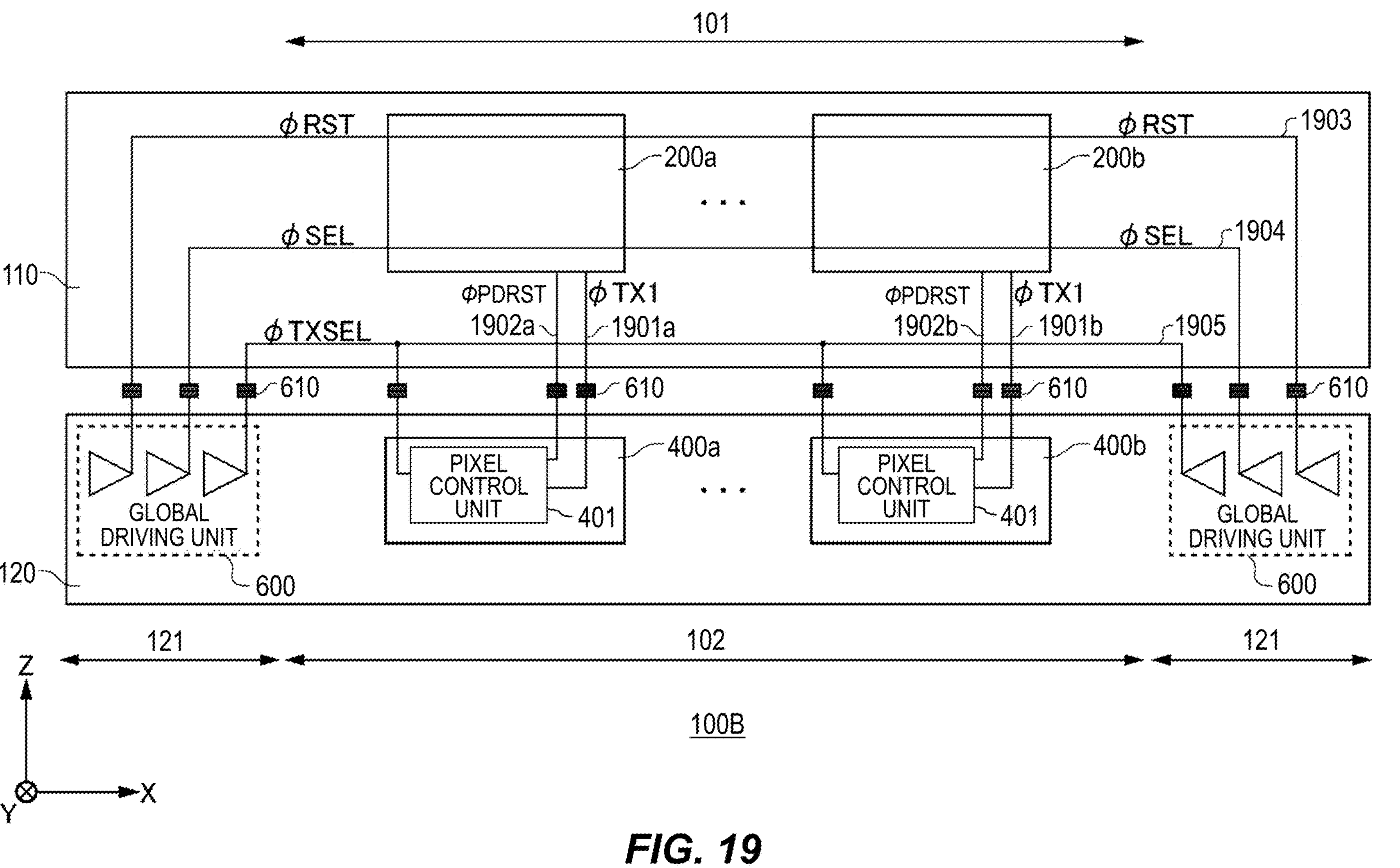
FIG. 19 is a descriptive view showing a transmission example for signals between the first semiconductor substrate and the second semiconductor substrate in the imaging element.

FIG. 19 is a descriptive view showing a transmission example for signals between the first semiconductor substrate 110 and the second semiconductor substrate 120 in the imaging element 100B. The global driving unit 600 outputs a reset control signal φRST, a selection control signal φSEL, and a transfer selection control signal φTXSEL. The global driving unit 600 is connected to a reset control line 1903 and a selection control line 1904 that output signals to the respective pixel blocks 200. The global driving unit 600 supplies the reset control signal φRST to the plurality of pixel blocks 200 via the reset control line 1903, and supplies the selection control signal φSEL via the selection control line 1904. The global driving unit 600 supplies the transfer selection control signal φTXSEL to the plurality of control blocks 400B via a transfer selection control line 1905.

The transfer selection control signal φTXSEL is supplied from the global driving unit 600 to the control block 400B in order to control the exposure time for each pixel block 200. The control block 400B to which the transfer selection control signal φTXSEL was supplied outputs the transfer selection control signal φTXSEL to the corresponding pixel block 200. The pixel block 200 determines whether to input, to the pixels 201, the transfer selection control signal φTXSEL as the transfer control signal φTX or the discharge control signal φPDRST. As a result, the input of the transfer control signal φTX or the discharge control signal φPDRST to the pixels 201 is skipped.

If the transfer control signal φTX determines the end time for exposure, for example, then the control block 400B extends the exposure time by skipping the transfer control signal φTX. If the transfer control signal φTX determines the start time for exposure, then the control block 400B can shorten the exposure time by skipping the transfer control signal φTX. In this manner, the transfer selection control signal φTXSEL can be used to adjust the exposure time of the pixel block 200. This similar applies to cases in which the discharge control signal φPDRST determines the start time or the end time for exposure.

The reset control line 1903, the selection control line 1904, and the transfer selection control line 1905 are globally wired, or in other words, shared by the plurality of pixel blocks 200. The reset control line 1903, the selection control line 1904, and the transfer selection control line 1905 are wired so as to cross the pixel unit 101 in the row direction. The reset control line 1903, the selection control line 1904, and the transfer selection control line 1905 may alternatively be wired so as to cross the pixel unit 101 in the column direction.

The reset control line 1903 is connected to the gate terminals of the reset units 304 of the pixel block 200 and supply thereto the reset control signal φRST. The selection control line 1904 is connected to the gate terminals of the selection units 352 of the pixel block 200 and supply thereto the selection control signal φSEL. Also, the transfer selection control line 1905 is connected to the plurality of control blocks 400B and supplies the transfer selection control signal φTXSEL to the pixel control unit 401.

The global driving unit 600 outputs the transfer selection control signal φTXSEL from the second semiconductor substrate 120 to the first semiconductor substrate 110, but may output the transfer selection control signal φTXSEL to the control block 400B without supplying the same to the first semiconductor substrate 110. In this case, the transfer selection control line 1905 is provided to the second semiconductor substrate 120.

Meanwhile, a transfer control line 1901*a* and a discharge control line 1902*a* are connected to a pixel block 200*a*. The transfer control line 1901*a* is connected to the gate terminals of the transfer units 301 provided to the pixel block 200*a*. The transfer control line 1901*a* supplies the transfer control signal φTX outputted from a control block 400Ba to the pixel block 200*a*. The discharge control line 1902*a* is connected to the gate terminals of the discharge units 302 provided to the pixel block 200*a*. The discharge control line 1902*a* supplies the discharge control signal φPDRST outputted from the control block 400Ba to the pixel block 200*a*.

A transfer control line 1901*b* and a discharge control line 1902*b* are connected to a pixel block 200*b*. The transfer control line 1901*b* is connected to the gate terminals of the transfer units 301 provided to the pixel block 200*b*. The transfer control line 1901*b* supplies the transfer control signal φTX outputted from a control block 400Bb to the pixel block 200*b*. The discharge control line 1902*b* is connected to the gate terminals of the discharge units 302 provided to the pixel block 200*b*. The discharge control line 1902*b* supplies the discharge control signal φPDRST outputted from the control block 400Bb to the pixel block 200*b*.

A plurality of junction units 610 are provided at a junction surface at which the first semiconductor substrate 110 and the second semiconductor substrate 120 are joined. The junction units 610 of the first semiconductor substrate 110 are position-matched with the junction units 610 of the second semiconductor substrate 120. The opposing plurality of junction units 610 are joined by a pressurization treatment or the like between the first semiconductor substrate 110 and the second semiconductor substrate 120, and are electrically connected to each other. In this case, the junction units 610 of global control lines may be disposed below the corresponding pixel blocks 200 or may be present in the connection regions 1801 and the connection regions 1802. Meanwhile, the junction units 610 of local control lines are provided below the corresponding pixel blocks 200 (which is also above the control blocks 400B).

The imaging element 100B changes the timing of the transfer unit 301 and/or the discharge unit 302 using local control lines, thereby controlling the exposure time for each pixel block 200. The imaging element 100B can control the exposure time with fewer control lines by combining local control lines with global control lines.

Figure 20:
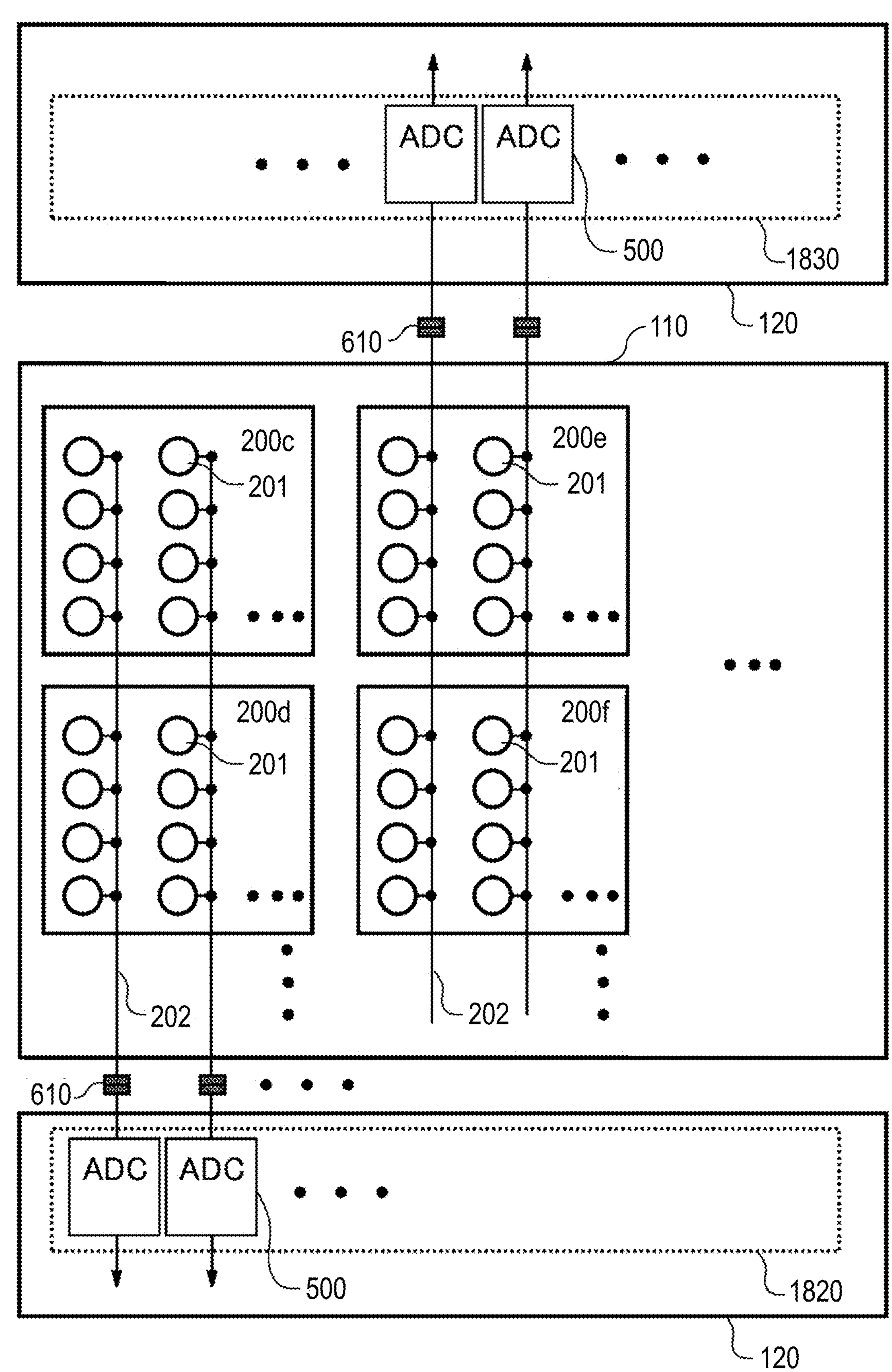
FIG. 20 is a descriptive view showing a connective relationship between ADC units and pixel blocks.

FIG. 20 is a descriptive view showing a connective relationship between ADC units and pixel blocks. As shown in FIG. 20, a shared signal line 202 extending in the column direction is disposed for each column in the pixel block 200*c*. This signal line 202 is also common to a plurality of pixel blocks 200*c* and 200*d* that are arranged in the column direction. Thus, in this example, m×M pixels 201 arranged in a column are connected to each signal line 202, and pixel signals are outputted from these pixels 201.

Each of the signal lines 202 is connected via the junction unit 610 to an ADC 2000 on the second semiconductor substrate 120. The plurality of ADCs 2000 corresponding to the plurality of signal lines 202 constitute the ADC unit 1820.

In the example of FIG. 20, the ADCs 2000 corresponding to pixel blocks 200*c* and 200*d* in odd-numbered columns are provided to the ADC unit 1820, and the ADCs 2000 corresponding to pixel blocks 200*e* and 200*f* in even-numbered columns are provided to the ADC unit 1830. However, the arrangement relationship between the pixel block 200*c* and the like and the corresponding ADC 1820 and the like is not limited thereto.

By this configuration, the respective ADCs 2000 convert the pixel signals sequentially outputted from the m×M pixels 201 in a connected column into digital signals and output the digital signals. In this case, the ADC units 1820 and 1830 overall convert, in a parallel fashion, the pixel signals outputted from the pixels 201 arranged in n×N columns in the row direction into digital signals. From this perspective, this digital conversion can be said to be one type of so-called column ADCs. Single slope ADCs are an example of ADCs here, but other digital conversion modes may be employed. The connecting position between the pixels 201 and the signal line 202 is not limited to the aspect shown in FIG. 20, and as another example, may be inside each of the pixel blocks 200*c* or the like.

Figure 21:
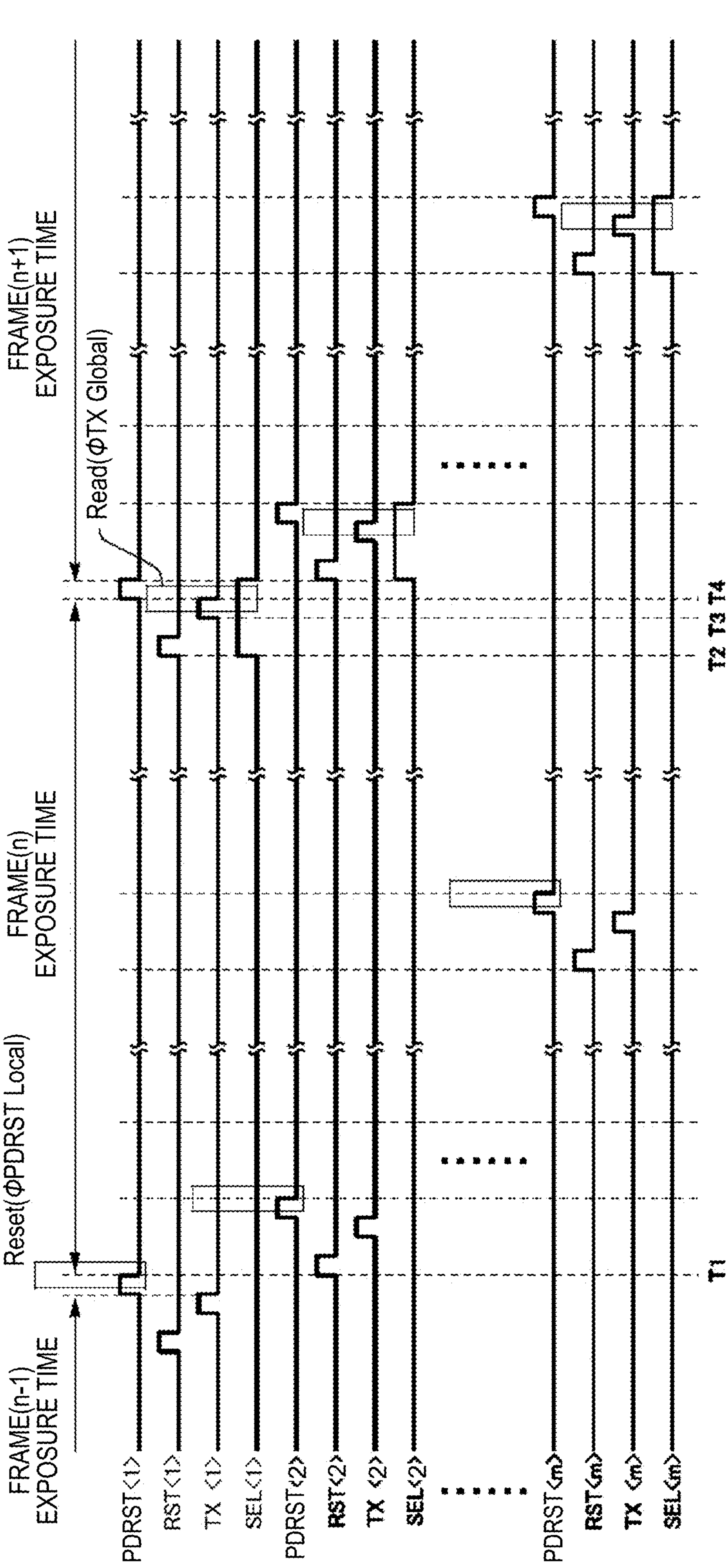
FIG. 21 is a timing chart showing an imaging operation in the pixel block of the imaging element.

FIG. 21 is a timing chart showing an imaging operation in the pixel block 200 of the imaging element 100B. The driving of the pixel blocks 200 is controlled by the transfer control signal φTX, the discharge control signal φPDRST, the reset control signal φRST, and the selection control signal φSEL.

The discharge control signal φPDRST controls the timing at which exposure is started. The exposure start timing corresponds to the fall timing of the discharge control signal φPDRST (e.g., time T1). In other words, prior to the start time T1 for exposure, the discharge control signal φPDRST causes the discharge unit 302 to turn ON, resulting in the electric charge accumulated in the photoelectric conversion unit 300 to be discharged, and the fall of the discharge control signal φPDRST results in the start of exposure. The discharge control signal φPDRST is locally controlled, and thus, it is possible to adjust the exposure time for each pixel block 200.

The transfer control signal φTX controls the timing at which exposure is ended. At the time T3, the transfer control signal φTX turns ON the transfer unit 301, thereby transferring the accumulated electric charge in the photoelectric conversion unit 300 to the FD 303. The exposure end timing corresponds to the fall timing of the transfer control signal φTX (e.g., time T4).

The reset control signal φRST controls the timing of discharge of the electric charge accumulated in the FD 303. At the time T2, the reset control signal φRST turns ON the reset unit 304, thereby discharging the electric charge of the FD 303. By discharging the electric charge in the FD 303 prior to the exposure end timing, it is possible to mitigate the effect of electric charge remaining in the FD 303 when the electric charge is transmitted from the photoelectric conversion unit 300.

The selection control signal φSEL is a signal for selecting a given pixel 201. The selection control signal φSEL controls the selection unit 352 so as to be ON or OFF. At the time T2, the selection control signal φSEL is set to high. At the time T3, pixels 201 for which the selection control signal φSEL is set to high output a pixel signal to the signal line 202 as the transfer control signal φTX turns ON. Meanwhile, no pixel signal is outputted from pixels 201 for which the selection control signal φSEL is not set to high.

The imaging element 100B locally controls the discharge control signal φPDRST to change the exposure start timing for each pixel block 200, thereby enabling control of the exposure time for each pixel block 200. Also, the imaging element 100B may locally control the transfer control signal φTX, thereby enabling control of the exposure end timing for each pixel block 200. Also, the imaging element 100B may locally control both the transfer control signal φTX and the discharge control signal φPDRST, thereby enabling control of both the start timing and end timing of exposure for each pixel block 200.

The pixel signals of the pixels 201 correspond to the quantity of electric charge accumulated in the photoelectric conversion units 300. Thus, controlling the exposure timings of the pixels 201 entails controlling the timings at which the photoelectric conversion units 300 accumulate the electric charge. More specifically, controlling the exposure timings of the pixels 201 entails controlling the timings and lengths of the electric charge accumulation time from discharge to transfer of the electric charge.

Figure 22:
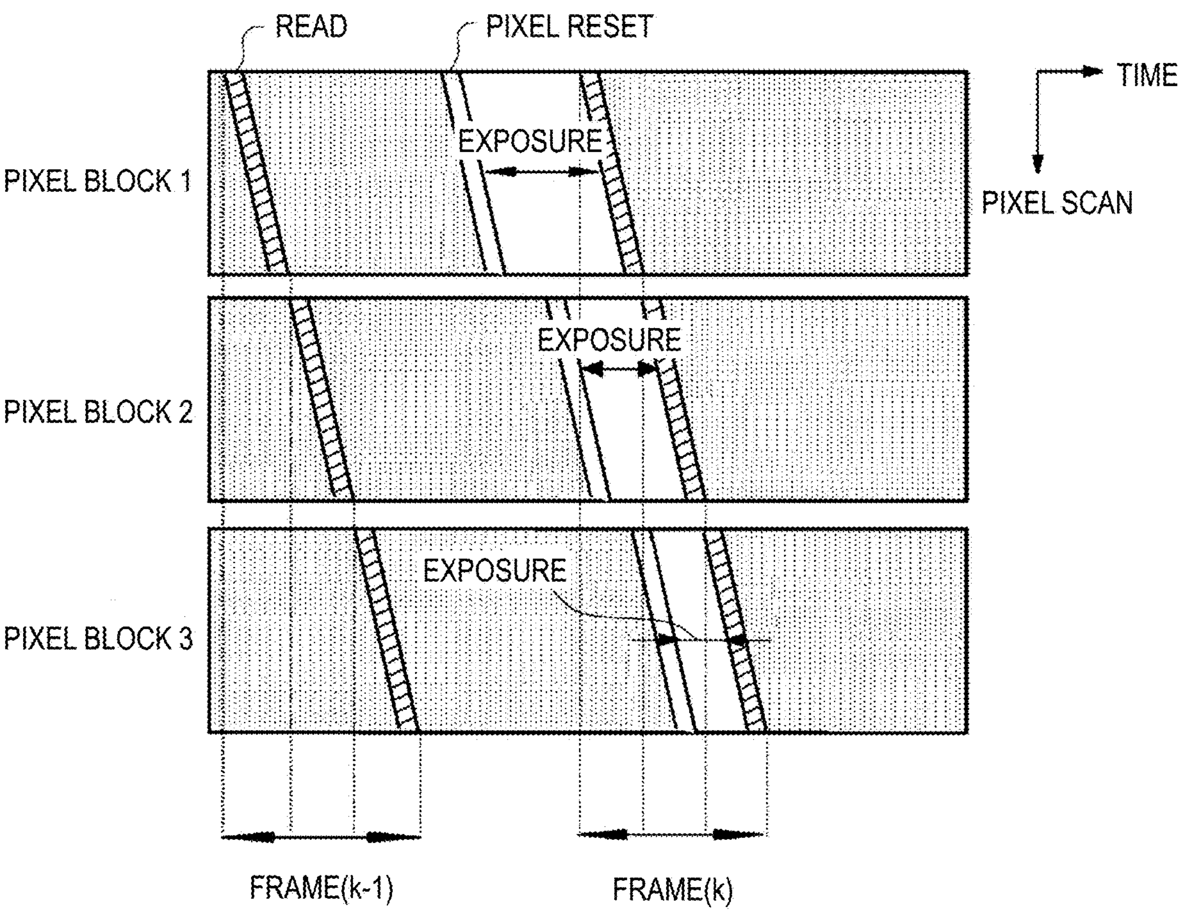
FIG. 22 is a descriptive diagram showing an example of an exposure timing of each pixel block.

FIG. 22 is a descriptive diagram showing an example of an exposure timing of each pixel block 200. The exposure time is controlled for each of the three pixel blocks 200 arranged in a column. Here, the imaging element 100B offsets the pixel reset times of the respective pixel blocks 200, thereby changing the exposure amount.

Meanwhile, the read timings for the pixel signals are in sequence from the topmost pixel block 200. In other words, the pixel signals are read from pixels 201 of a "pixel block 1," pixel signals are read from pixels 201 of a "pixel block 2," and then pixel signals are read from pixels 201 of a "pixel block 3."

Additionally, even in the pixel block 200, as described with reference to FIG. 21, the pixel signals are sequentially read from pixels 201 starting in the top row. Thus, in the pixel unit 101 overall, pixel signals are read in sequence from the top row of the m×M pixels 201 in the same column connected to the same signal line 202. In other words, the global driving unit 600 covers a plurality of pixel blocks 200 arranged in a row from the 1st row to the m×Mth row in setting the selection control signal φSEL to high, one row at a time.

In this case, as described in FIG. 20, for the plurality of pixel blocks 200 arranged in a row, the same selection control line 1904 is connected to the n×N pixels arranged in the same row. Thus, pixel signals are read in parallel from the n×N pixels 201 connected in a row for which the selection control signal φSEL is set to high. As a result, it is possible to output an entire frame of pixel signals.

These pixel signals are, as described with reference to FIG. 20, converted to digital signals by the ADC units 1820 and 252. The pixel signals converted to digital signals are outputted to the next stage of image processing, thereby forming one frame of image.

As described above, the reading of the pixel signals is conducted sequentially from the top row of the same column among the plurality of pixel blocks 200, and from that perspective, the read method of the present embodiment can be said to be the so-called rolling shutter mode in the pixel unit 101 overall. However, even in such a case, different exposure times can be set for each pixel block 200.

In this manner, the imaging element 100B shown in FIGS. 16 to 22 performs exposure for each pixel block 200 individually, but the pixel signals are sequentially read for each pixel row, and A/D conversion is performed for each pixel column. Specifically, the imaging element 100B reads the pixel signals from the pixels 201 of the top pixel block 200 among the plurality of pixel blocks 200 arranged in a column, and then reads the pixel signals from pixels 201 in the pixel block 200 therebelow. Thus, distortions in the image resulting from the read order when capturing a moving subject are smoothed, and it is possible to display images with a more natural appearance to the viewer. More specifically, if a moving subject is read in parallel from the plurality of pixel blocks 200 arranged in a column, a plurality of stair-like shapes corresponding to the individual pixel blocks 200 forming a jagged edge appear in the vertical direction (i.e., the column direction of the pixels) of the image, resulting in an unnatural appearance to the viewer. By contrast, in the imaging element 100B shown in FIGS. 16 to 22, the plurality of stair-like shapes do not appear in the image.

The imaging element 100B shown in FIGS. 16 to 22 is not provided with ADC units, inside the control block 400B, that convert the analog signals to digital signals, and has signal processing units 1602 disposed outside of the control circuit unit 102. Thus, it is possible to reduce the area of the control block 400B, and reduce the size of the pixel blocks 200 disposed at positions corresponding to the control block 400B, or in other words, to perform exposure control by the control block 400B of fewer pixels. As a result, it is possible to perform precise exposure time control within the image, allowing for the boundaries between the pixel blocks 200 not to be conspicuous within the image. Additionally, it is possible to prevent the effect of noise on the pixels 201 resulting from heating, since digital conversion is not performed directly below the pixels 201.

Thus, the signal processing units 1602 need not be provided at a plurality of distant regions, and may instead be provided in one region for the overall pixel unit 101.

As described above, similar to the imaging element 100A, the reading of the pixel signals is conducted sequentially from the top row of the same column among the plurality of pixel blocks 200, and from that perspective, the read method of the imaging element 100B can also be said to be the so-called rolling shutter mode in the pixel unit 101 overall. However, like the imaging element 100A, even in such a case, different exposure times can be set for each pixel block 200. Thus, like the imaging element 100A, in the imaging element 100B as well, distortions in the image resulting from the read order when capturing a moving subject are smoothed, and it is possible to display images with a more natural appearance to the viewer.

[Autonomous Exposure Processing Unit 411]

Next, details regarding the above-mentioned autonomous exposure processing unit 411 will be described. In the description below, if not distinguishing between the imaging elements 100A and 100B, the reference character 100 is used for the imaging element, and if not distinguishing between the control blocks 400A and 400B, the reference character 400 is used for the control block.

As indicated in FIGS. 4 and 17, the autonomous exposure processing unit 411 is mounted in the control block 400. Alternatively, the autonomous exposure processing unit 411 can be mounted in the peripheral circuit units 121 instead of the control block 400, or can be mounted in both the control block 400 and the peripheral circuit units 121. Below, these three patterns will be described with reference to FIGS. 23 to 25.

Figure 23:
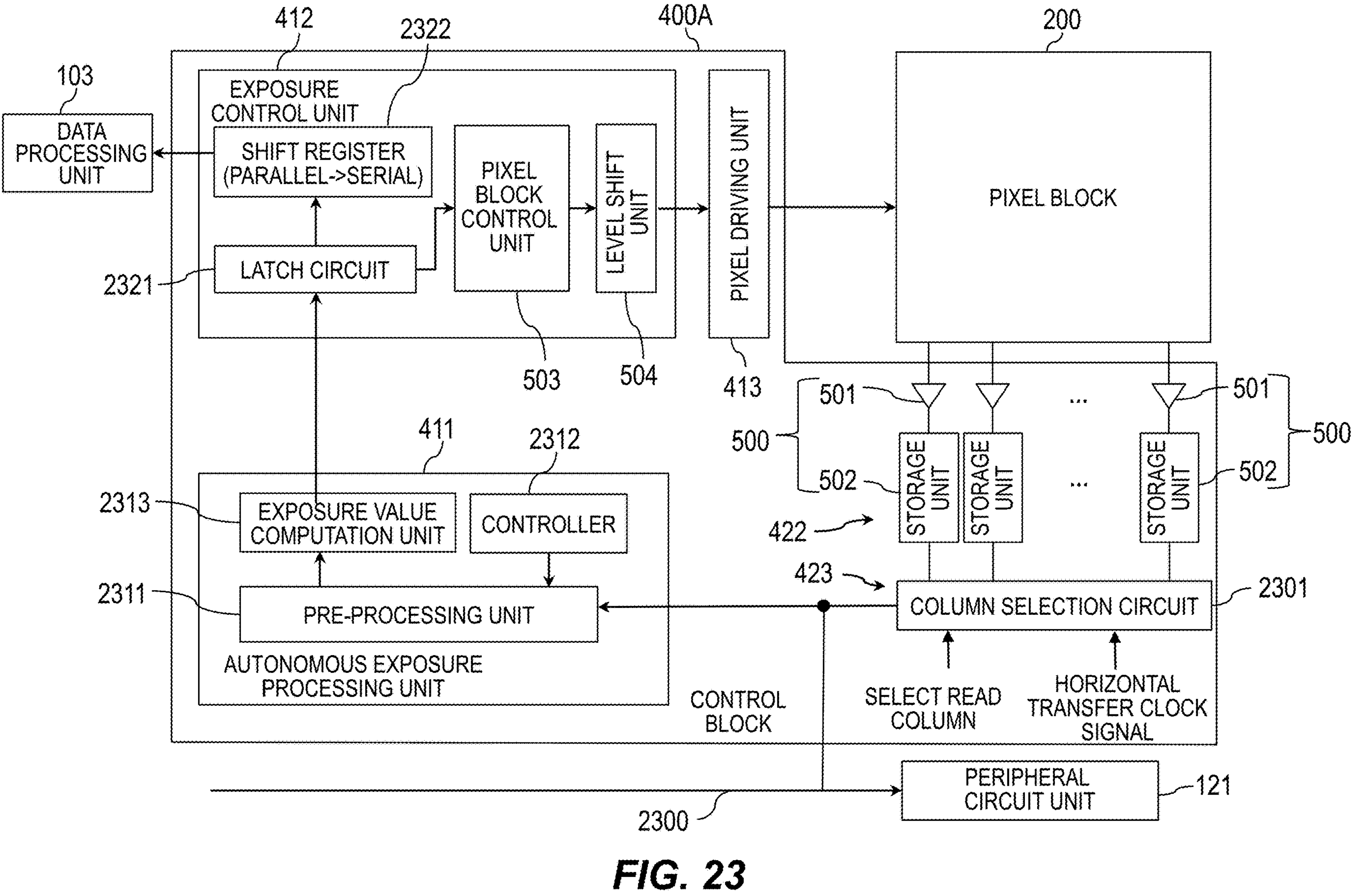
FIG. 23 is a block diagram showing a configuration example of an autonomous exposure control mode 1.

FIG. 23 is a block diagram showing a configuration example of an autonomous exposure control mode 1. The autonomous exposure control mode 1 is a configuration example in which the autonomous exposure processing unit 411 is mounted in the control block 400. As a result of the autonomous exposure processing unit 411 being added inside the control block 400, the circuit size of the control block 400 increases, but the size of each pixel 201 in the pixel block 200 correspondingly increases, and thus, it is possible to increase the light reception area.

Figure 25:
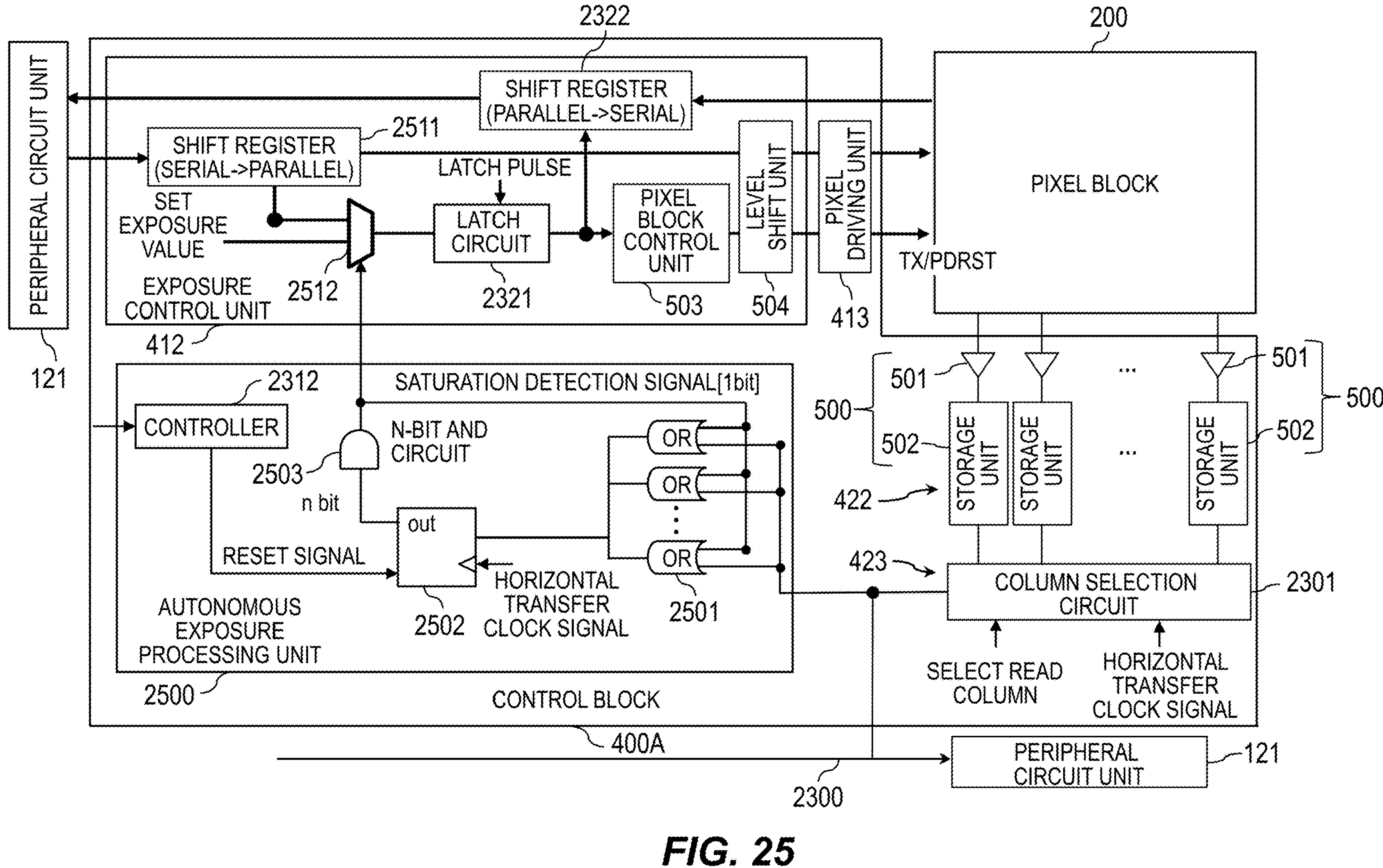
FIG. 25 is a block diagram showing a configuration example of an autonomous exposure control mode 3.

In FIG. 23, the control block 400A is the described example (similarly applies to FIG. 25). The control block 400A has the signal conversion unit 422, the signal output unit 423, the autonomous exposure processing unit 411, the exposure control unit 412, and the pixel driving unit 413. For ease of description, the signal input unit 421 is omitted. In the case of the control block 400B, the signal input unit 421, the signal conversion unit 422, and the signal output unit 423 are not included in the control block 400B, and are disposed on the second semiconductor substrate 120 as the signal processing unit 1602 (similarly applies to FIG. 25).

The signal conversion unit 422 has n ADCs 500. Each of the n ADCs 500 converts the analog pixel signals from the m pixels 201 connected to each other in the column direction to digital signals. The ADC 500 is constituted of a comparator 501 and a storage unit 502.

A column selection circuit 2301 is included in the signal output unit 423. The column selection circuit 2301 sequentially selects the columns of the pixel block 200 every time a read column selection signal is inputted from the outside. The column selection circuit 2301 outputs the digital pixel signals from the m pixels 201 in the selected column to the peripheral circuit unit 121 via a horizontal transfer line 2300 and also outputs the digital pixel signals to the autonomous exposure processing unit 411 every time a horizontal transfer clock signal is inputted from the outside.

The autonomous exposure processing unit 411 calculates the exposure value indicating the exposure time of the pixel block 200. Specifically, for example, the autonomous exposure processing unit 411 has a pre-processing unit 2311, a controller 2312, and an exposure value computation unit 2313.

The pre-processing unit 2311 acquires digital pixel signals for each pixel column of the pixel block 200 from the column selection circuit 2301. Then, the pre-processing unit 2311 calculates a statistical value for the acquired pixel signals (e.g., the mean, medium, maximum, or minimum). The pre-processing unit 2311 outputs this calculation result to the exposure value computation unit 2313.

The controller 2312 inputs the reset signal to the pre-processing unit 2311 to reset the pre-processing by the pre-processing unit 2311. As a result, the pre-processing unit 2311 calculates the statistical value of the pixel signals from the pixel block 200 for every reset, or in other words, every frame.

The exposure value computation unit 2313 determines the next exposure value on the basis of the calculation result from the pre-processing unit 2311 (the statistical value of the pixel signal). Specifically, for example, the exposure value computation unit determines the next exposure value on the basis of the calculation result to prevent underexposure or overexposure. The exposure value computation unit 2313 retains a first threshold and a second threshold, for example. The first threshold is for determining whether the calculation result indicates an underexposure. The second threshold is greater than the first threshold, and is for determining whether the calculation result indicates an overexposure.

The exposure value computation unit 2313 determines whether the calculation result is within a range from the first threshold to the second threshold. If the calculation result is within the range from the first threshold to the second threshold, then the exposure value computation unit outputs the calculation result as the exposure value to a latch circuit 2321 of the exposure control unit 412. If the calculation result is less than the first threshold, then the exposure value computation unit 2313 outputs the first threshold as the exposure value to the latch circuit 2321 of the exposure control unit 412. If the calculation result exceeds the second threshold, then the exposure value computation unit outputs the second threshold as the exposure value to the latch circuit 2321 of the exposure control unit 412.

Also, the exposure value computation unit 2313 may retain a plurality of different exposure value ranges. In such a case, if the calculation result is within the range from the first threshold to the second threshold, then the exposure value computation unit 2313 outputs a number indicating the exposure value range that includes the calculation result as the exposure value to the latch circuit 2321 of the exposure control unit 412.

If the calculation result is less than the first threshold, then the exposure value computation unit 2313 outputs a number indicating one or more ranges above the exposure value range including the calculation result as the exposure value to the latch circuit 2321 of the exposure control unit 412. If the calculation result exceeds the second threshold, then the exposure value computation unit 2313 outputs a number indicating one or more ranges below the exposure value range that includes the calculation result as the exposure value to the latch circuit 2321 of the exposure control unit 412.

The exposure control unit 412 has the latch circuit 2321, a shift register 2322, a pixel block control unit, and a level shift unit, for example. The latch circuit 2321 retains the exposure value from the autonomous exposure processing unit. The latch circuit 2321 outputs the retained exposure value to the pixel block control unit and the shift register 2322 every time a latch pulse is inputted from the outside.

The shift register 2322 performs parallel/serial conversion of the exposure value from the latch circuit 2321 and outputs the resulting exposure value as a serial signal to the data processing unit.

When the exposure time is calculated in an external system outside of the imaging element 100 and the calculation result is fed back to the imaging element 100, it takes more time for the calculation result to be reflected in the exposure time of the imaging element 100, and power consumption is also increased. By contrast, by providing the autonomous exposure processing unit 411 in the control block 400, it is possible to improve the speed at which the calculation result is reflected in the exposure time of the pixel block 200 and to reduce power consumption.

In FIG. 23, a case was described in which one control block 400 performed exposure control on each pixel block 200, but if the one control block 400 performs exposure control on a plurality of pixel blocks 200, the autonomous exposure processing unit 411 may sequentially select each pixel block 200 from the plurality of pixel blocks 200 in synchronization with the reset signal to calculate the exposure value. A selector is provided on the output side of the exposure value computation unit 2313, and the controller 2312 outputs to the selector a selection signal that selects each of the plurality of pixel blocks 200.

In this case, the exposure control unit 412 has a latch circuit 2321 and a shift register 2322 for each pixel block 200. Each latch circuit 2321 is connected to a selector (not shown) within the autonomous exposure processing unit 411, and upon receiving input of the exposure value from the selector, outputs the retained exposure value to the pixel block control unit 503 and the shift register 2322 every time a latch pulse is inputted. As a result, it is possible to realize autonomous exposure even when one control block 400 performs exposure control on a plurality of pixel blocks 200.

Figure 24:
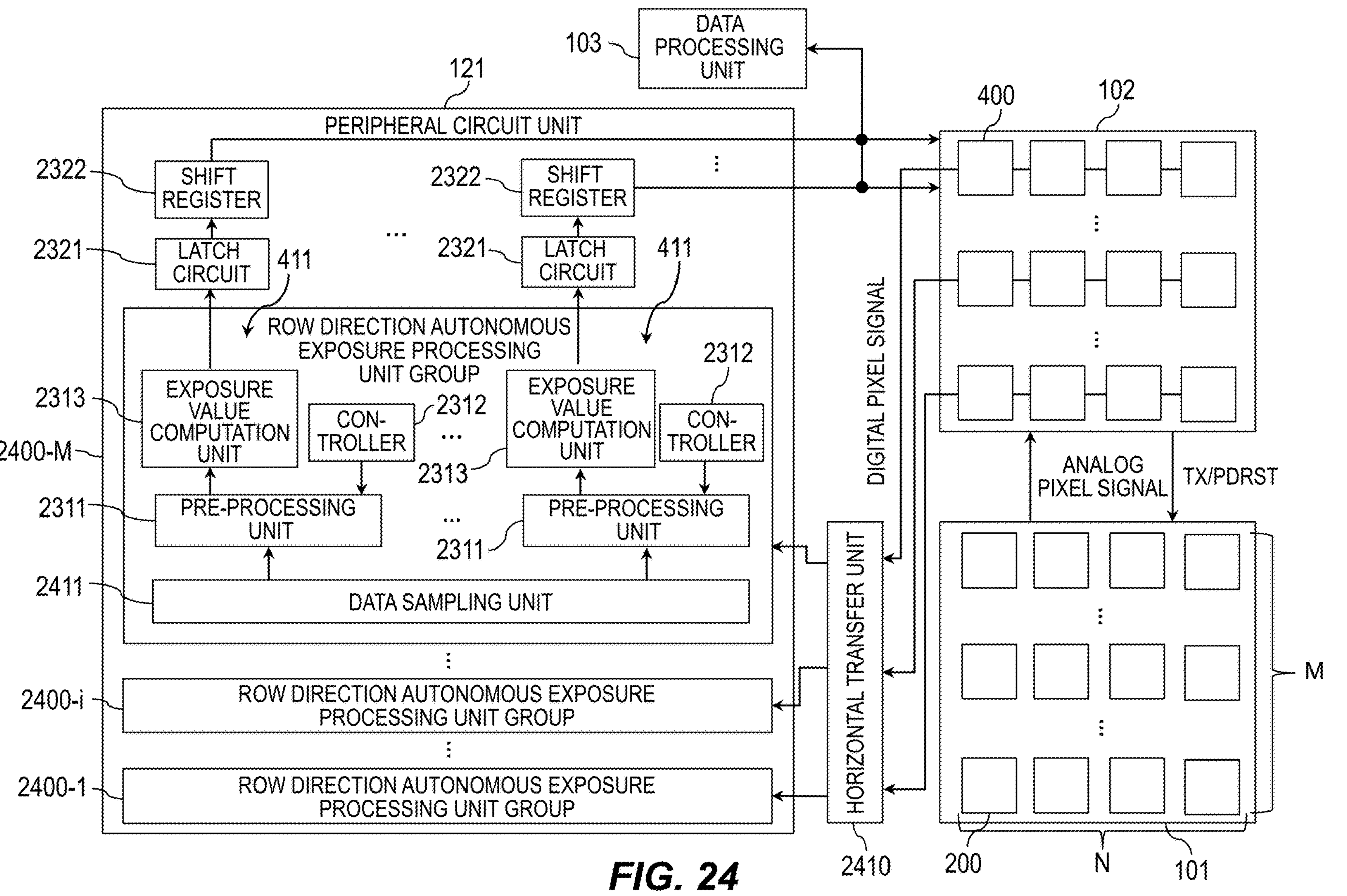
FIG. 24 is a block diagram showing a configuration example of an autonomous exposure control mode 2.

FIG. 24 is a block diagram showing a configuration example of an autonomous exposure control mode 2. The autonomous exposure control mode 2 is a configuration example in which the autonomous exposure processing unit 411 is mounted in the peripheral circuit unit 121. The autonomous exposure processing unit 411 is mounted in the peripheral circuit unit 121 instead of inside the control block. Thus, compared to FIG. 23, the control block 400 can have a smaller circuit size.

The peripheral circuit unit 121 is connected to the pixel unit 101 via a horizontal transfer unit 2410. The horizontal transfer unit 2410 is connected to each pixel block 200 (hereinafter referred to as the pixel block row) arranged in the row direction, and transfers the pixel signals for each pixel block row to the peripheral circuit unit 121. The pixel unit 101 is a collection of M rows by N columns of pixel blocks 200, and thus, the horizontal transfer unit 2410 transfers the pixel signals for each row of M pixel blocks to the peripheral circuit unit 121.

The peripheral circuit unit 121 has row direction autonomous exposure processing unit groups 2400-1 to 2400-M (if not distinguishing therebetween, these are simply referred to as the row direction autonomous exposure processing unit group 2400) for each pixel block. The row direction autonomous exposure processing unit group 2400 has a data sampling unit 2411 and an autonomous exposure processing unit 411 (pre-processing unit 2311, controller 2312, and exposure value computation unit 2313) for N columns of the pixel block. In FIG. 24, N=4, and thus, there are four sets of pre-processing units 2311, controllers 2312, and exposure value computation units 2313.

The data sampling unit 2411 subdivides the pixel signal array of pixel block rows from the horizontal transfer unit 2410 into N equal parts. The data sampling unit 2411 outputs the sampled pixel signal arrays to the corresponding pre-processing units 2311.

As described above, the pre-processing unit 2311 calculates the statistical values of the pixel signals from the corresponding pixel blocks 200. Also, the peripheral circuit unit 121 can be formed at a larger circuit size than the control block 400, and thus, the pre-processing unit 2311 can execute other processes besides calculating the statistical values of the pixel signals.

If, for example, the pre-processing unit 2311 has a memory for storing the pixel number of a defective pixel at the time of manufacturing within the corresponding pixel block 200 and the data sampling unit 2411 samples the pixel signal from said pixel number, then the pre-processing unit 2311 does not use this pixel signal for calculating the statistical values. As a result, it is possible to improve the accuracy of calculating the statistical values of the pixel signals.

Also, the pre-processing unit 2311 may acquire calculation results from another pre-processing unit 2311 that handles the pixel block 200 adjacent to the corresponding pixel block 200, and calculate the statistical values of the pixel signals from the corresponding pixel block 200 on the basis of the calculation results acquired from the other pre-processing unit 2311. As a result, it is possible to smooth the exposed jagged edge of adjacent pixel blocks 200.

Also, the exposure value computation unit 2313 has set thereto the first threshold and the second threshold, but a configuration may be adopted in which the first threshold and/or the second threshold can be modified according to the imaging mode of the imaging device in which the imaging element 100 is installed. As a result, an optimal exposure calculation according to the imaging mode is possible.

Also, the peripheral circuit unit 121 has the latch circuit 2321 and the shift register 2322 for each exposure value computation unit 2313. The shift register 2322 performs parallel/serial conversion of the exposure value from the latch circuit 2321 and outputs the resulting exposure value as a serial signal to the data processing unit 103 and outputs the exposure value to the exposure control unit 412 in the control block 400 corresponding to the pixel block 200.

Thus, according to the configuration shown in FIG. 24, the control block 400 can have a smaller circuit size compared to the configuration depicted in FIG. 23, and it is possible to reduce the size of the corresponding pixel block 200. Therefore, it is possible to increase the number of pixel blocks, enabling more precise autonomous exposure control. Also, the exposure control unit 412 and the pixel driving unit 413 may be installed in the peripheral circuit unit 121. As a result, the control block 400 can have an even smaller circuit size, and it is possible to reduce the size of the corresponding pixel block 200.

FIG. 25 is a block diagram showing a configuration example of an autonomous exposure control mode 3. The autonomous exposure control mode 3 is a configuration example in which the autonomous exposure processing unit 411 is mounted in both the control block 400A and the peripheral circuit unit 121. If executing autonomous exposure control in the control block 400A, this obviates the need for data transmission such as transmission of the pixel signals from the control block 400A to the peripheral circuit unit 121 and transmission of the exposure value from the peripheral circuit unit 121 to the pixel block 200. Thus, feedback to the corresponding pixel block 200 is more rapid compared to a case where the autonomous exposure control is executed by the peripheral circuit unit 121.

Meanwhile, the area of the control block 400A is limited by the dependence thereof on the area of the corresponding pixel block 200, and thus, it is possible to expand the circuit size of the autonomous exposure processing unit 411 if the same is installed in the peripheral circuit unit 121 rather than installed in the control block 400A. Thus, it is possible to provide higher level functionality (e.g., elimination of pixel signals of defective pixels described with reference to FIG. 24, control of exposed jagged edge formed with adjacent pixel block 200, calculation of optimal exposure according to imaging mode) for autonomous exposure control if the autonomous exposure processing unit 411 is installed in the peripheral circuit unit 121.

Thus, in the autonomous exposure control mode 3, depending on the state, the imaging element 100 executes autonomous exposure control using the peripheral circuit unit 121 if executing high functionality computation related to autonomous exposure control, and using the control block 400A if providing high speed feedback of the exposure value. In FIG. 25, as an example, in the autonomous exposure control mode 3, autonomous exposure control is executed by the row direction autonomous exposure processing unit group 2400 in the peripheral circuit unit 121, but the imaging element 100 executes autonomous exposure control for each control block 400A if some trigger is applied to the control circuit unit 102.

The imaging element 100 executes autonomous exposure control using the peripheral circuit unit 121 if high functionality computation related to autonomous exposure control is selected by user operation, and using the control block 400A if high speed feedback of the exposure value is selected by user operation. Also, if the remaining battery level is at or below a prescribed level, the imaging element 100 may select and execute the lower power consumption process among the high functionality computation regarding autonomous exposure control and high speed feedback of the exposure value.

The row direction autonomous exposure processing unit group 2400 installed in the peripheral circuit unit 121 is the same as the configuration shown in FIG. 24, and thus, depiction thereof is omitted in FIG. 25.

The column selection circuit 2301 outputs n bits of the digital pixel signal to n OR circuits 2501. In addition to the controller 2312, the autonomous exposure processing unit 2500 in the control block 400A has the n OR circuits 2501, an output data latch circuit 2502, and an n-bit AND circuit 2503.

Upon output of an n-bit signal from the output data latch circuit 2502, the controller 2312 inputs a reset signal to the output data latch circuit 2502.

The OR circuit 2501 is a 2-input 1-output OR circuit. One input of the OR circuit 2501 is connected to the column selection circuit, and the other input is connected to the output of the n-bit AND circuit 2503.

The n OR circuits 2501 are connected to the input of the output data latch circuit 2502. The output data latch circuit

2502 retains an n-bit signal from the n OR circuits 2501. Upon input of a horizontal transfer clock signal, the output data latch circuit 2502 outputs the n-bit signal to the n-bit AND circuit 2503. Also, upon input of the reset signal from the controller 2312, the output data latch circuit 2502 resets the retained n-bit signal and outputs, to the n-bit AND circuit 2503, an n-bit signal in which at least one of the n bits is 0.

The n-bit AND circuit 2503 is an n-input 1-output AND circuit, and the output of the output data latch circuit 2502 is connected to the input of the n-bit AND circuit 2503. The output of the n-bit AND circuit 2503 is connected to the selector 2512 of the exposure control unit 412 and the inputs of the respective OR circuit 2501. If the output from the n-bit AND circuit 2503 is "0," this indicates that the pixel column that outputted the n-bit digital pixel signal is not saturated. If the output from the n-bit AND circuit 2503 is "1," this indicates that the pixel column that outputted the n-bit digital pixel signal is saturated. Below, a 1-bit signal of "1" outputted from the n-bit AND circuit 2503 is referred to as a saturation detection signal.

If the value of the digital pixel signal from a pixel 201 of a pixel column is "1," this indicates that the pixel 201 is saturated. If the values of the n-bit signal from the column selection circuit 2301 are all "1," this indicates that the entire pixel column is saturated. In this case, "1" is inputted to the one input of all of the OR circuits 2501, and thus, the OR circuits 2501 output a 1-bit signal with a value of "1" to the output data latch circuit 2502.

The output data latch circuit 2502 retains the n bit signal indicating that all the values are "1," and upon input of the horizontal transfer clock signal, outputs the retained n-bit signal to the n-bit AND circuit 2503.

If receiving input of an n-bit signal where all values are "1," then the n-bit AND circuit 2503 outputs a saturation detection signal with a value of "1" to the selector 2512 and the OR circuits 2501. As a result, until the reset signal is inputted, the output data latch circuit 2502 outputs the n-bit signal with all values being "1" to the n-bit AND circuit 2503. Thus, the n-bit AND circuit 2503 outputs the saturation detection signal until the reset signal is inputted from the controller 2312 to the output data latch circuit 2502.

The exposure control unit 412 has, in addition to the configuration shown in FIG. 24, the shift register 2511 and the selector 2512. The shift register 2511 performs serial/parallel conversion on the exposure value from the peripheral circuit unit 121, and outputs the result to the level shift unit 504 and the selector 2512.

The selector 2512 receives input of the exposure value from the shift register 2511 and the set exposure value. The selector 2512 selects the exposure value from the shift register 2511 or the set exposure value on the basis of the output signal from the n-bit AND circuit 2503, and outputs the selected exposure value to the latch circuit 2321. The set exposure value is an exposure value corresponding to an exposure time at which the pixels 201 are not saturated, and is set such that the exposure time is at a minimum, for example.

The set exposure value is set by being calculated by an external system outside of the control block 400A, for example. The set exposure value may be a fixed value and may be selected from the external system. The external system is an image processing unit that is connected to the peripheral circuit unit 121 in the imaging element 100, the data processing unit 103 of the third semiconductor substrate 130, or the imaging element 100 in the imaging device having the imaging element 100.

Specifically, if the output signal from the n-bit AND circuit 2503 is not a saturation detection signal, for example, the selector 2512 selects an exposure value from the shift register 2511 and outputs the same to the latch circuit 2321. On the other hand, if the output signal from the n-bit AND circuit 2503 is a saturation detection signal, the selector 2512 selects the set exposure value and outputs the same to the latch circuit 2321.

The autonomous exposure processing unit 2500 and the exposure control unit 412 in the control block 400A execute autonomous exposure control using the exposure value from the peripheral circuit unit 121 until saturation is detected in the control block 400A. If saturation is detected in the control block 400A, the set exposure value within the exposure control unit 412 is used to execute autonomous exposure control.

As a result, it is possible to select between a process of setting a high accuracy exposure value according to the exposure value from the peripheral circuit unit 121 for non-saturated pixel columns, and a process enabling simple and high-speed feedback of switching to the set exposure value such that the saturation state of the pixel column becomes non-saturated.

The autonomous exposure processing unit 2500 in the control block 400 may be the autonomous exposure processing unit 411 shown in FIG. 23. In this case, a configuration may be adopted to allow user operation to select between the autonomous exposure processing unit 411 in the peripheral circuit unit 121 and the autonomous exposure processing unit 411 in the control block 400, for example.

The imaging device in which the imaging element 100 is installed may select between the autonomous exposure processing unit 411 in the peripheral circuit unit 121 and the autonomous exposure processing unit 411 in the control block 400, on the basis of the remaining battery level, for example. In this case, the imaging device may select the autonomous exposure control by the autonomous exposure processing unit 411 in the peripheral circuit unit 121 if the battery level is at or above a prescribed value, and select the autonomous exposure control by the autonomous exposure processing unit 411 in the control block 400 if the battery level is not at or above the prescribed value. Also, if high quality imaging is desired, the user would select the autonomous exposure processing unit 411 in the peripheral circuit unit 121, and if reduced power consumption is desired, the user would select the autonomous exposure processing unit 411 in the control block 400.

<Layout of Autonomous Exposure Control Mode>

Figure 26:
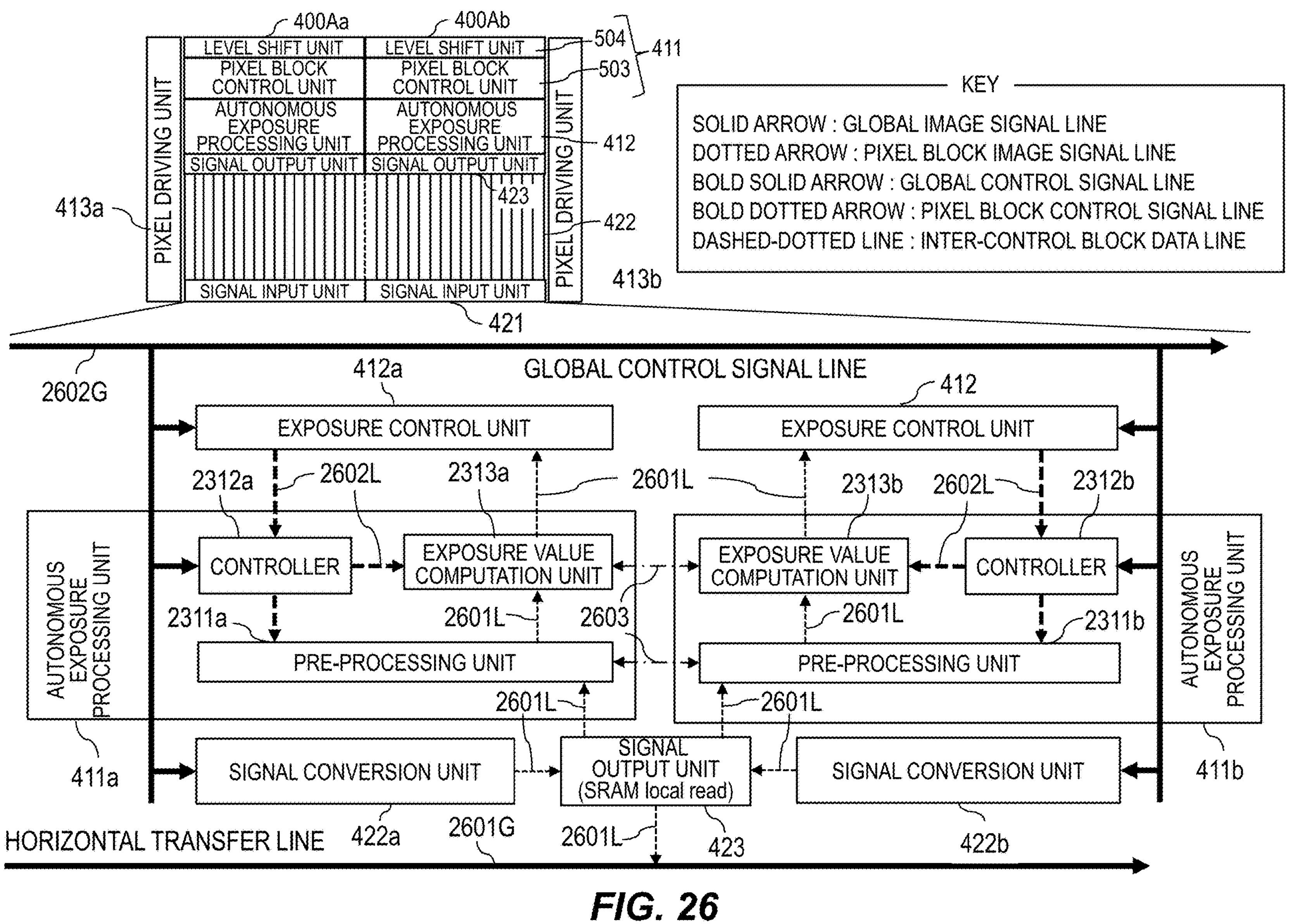
FIG. 26 is a block diagram showing a layout example of a case in which the autonomous exposure processing unit is mounted in adjacent control blocks.
Figure 27:
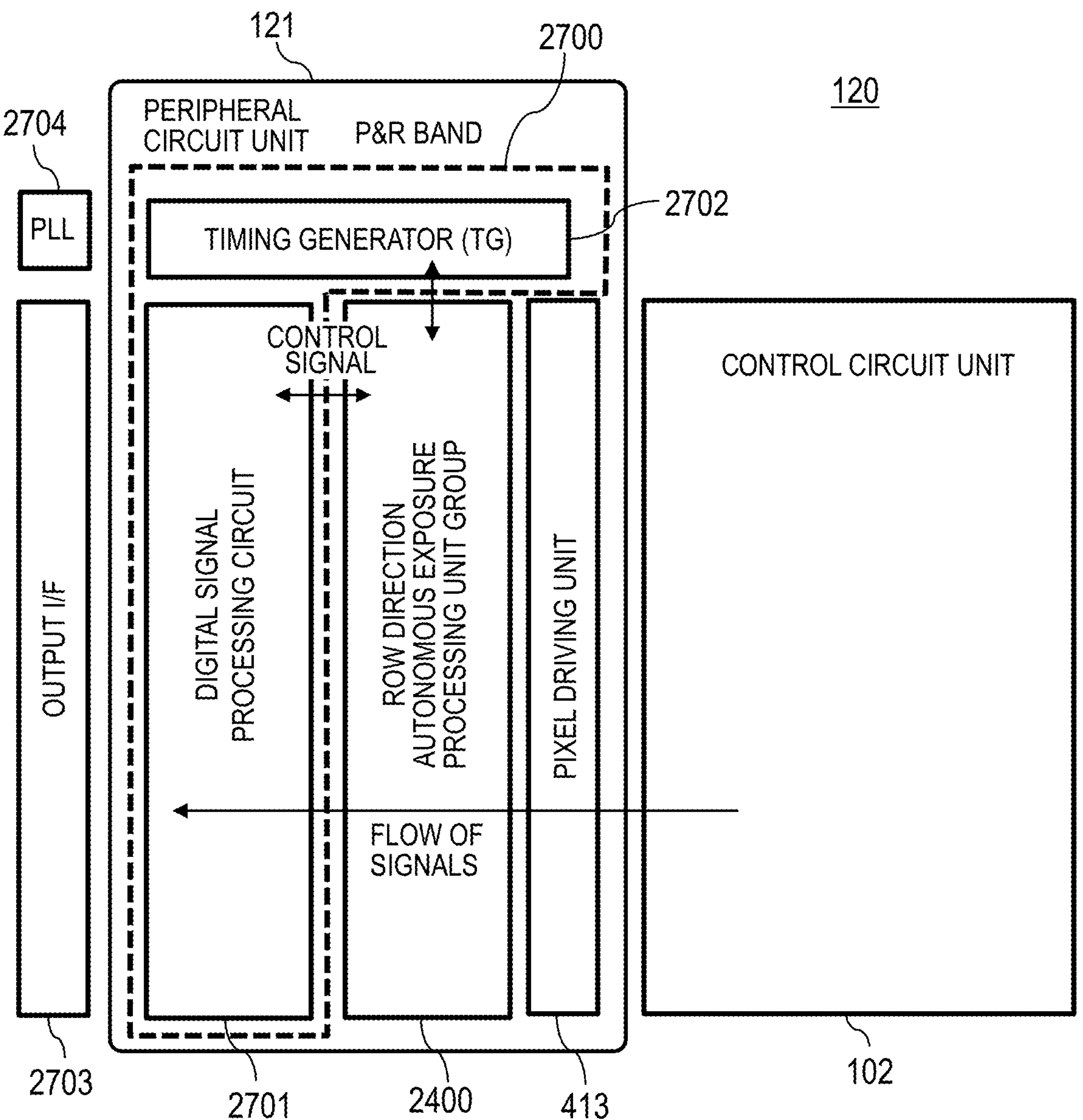
FIG. 27 is a block diagram showing a layout example of a case in which the autonomous exposure processing unit is mounted in the peripheral circuit unit.
Figure 28:
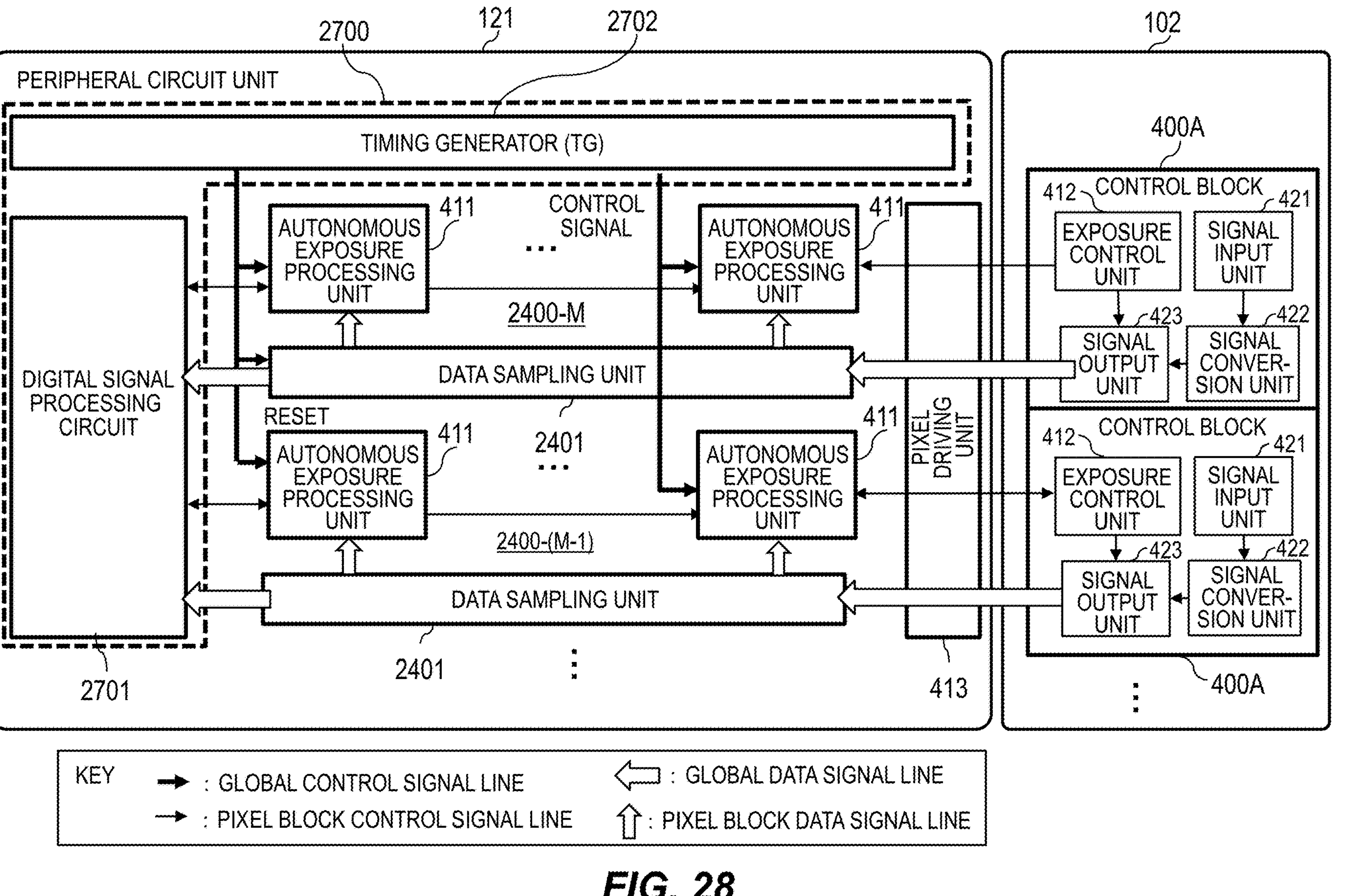
FIG. 28 is a block diagram showing a detailed internal configuration of the peripheral circuit unit shown in FIG. 27.

Next, the layout for the autonomous exposure control mode will be described. There is a case in which, as shown in FIGS. 23 and 25, the autonomous exposure processing unit 411 is mounted in the control block 400, and a case in which, as shown in FIGS. 24 and 25, the autonomous exposure processing unit 411 is mounted in the peripheral circuit unit 121. The former will be described with reference to FIG. 26, and the latter will be described with reference to FIGS. 27 and 28. In FIGS. 26 to 28, the circuit configuration of the control block 400A will be described as an example, but in the case of the control block 400B, the layout is such that the signal processing unit 402 in the control block 400A is disposed on the second semiconductor substrate 120 outside of the control block 400B as the signal processing unit 1602.

FIG. 26 is a block diagram showing a layout example of a case in which the autonomous exposure processing unit is mounted in adjacent control blocks. FIG. 13 shows a layout example of the plurality of control blocks 400A. In FIG. 26, for the configuration of the autonomous exposure control mode 1 shown in FIG. 23, an internal configuration of two control blocks 400Aa and 400Ab, which are adjacent to each other without the pixel driving unit 413 therebetween in the row direction, will be described in detail, out of the configuration shown in FIG. 13.

Specifically, for example, in FIG. 26, an example is shown in which the two control blocks 400Aa and 400Ab, which are adjacent to each other in the row direction without the pixel driving unit 413 therebetween, out of the configuration shown in FIG. 13. In order to indicate whether the internal components belong to the control block 400Aa or 400Ab, the internal components of the control block 400Aa are assigned the suffix a to the reference characters thereof, and the internal components of the control block Ab are assigned the suffix b to the reference characters thereof.

Also, the signal lines shown in the legend indicate the connective relationship between the internal components. The solid arrow is a global pixel signal line 2601G, and the dotted arrow is a local pixel signal line 2601L. The bold solid arrow is a global control signal line 2602G, and the bold dotted arrow is a local control signal line 2602L. The dashed-dotted line is an inter-control block data line 2603. The pixel signal lines are signal lines that transmit pixel signals and the control signal lines are signal lines that transmit control signals.

The global pixel signal line 2601G is a pixel signal line (horizontal transfer line) shared between control blocks 400A in the row direction. The local pixel signal line 2601L is a pixel signal line within the control block 400A. The global control signal line 2602G is a control signal line shared between control blocks 400A in the row direction. The local control signal line 2602G is a control signal line within the control block 400A. The inter-control block data line 2603 is a data line for transmitting and receiving data between the exposure value computation units 2313*a* and 2313*b*.

In the control blocks 400Aa and 400Ab, as shown in FIG. 13, the signal conversion units 422*a* and 422*b*, the autonomous exposure processing units 411*a* and 411*b*, and the exposure control units 412*a* and 412*b* are in a mirrored arrangement.

Also, a signal output unit 423 shared between the control blocks 400Aa and 400Ab is disposed between the signal conversion units 422*a* and 422*b*. This results in improved layout efficiency between the control blocks 400Aa and 400Ab.

The interiors of the autonomous exposure processing units 411*a* and 411*b* are also in a mirrored arrangement, and thus, the pre-processing units 2311*a* and 2311*b* are arranged in the row direction. The digital pixel signals from the signal conversion units 422*a* and 422*b* are horizontally transferred to the global pixel signal line 2601G via the signal output unit 423. Thus, the pre-processing units 2311*a* and 2311*b* are disposed near the signal conversion units 422*a* and 422*b* and the signal output unit 423 (the column selection circuit 2301).

As a result, the local pixel signal lines 2601L between the pre-processing units 2311*a* and 2311*b* and the signal output unit 423 can be wired without bypassing other internal components. Thus, the transmission efficiency of digital pixel signals between the pre-processing units 2311*a* and 2311*b* and the signal output unit 423 is improved.

The controllers 2312*a* and 2312*b* and the exposure value computation units 2313*a* and 2313*b* are also arranged along the row direction. Specifically, for example, in the row direction, the exposure value computation units 2313*a* and 2313*b* are disposed close to each other and the controllers 2312*a* and 2312*b* are disposed far from each other. If, for example, the exposure value from the exposure value computation unit 2313*a* is used for the exposure value computation unit 2313*b* to calculate the exposure value, then there is communication between the exposure value computation units 2313*a* and 2313*b*. Compared to being disposed far from each other as the controllers 2312*a* and 2312*b* are, the communication distance is shortened. Thus, computation efficiency in the exposure value computation unit 2313*b* is improved.

Also, the local pixel signal lines 2601L connect the signal output unit 423 to the pre-processing units 2311*a* and 2311*b*, the pre-processing units 2311*a* and 2311*b* to the exposure value computation units 2313*a* and 2313*b*, and the exposure value computation units 2313*a* and 2313*b* to the exposure control units 412*a* and 412*b*. Thus, in order to shorten the wiring lengths of the local pixel signal lines 2601L, the pre-processing units 2311*a* and 2311*b*, the exposure value computation units 2313*a* and 2313*b*, and the exposure control units 412*a* and 412*b* are respectively disposed near the boundary between the control blocks 400Aa and 400Ab instead of towards the pixel driving units 413*a* and 413*b*.

As a result of such an arrangement, it is possible to reduce the wiring scale within the control blocks 400Aa and 400Ab.

FIG. 27 is a block diagram showing a layout example of a case in which the autonomous exposure processing unit 411 is mounted in the peripheral circuit unit 121. FIG. 28 is a block diagram showing a detailed internal configuration of the peripheral circuit unit 121 shown in FIG. 27. In the second semiconductor substrate 120, the peripheral circuit units 121*a* and 121*b* are disposed on both sides of the control circuit unit 102.

The control circuit unit 102 has a signal processing unit 402 (signal input unit 421, signal conversion unit 422, signal output unit 423) and an exposure control unit 412 for each control block 400A.

The peripheral circuit unit 121 has the pixel driving unit 413, the row direction autonomous exposure processing unit group 2400, and a digital signal processing circuit 2701. Also, the peripheral circuit unit 121 has a timing generator 2702.

Additionally, on the outside of the peripheral circuit unit 121, an output I/F 2703 is disposed near the digital signal processing circuit 2701. Similarly, the outsides of the peripheral circuit units 121 have disposed thereto PLL circuits 2704 near the timing generators 2702.

The timing generator 2702 sequentially outputs a whole-column address of the pixel block column to the data sampling unit 2411 during one frame. Also, the timing generator 2702 outputs the reset signal to each autonomous exposure processing unit.

As shown in FIG. 28, the signal output unit 423 in the control block 400A outputs a digital pixel signal to the data sampling unit 2401. The data sampling unit 2401 refers to the column address of the pixel block column from the timing generator 2702 to allocate the digital pixel signal from the control block 400A to each pixel block column, and outputs the same to the autonomous exposure processing unit 411. Also, the data sampling unit 2401 outputs the digital pixel signal to the digital signal processing unit.

The autonomous exposure processing unit 411 calculates the exposure value and outputs the same to the exposure control unit 412. Upon receiving the reset signal from the timing generator, the autonomous exposure processing unit 411 resets the exposure value.

In the row direction autonomous exposure processing unit groups 2400-1 to 2400-M, the data sampling unit 2401 and the row direction autonomous exposure processing unit 411 are disposed alternately in the column direction. As a result, the wiring lengths of the control signal lines and the data signal lines is reduced.

The digital signal processing circuit 2701 uses the output signal from the PLL circuit 2704 to perform serial conversion of the exposure value from the row direction autonomous exposure processing unit group 2400 and transmit the converted exposure value to the output I/F 2703. The timing generator 2702 supplies, to the row direction autonomous exposure processing unit group 2400, a clock signal for generating various timing signals used by the row direction autonomous exposure processing unit group 2400.

In FIG. 27, signals from the control circuit unit 102 (e.g., digital pixel signals) are outputted via the pixel driving unit 413 to the autonomous exposure processing unit 411, the exposure value from the autonomous exposure processing unit 411 is outputted to the digital signal processing circuit 2701, and the output from the digital signal processing circuit 2701 is outputted to the output I/F 2703. Thus, between the control circuit unit 102 and the output I/F 2703, there are disposed the pixel driving unit 413, the autonomous exposure processing unit 411, and the digital signal processing circuit 2701 in order of proximity to the control circuit unit 102.

Also, the row direction autonomous exposure processing unit group 2400 is also disposed close to the timing generator 2702 in order to communicate with the timing generator 2702. The digital signal processing circuit 2701 and the timing generator 2702 are disposed close to each other within an automatic arrangement/wiring region 2700 that is automatically arranged and wired by a computer (not shown).

In this manner, the autonomous exposure processing unit 411 is disposed close to the automatic arrangement/wiring region 2700 in the peripheral circuit unit 121 according to the flow of signals. Thus, it is possible to reduce the wiring scale in the peripheral circuit unit 121.

<Shortening of Time Period to Reflect Changes when Changing Exposure Time>

Next, shortening of the time period to reflect changes when changing the exposure time will be described with reference to FIGS. 29 to 38.

Figure 29:
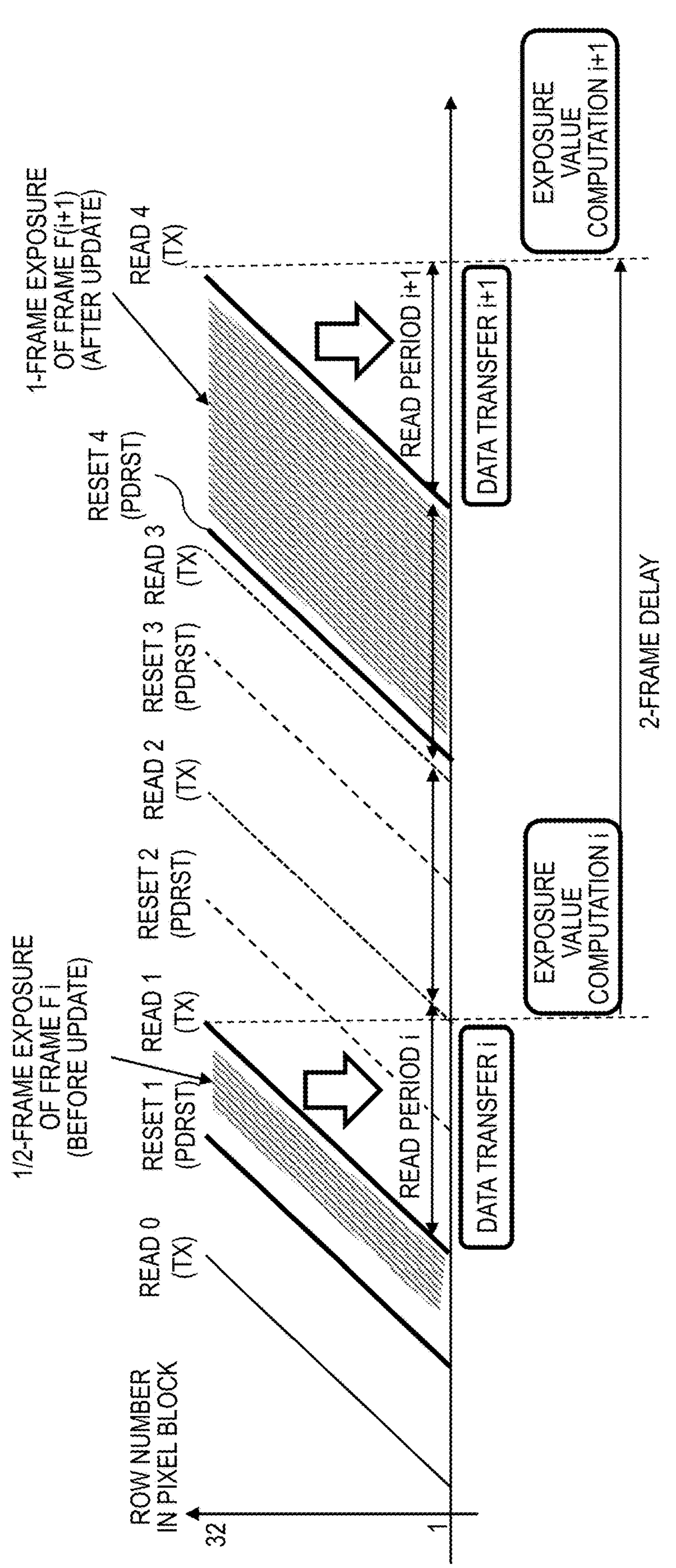
FIG. 29 is a descriptive view showing a delay example of the time period to reflect changes in the exposure time.

FIG. 29 is a descriptive view showing a delay example of the time period to reflect changes in the exposure time. In FIG. 29, an example will be described in which the exposure time for ½ frame (hereinafter referred to as ½-frame exposure) is switched to an exposure time for one frame (hereinafter referred to as 1-frame exposure). The horizontal axis of FIG. 29 indicates time, and the vertical axis indicates the pixel block row number. In FIG. 29, the pixel row count m of the pixel block 200 is 32.

During ½-frame exposure, when the discharge control signal φPDRST is inputted to the gate terminal of the discharge unit 302 sequentially for the pixels 201 in the pixel row of the pixel block 200, the accumulation of electric charge, or in other words, exposure, at the pixels 201 of each pixel row is started (resets 1 to 3).

During ½-frame exposure, at the time when ½-frame exposure is completed from each of the resets 1 to 3, when the transfer control signal φTX is inputted to the gate terminal of the transfer unit 301 sequentially for each of the pixels 201 in the pixel row of the pixel block 200, a reading 1 of the pixel block 200 at a frame Fi is started, and when an analog pixel signal is read from the last pixel row, a read period i of the pixel block 200 during the frame F1 is completed.

The pixel signal read during the read period i is subjected to data transfer i by the signal processing unit 402 to the outside as a digital signal. Also, the control block 400 performs exposure value computation i on the pixel signals read during the read period i and converted to digital signals.

Here, if an instruction to switch from ½-frame exposure to 1-frame exposure is inputted to the control block 400 before the read period i is complete, then the computation results of the exposure value computation i can only be reflected in the 1-frame exposure of the frame F(i+1) after completion of the exposure value computation i. Thus, after completion of the exposure value computation i, the reset 4 is executed upon the start of reading arrived at initially thereafter (reading 3). Thus, the reset 2 is started before the end of the exposure value computation i, and therefore, the computation results of the exposure value computation i at the timing of the reading 2 cannot be reflected in the 1-frame exposure of the frame F(i+1).

During 1-frame exposure after the update, at the time when 1-frame exposure is completed from the reset 4, when the transfer control signal φTX is inputted to the gate terminal of the transfer unit 301 sequentially for each of the pixels 201 in the pixel row of the pixel block 200, a reading 4 of the pixel block 200 at a frame F(i+1) is started, and when an analog pixel signal is read from the last pixel row, a read period i+1 of the pixel block 200 during the frame F(i+1) is completed.

The pixel signal read during the read period i+1 is subjected to data transfer i+1 by the signal processing unit 402 to the outside as a digital signal. Also, the control block 400 performs exposure value computation i+1 on the pixel signals read during the read period i+1 and converted to digital signals.

Thus, in FIG. 29, if switching from ½-frame exposure to 1-frame exposure, a two-frame delay occurs until the 1-frame exposure is started. This similarly applies to a case in which a switch is made to 1-frame exposure before ½-frame exposure is completed.

Figure 30:
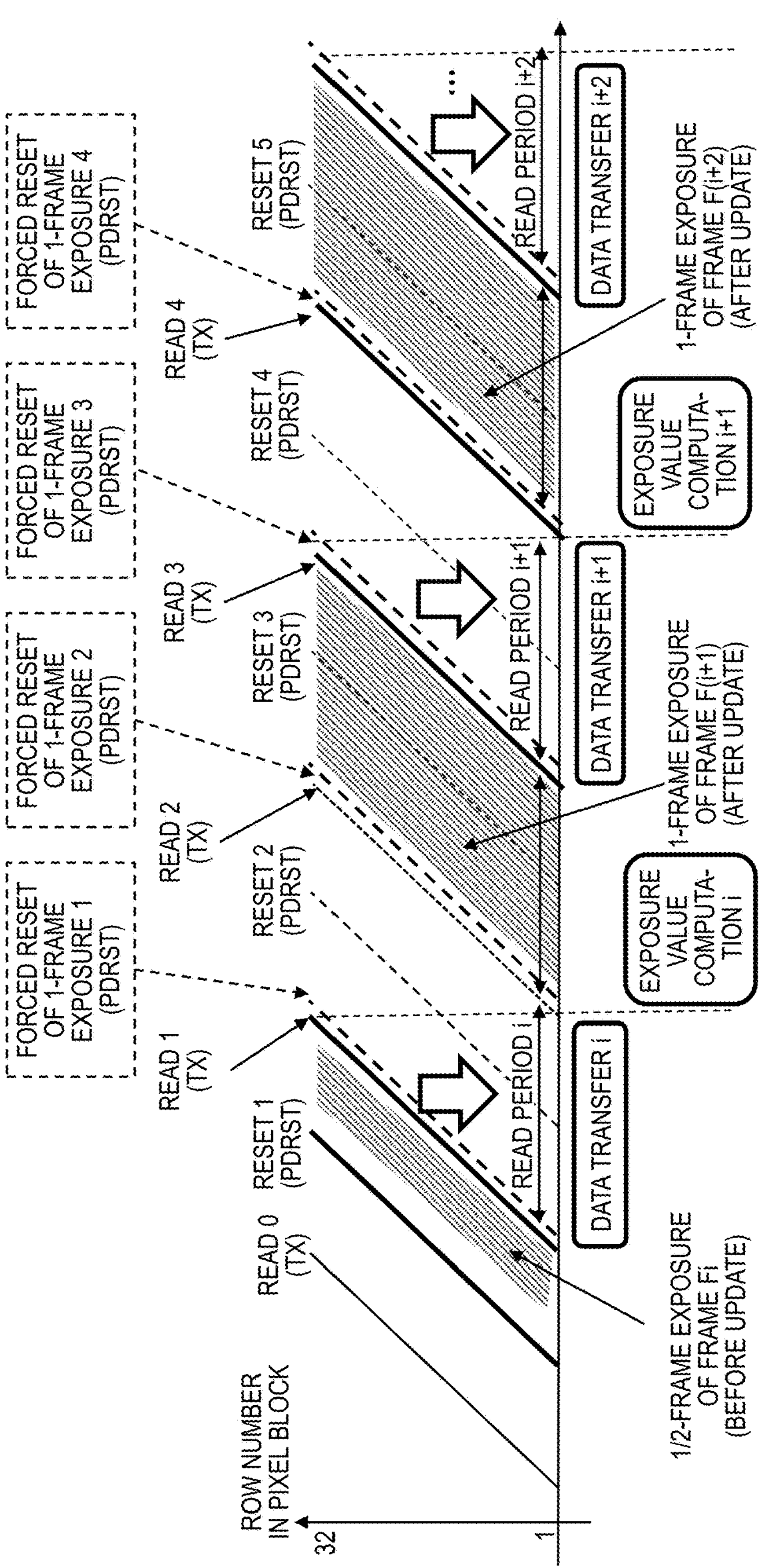
FIG. 30 is a descriptive view showing a shortening example 1 for the time period to reflect changes in the exposure time.

FIG. 30 is a descriptive view showing a shortening example 1 for the time period to reflect changes in the exposure time. In FIG. 30, an example will be described in which, similar to FIG. 29, a switch is made from ½-frame exposure to 1-frame exposure. The difference from FIG. 29 is that, in FIG. 30, forced resets 1 to 4 for 1-frame exposure are inputted at the timing of the reads 1 to 4.

Like the resets 1 to 4, the forced resets 1 to 4 are the discharge control signals φPDRST inputted to the gate terminal of the discharge unit 302 sequentially for the pixels 201 in the pixel row of the pixel block 200, resulting in the accumulation of electric charge, or in other words, exposure, at the pixels 201 of each pixel row is started.

Here, if an instruction to switch from ½-frame exposure to 1-frame exposure is inputted to the control block 400 before the read period i is complete, If reflecting the computation results of the exposure value computation i in the 1-frame exposure of the frame F(i+1), in FIG. 29, this could only occur after the end of the exposure value computation i, but in FIG. 30, upon input of the forced reset 2, the accumulation of electric charge in the pixel block 200 in the frame F(i+1) is started in the pixels 201 of the pixel row without awaiting the end of the exposure value computation i. In this case, the control block 400 performs drive control of the pixels 201 such that the reset 3 is not inputted.

Thereafter, the 1-frame exposure is continued. In other words, the read 4 is started when the read period i+1 ends, and the forced reset 4 applies. As a result, the accumulation of electric charge at the pixel block 200 is started for the frame F(i+2). In this case, the control block 400 performs drive control of the pixels 201 such that the reset 5 is not inputted.

Thus, in FIG. 30, if switching from ½-frame exposure to 1-frame exposure, the delay until the change to 1-frame exposure is reflected is shorted to one frame. This shortening similarly applies to a case in which a switch is made to 1-frame exposure before ½-frame exposure is completed.

Also, even if switching from 1-frame exposure to exposure less than or equal to ½ frame, the forced reset continues to be inputted and the reset is also inputted. If, for example, an instruction to switch from 1-frame exposure to ½-frame exposure or less is inputted to the control block 400 prior to the end of the exposure value computation i+1, the computation results of exposure value computation i+1 (e.g., ½-frame exposure) are reflected in the first reset 5 arriving after the end of the exposure value computation i+1, and the accumulation of electric charge is started at the pixel block 200 during the frame F(i+2).

Figure 31:
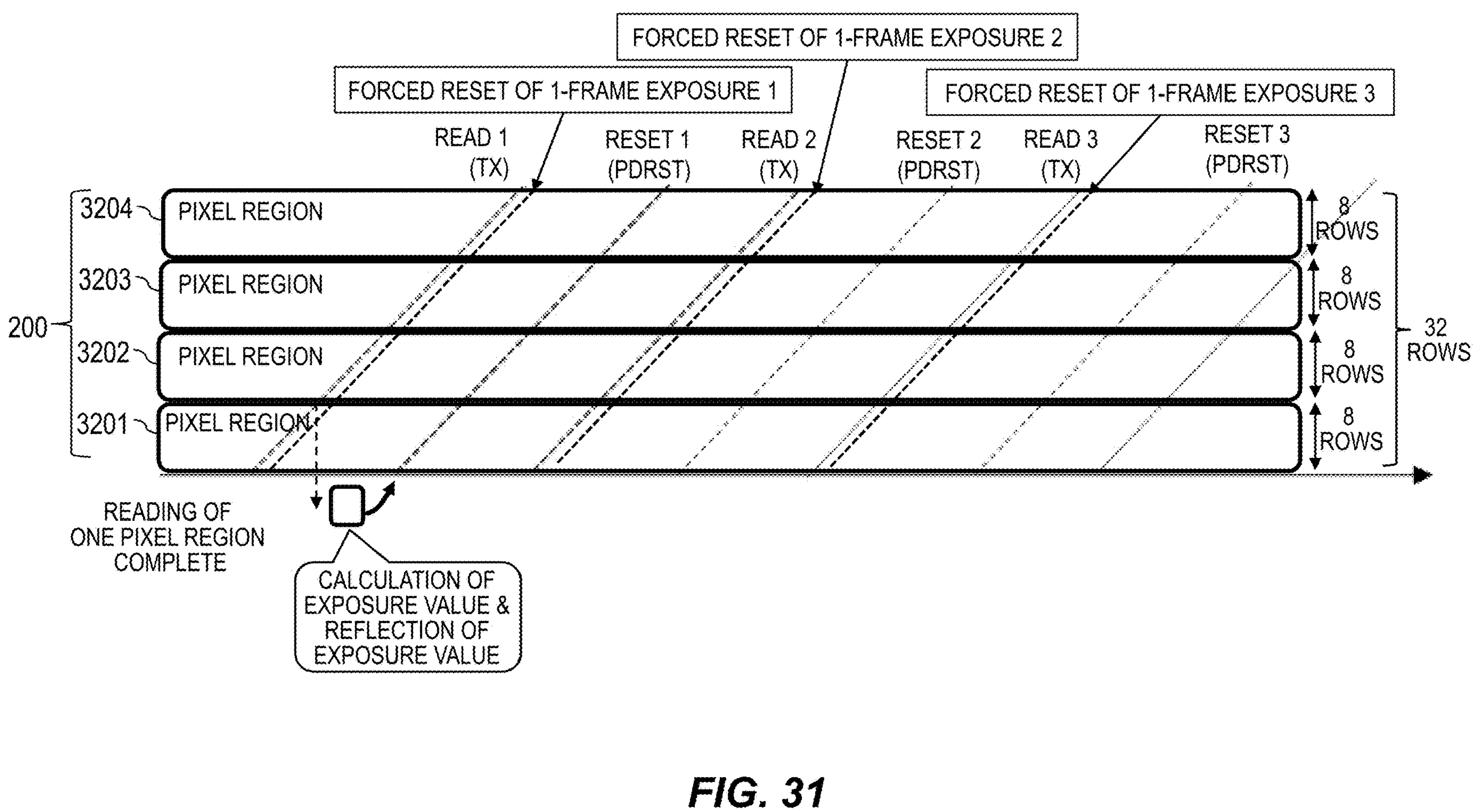
FIG. 31 is a descriptive view showing a shortening example 2 for the time period to reflect changes in the exposure time.

FIG. 31 is a descriptive view showing a shortening example 2 for the time period to reflect changes in the exposure time. FIG. 31 shows an example in which all pixels 201 in one pixel block 200 can be controlled at the level of K (K being an integer of 2 or greater) pixel regions. In FIG. 31, an example is shown in which each pixel block 200 has 32 rows, and each control block 400 controls pixel regions 3101 to 3104, each of which has 8 rows in the pixel block 200.

In FIG. 30, the exposure value computation and the reflection of exposure values could not be performed until all 32 rows of the pixel block 200 are read, but in FIG. 31, if the reading of 8 rows of the pixel region 3101 is completed, then the control block 400 can execute exposure value computation and the reflection of the exposure value in the pixel region 3101 without needing to complete the reading of the pixel regions 3102 to 3104.

Thus, even if one control block 400 were to control the plurality of pixel regions 3102 to 3104, the delay to the start of 1-frame exposure is shortened to one frame, and the output of data at 1-frame exposure can be accomplished for each of the pixel regions 3101 to 3104 at the second frame from the read 1.

Figure 32:
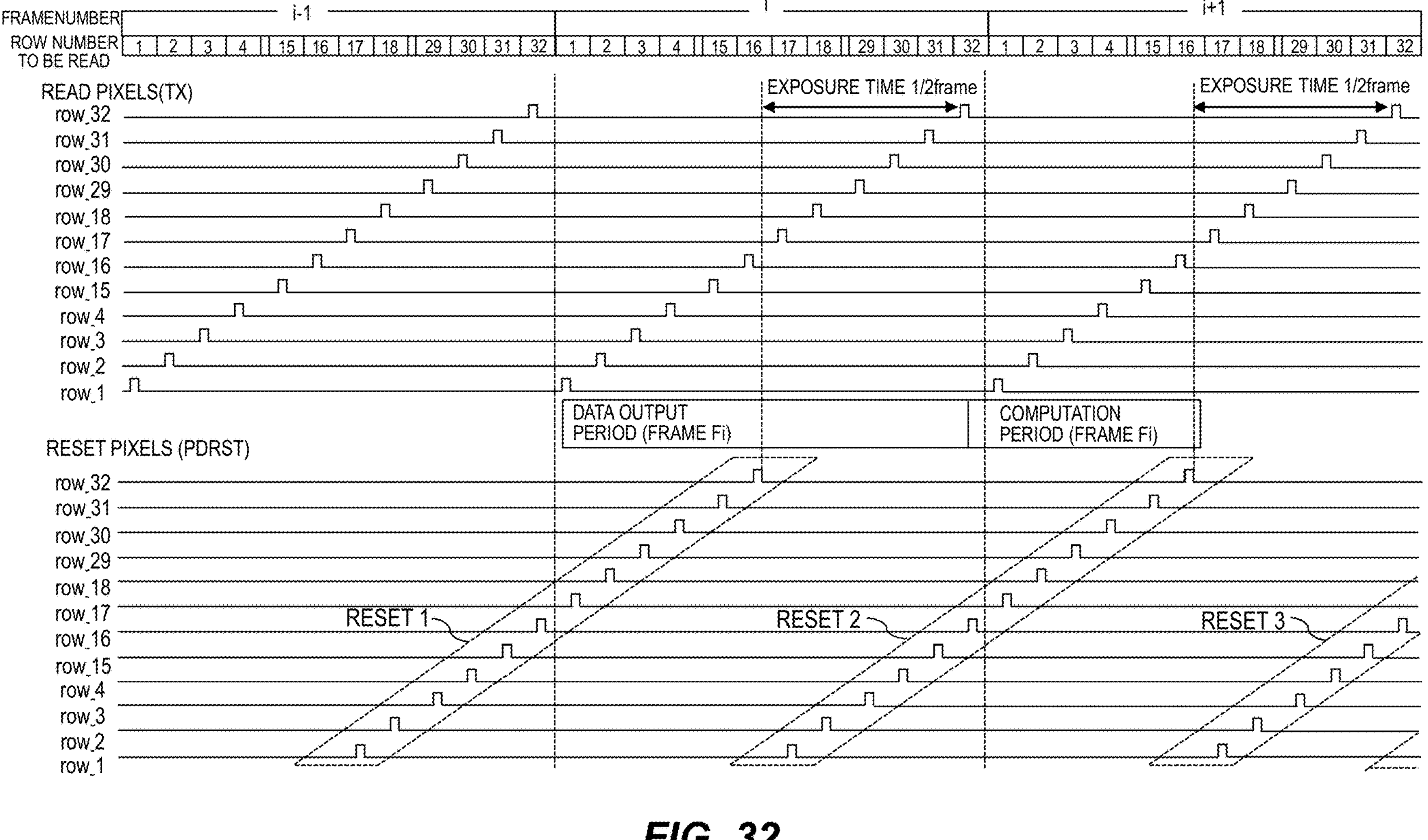
FIG. 32 is a timing chart 1-1 for when a change in exposure time occurs.
Figure 33:
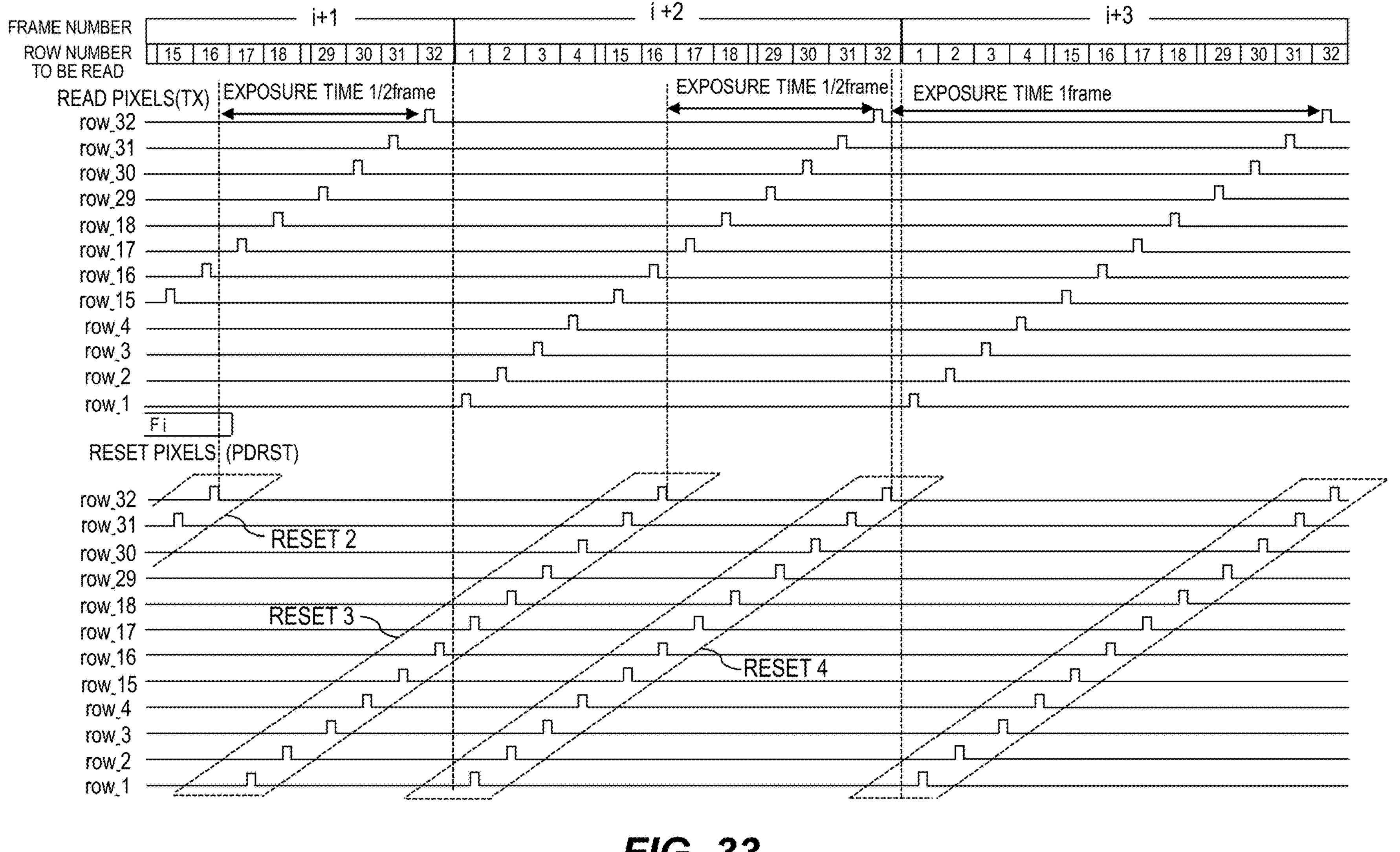
FIG. 33 is a timing chart 1-2 for when a change in exposure time occurs.

FIG. 32 is a timing chart 1-1 for when a change in exposure time occurs, and FIG. 33 is a timing chart 1-2 for when a change in exposure time occurs. FIGS. 32 and 33 are timing charts for the example of FIG. 29.

In FIGS. 32 and 33, the start of ½-frame exposure is started for the frame Fi, and as shown, if there is a switch to 1-frame exposure thereafter, then the switch to 1-frame exposure occurs at the frame F(i+3), which is three frames after the frame Fi.

Figure 34:
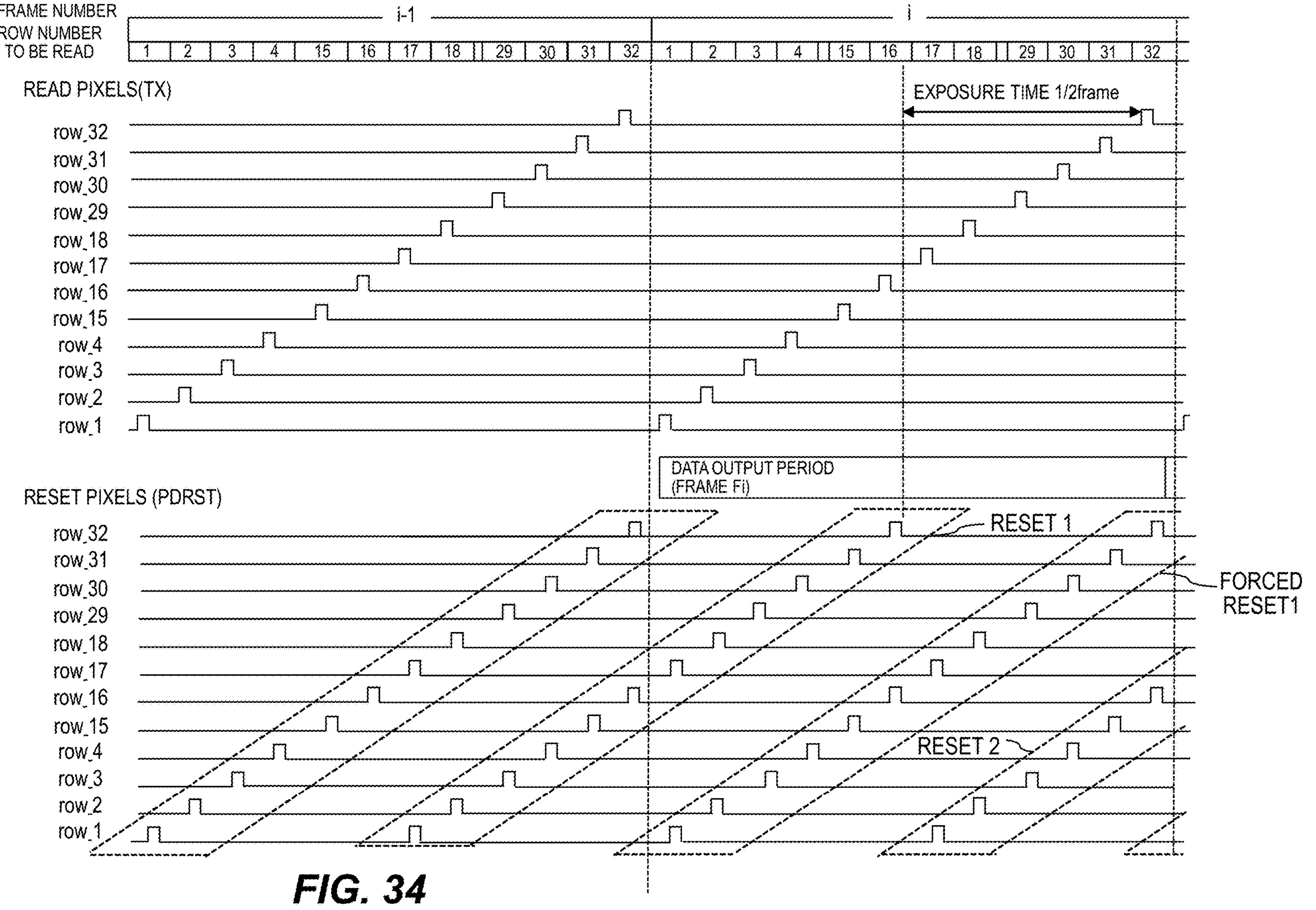
FIG. 34 is a timing chart 2-1 for when a change in exposure time occurs.
Figure 35:
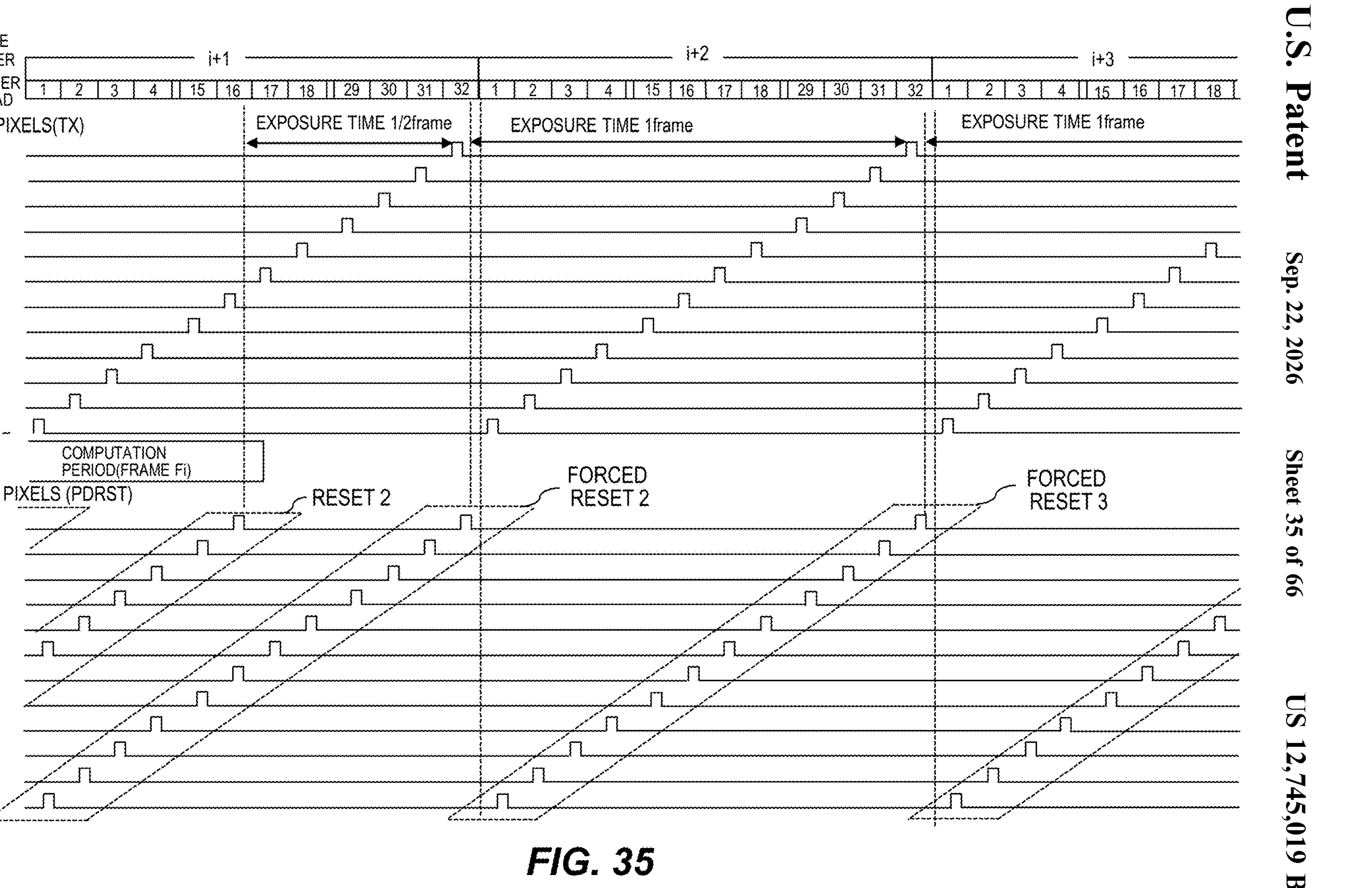
FIG. 35 is a timing chart 2-2 for when a change in exposure time occurs.

FIG. 34 is a timing chart 2-1 for when a change in exposure time occurs, and FIG. 35 is a timing chart 2-2 for when a change in exposure time occurs. FIGS. 34 and 35 are timing charts for the example of FIG. 30.

In FIGS. 34 and 35, the start of ½-frame exposure is started for the frame Fi, and as shown, if there is a switch to 1-frame exposure thereafter, then the switch to 1-frame exposure occurs at the frame F(i+2), which is two frames after the frame Fi. If 1-frame exposure is continued from the frame F(i+2) onward, then only a forced reset is driven.

Figure 36:
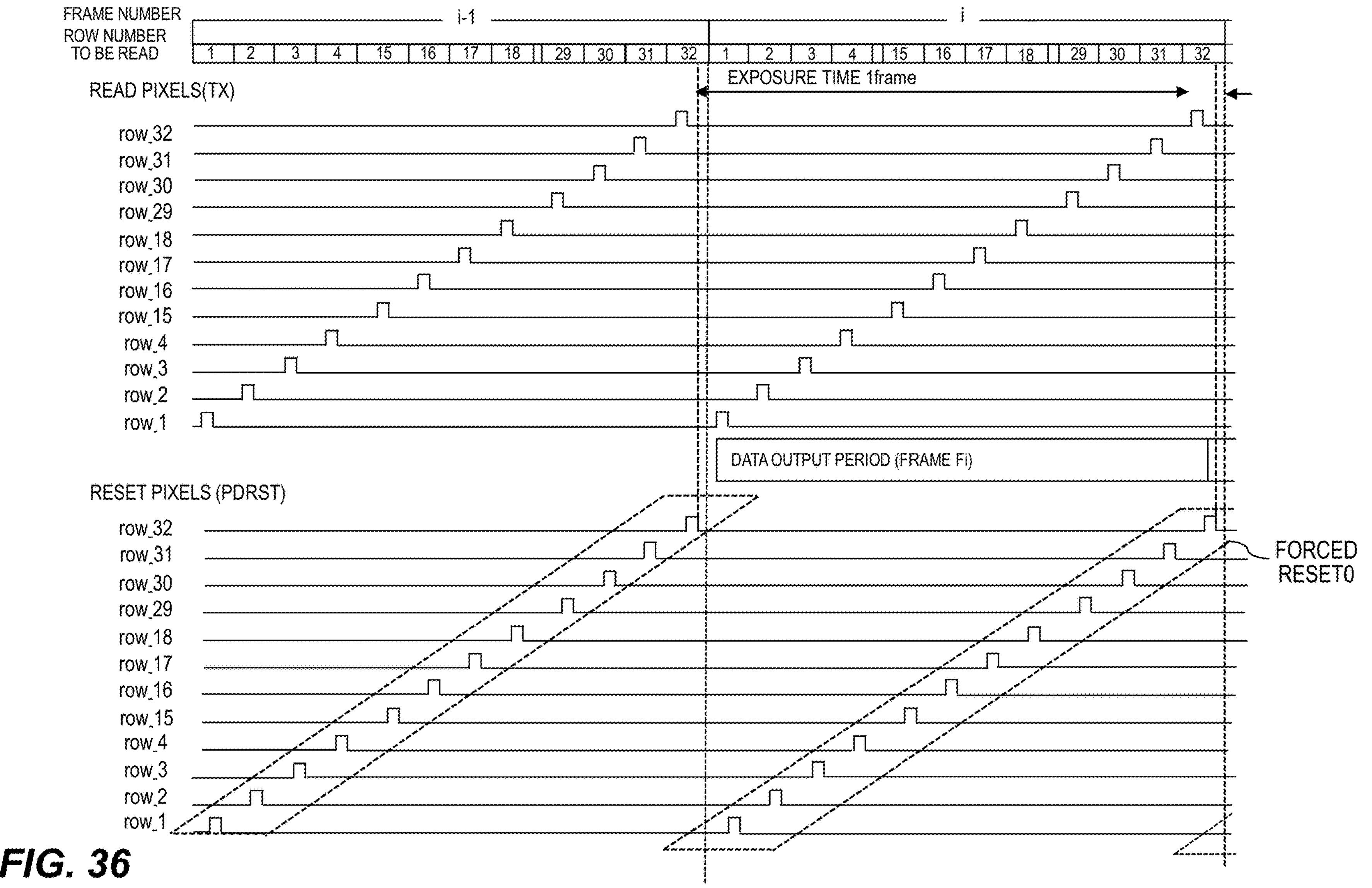
FIG. 36 is a timing chart 3-1 for when a change in exposure time occurs.
Figure 37:
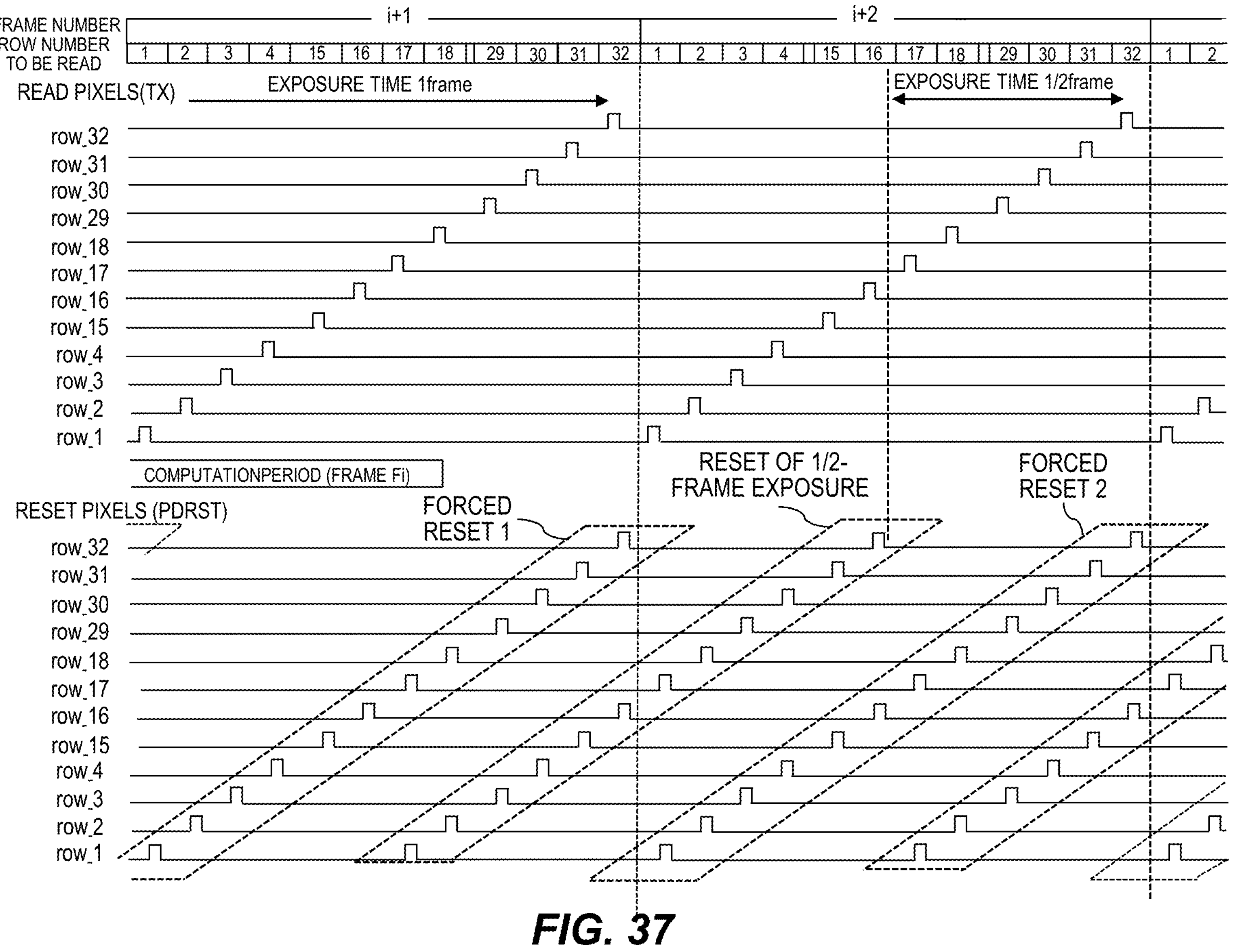
FIG. 37 is a timing chart 3-2 for when a change in exposure time occurs.
Figure 38:
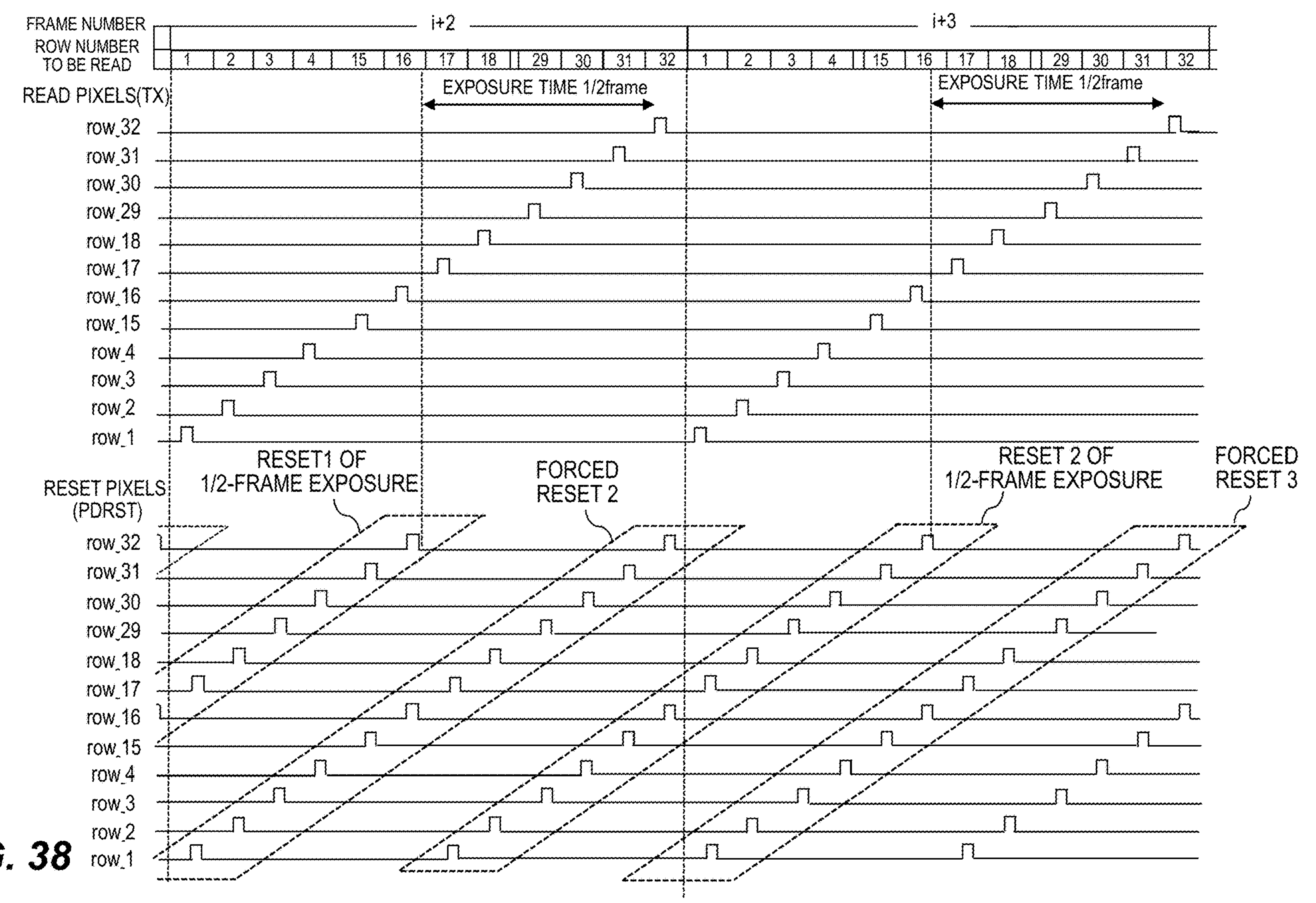
FIG. 38 is a timing chart 3-3 for when a change in exposure time occurs.

FIG. 36 is a timing chart 3-1 for when a change in exposure time occurs, FIG. 37 is a timing chart 3-2 for when a change in exposure time occurs, and FIG. 38 is a timing chart 3-3 for when a change in exposure time occurs. FIGS. 36 to 38 are timing charts for examples in which a forced reset is driven as in FIG. 30, and there is a switch from 1-frame exposure to ½-frame exposure.

For 1-frame exposure, forced resets 0 to 3 are driven for each frame N. If switching to ½-frame exposure during the frame N, the reset 1 for ½-frame exposure is driven for the frame F(i+2) after exposure value computation for the frame N. Then, the reset 2 for ½-frame exposure is driven at the same timing for the frame F(i+3) as well. In FIG. 38, during one frame, the forced reset and the reset of the ½-frame exposure are driven, but since the reset of the ½-frame exposure is driven after the forced reset, the forced reset is not reflected by the reset driving of the ½-frame exposure, and the exposure time remains at ½-frame exposure.

<Reading of Exposure Value to Outside of Second Semiconductor Substrate 120>

Next, reading of the exposure value to the outside of the second semiconductor substrate 120 will be described. There are two read methods for the exposure value to the outside of the second semiconductor substrate 120 aside from the method shown in FIGS. 23 to 25 in which the exposure value is outputted from the shift register.

In one method, the exposure value is read by a different path than the pixel signals (hereinafter, the pixel signals) of one pixel block 200 and the exposure value is outputted as the header of the pixel signal, and this example is described with reference to FIG. 39. The other method is one in which the exposure value is read via the horizontal transfer line together with the digital pixel signal, and the exposure value is outputted to the outside of the second semiconductor substrate 120 together with the image signal, and this example is described with reference to FIG. 41.

Figure 39:
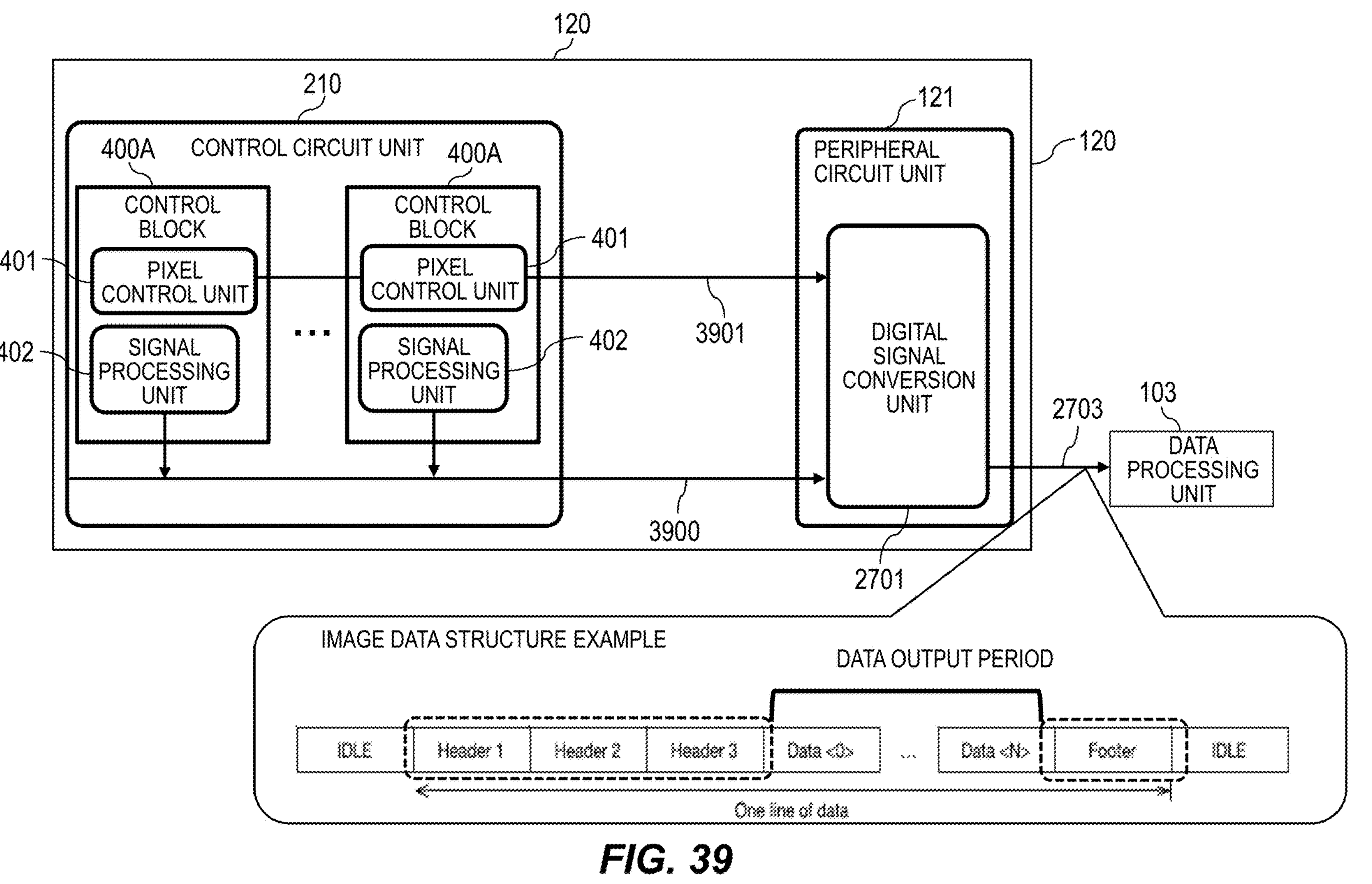
FIG. 39 is a descriptive view showing a read method 1 for the exposure value to the outside of the second semiconductor substrate.

FIG. 39 is a descriptive view showing a read method 1 for the exposure value to the outside of the second semiconductor substrate 120. The horizontal transfer line 3900 is a 16-bit transfer line, for example, and is connected to each control block 400A and the digital signal processing circuit 2701. The data lines 3901 are connected to the pixel control unit 401 and the digital signal processing circuit 2701 of each control block 400A.

The digital pixel signal of each of the pixels 201 from the signal processing unit 402 of each control block 400A is outputted to the digital signal processing circuit 2701 by the horizontal transfer line 3900. The reading of the exposure value is performed over a different path from the horizontal transfer line 3900. Thus, the signal line 4100 can output the exposure value at a lower frequency than the horizontal transfer line 3900.

The digital signal processing circuit 2701 assigns the exposure value from the signal line 4100 as a header (may be a footer) of the image signal, and the image data constituted of the header and the image signal is outputted to the data processing unit 103. According to the configuration of FIG. 39, the quantity of image data transferred to the data processing unit 103 is reduced compared to the example of FIG. 41 to be described later.

Figure 40:
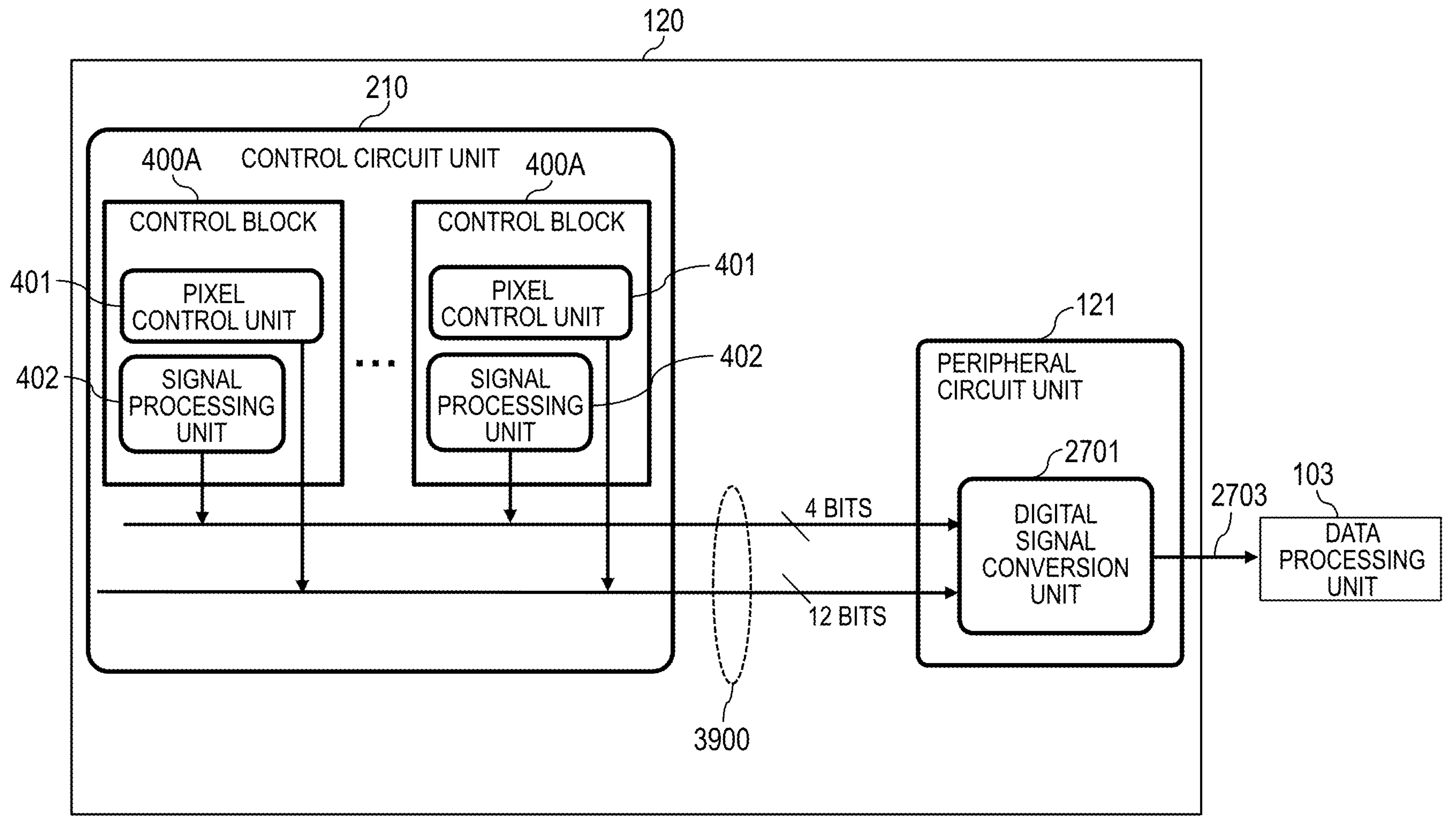
FIG. 40 is a descriptive view showing a read method 2 for the exposure value to the outside of the second semiconductor substrate.

FIG. 40 is a descriptive view showing a read method 2 for the exposure value to the outside of the second semiconductor substrate 120. The horizontal transfer line 3900 is a 16-bit transfer line, for example, and is connected to each control block 400 and the digital signal processing circuit 2701. The digital pixel signal of each of the pixels 201 from the signal processing unit 402 of each control block 400 is outputted to the digital signal processing circuit 2701 by the horizontal transfer line 3900. The exposure value from the pixel control unit 401 of each control block 400 is outputted to the outside of the second semiconductor substrate 120 by the horizontal transfer line 3900 at the same time as the corresponding digital pixel signal.

The digital signal processing circuit 2701 is connected to the data processing unit 103 of the third semiconductor substrate 130 via the output I/F 2703. The digital signal processing circuit 2701 embeds the exposure value from the pixel control unit 401 of the same control block 400 in the image signal from the signal processing unit 402 and outputs the resulting signal to the data processing unit 103. If the digital pixel signal of one pixel is 12 bits and the exposure value is 4 bits, then the combined signal is outputted to the outside of the second semiconductor substrate 120 as the 16-bit digital pixel signal.

Thus, the exposure value is included in a portion of the digital pixel signal of each pixel, enabling easy correction of the exposure time for each pixel in the data processing unit 103.

In FIGS. 39 and 40, in the case of the control block 400B, the signal processing unit 1602 outside of the control circuit unit 210 is connected to the horizontal transfer line 3900 instead of the signal processing unit 402, and the digital pixel signal of each of the pixels 201 from the signal processing unit 1602 is outputted to the digital signal processing circuit 2701 by the horizontal transfer line 3900.

<Increasing Speed of Autonomous Exposure Control in Control Block 400 and Increasing Precision of Exposure Control by Switching of Exposure Values Between Inside/Outside of Control Block 400>

Next, another example of the autonomous exposure control line shown in FIG. 23 will be described with reference to FIGS. 41 to 51. In FIGS. 41 to 51, increased speed of autonomous exposure control in the control block 400 and exposure control by switching of the exposure value between the inside and outside of the control block 400 are realized. First, increased speed of autonomous exposure control in the control block 400 will be described with reference to FIGS. 41 to 47. In FIGS. 41 to 47, the control block 400A is used as the example, but in the case of the control block 400B, a similar configuration to the signal processing unit 402 would be used for the signal processing unit 1602, and thus, the configuration can be implemented in the control block 400B.

[Increased Speed of Autonomous Exposure Control in Control Block 400]

Figure 41:
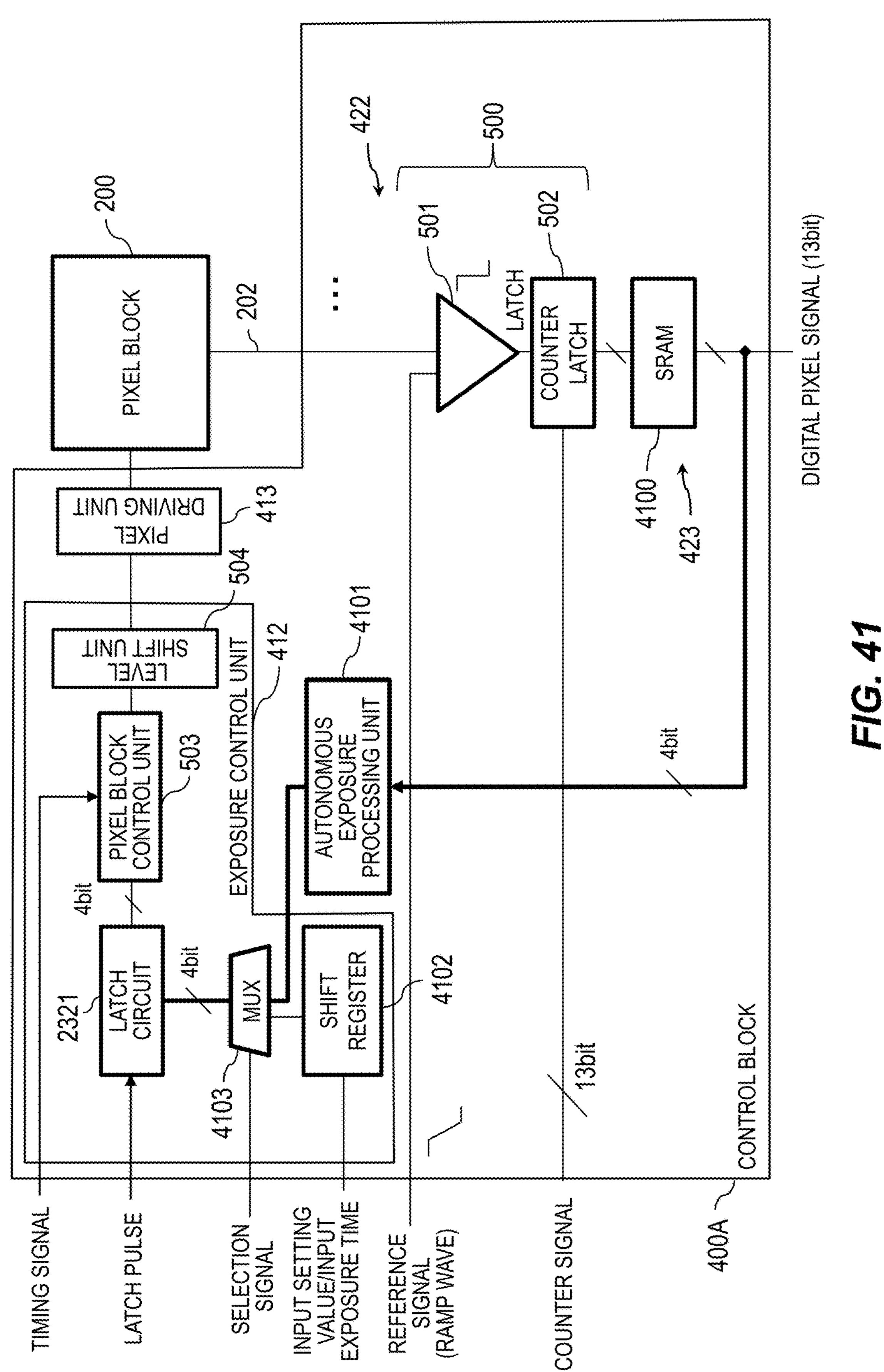
FIG. 41 is a block view showing a speed increase example 1 for autonomous exposure control in the control block.

FIG. 41 is a block view showing a speed increase example 1 for autonomous exposure control in the control block 400A. The control block 400A has n ADCs 500 and SRAM 4100, which is an example of the signal output unit 423. In FIG. 41, for ease of explanation, only one ADC 500 is shown.

In this example, the pixel signal of each of the pixels 201 converted to a digital signal by the ADC 500 is a 13-bit digital pixel signal. This digital pixel signal is stored in the SRAM 4100, and as shown in FIG. 23, is outputted to the peripheral circuit unit 121 via the column selection circuit 2301 and the horizontal transfer line 2300. The top-4-bit signal of the 13-bit digital pixel signal is outputted to the autonomous exposure processing unit 4101.

The autonomous exposure processing unit 4101 is connected to the selector 4103 in the exposure control unit 412. Also, the exposure control unit 412 has a shift register 4102 and a selector 4103, in addition to the pixel block control unit 503, the level shift unit 504, and the latch circuit 2321. The shift register 4102 stores a set exposure value.

The selector 4103 is connected to the shift register 4102 and the autonomous exposure processing unit 4101 on the input side, and is connected to the latch circuit 2321 on the output side. The selector 4103 selects the set exposure value from the shift register 4102 or the exposure value from the autonomous exposure processing unit 4101 on the basis of a selection signal. The selection signal is a signal for selecting between the set exposure value and the exposure value from the autonomous exposure processing unit 4101. The selection signal is inputted to the selector 4103 from the above-mentioned external system. The exposure value selected by the selector 4103 is outputted to the latch circuit 2321.

FIG. 42 is a descriptive view showing an example of a counter latch in the speed increase example 1 for autonomous exposure control in the control block 400A. A counter latch (storage unit) 502 stores the 13-bit digital pixel signal and outputs the same to the SRAM 4100. In FIG. 42, "x" signifies "0" or "1." The batched top-4-bit digital signal is outputted to the autonomous exposure processing unit 4101 via the SRAM 4100.

Figure 43:
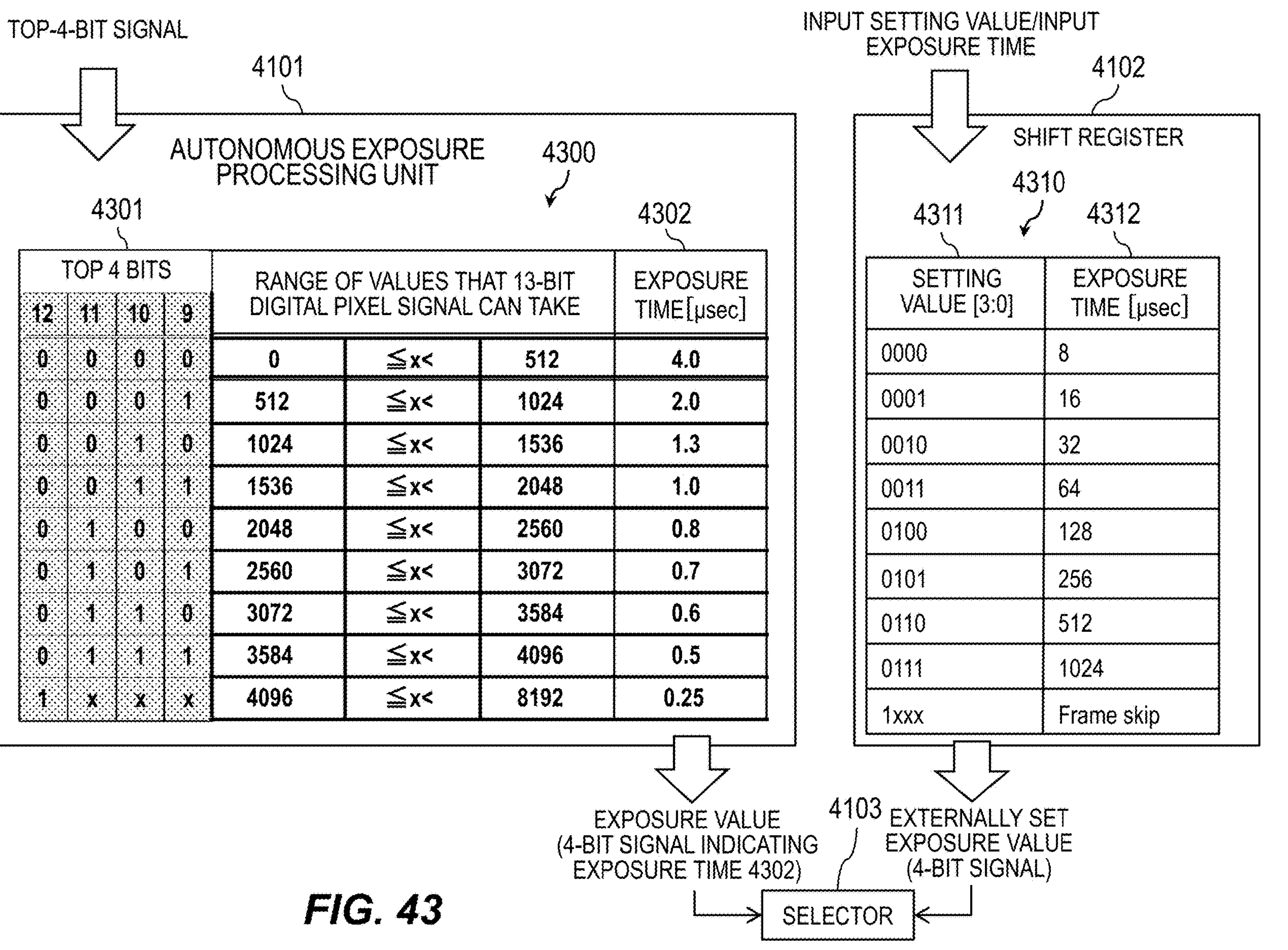
FIG. 43 is a descriptive view showing a specific example of autonomous exposure control in the speed increase example 1 for autonomous exposure control in the control block.

FIG. 43 is a descriptive view showing a specific example of autonomous exposure control in the speed increase example 1 for autonomous exposure control in the control block 400A. The autonomous exposure processing unit 4101 stores a lookup table 4300. The lookup table 4300 is a table in which top-4-bits 4301 are associated with the exposure time 4302. For ease of description, the range that the 13-bit digital pixel signal can take for associating the top-4-bits 4301 with the exposure time 4302 is indicated.

When the top-4-bit signal is inputted from the SRAM 4100, the autonomous exposure processing unit 4101 specifies the top-4-bits 4301 with reference to the lookup table 4300 and reads the associated exposure time 4302. The autonomous exposure processing unit 4101 outputs the 4-bit signal indicating the read exposure time 4302 to the selector 4103.

The shift register 4102 has a setting value table 4310 in which a setting value 4311 is associated with an exposure time 4312. The shift register 4102 outputs the setting value 4311 matching the 4-bit input setting value from the external system or the setting value 4311 corresponding to the exposure time 4312 matching the input exposure time to the selector 4103 as the set exposure value.

What is important is whether the pixels 201 are saturated, and thus, the counter latch that is one example of the storage unit 502 (hereinafter, the counter latch 502) need not output all 13 bits of the digital pixel signal to the autonomous exposure processing unit 4101. Also, the bottom 9 bits include noise, and thus, are not important in determining whether the pixels 201 are saturated. Thus, the autonomous exposure processing unit 4101 specifies the exposure time 4302 by the top-4-bit signal with reference to the lookup table 4300. As a result, it is possible to realize increased processing speed for the autonomous exposure processing unit 4101.

Next, a speed increase example 2 of autonomous exposure control in the control block 400A will be described. In the speed increase example 2 of autonomous exposure control in the control block 400A, the top bits of the digital pixel signal are used to select between maintenance, one-step increase, or one-step decrease of the previously outputted exposure value, thereby determining the exposure value. The block configuration is the same as that of FIG. 41, and therefore, will be omitted.

FIG. 44 is a descriptive view showing an example of a counter latch 502 in the speed increase example 2 for autonomous exposure control in the control block 400A. In usage example 2, the counter latch 502 outputs the batched top-3-bit digital signal to the autonomous exposure processing unit 4101 via the SRAM 4100.

Figure 45:
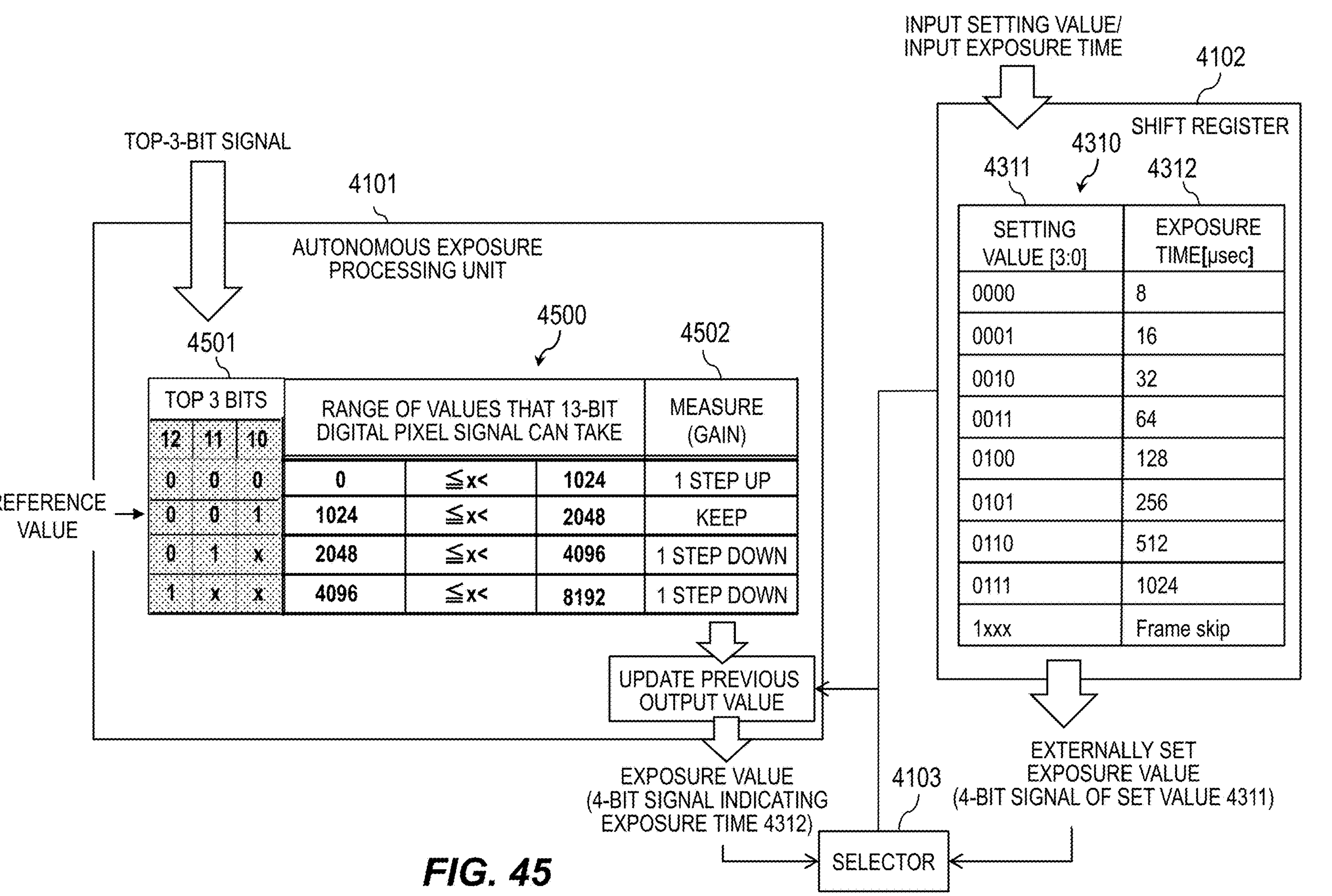
FIG. 45 is a descriptive view showing a specific example of autonomous exposure control in the speed increase example 2 for autonomous exposure control in the control block.

FIG. 45 is a descriptive view showing a specific example of autonomous exposure control in the speed increase example 2 for autonomous exposure control in the control block 400A. The autonomous exposure processing unit 4101 stores a lookup table 4500. The lookup table 4500 is a table in which top-3-bits 4501 are associated with a measure 4502. For ease of description, the range that the 13-bit digital pixel signal can take for associating the top-3-bits 4501 with the measure 4502 is indicated.

The autonomous exposure processing unit 3101 sets the value "001" (corresponding to "keep" for measure 4502) for the top-3-bits 4501 of the lookup table 4500 as a reference value. Also, the autonomous exposure processing unit 4101 stores the setting value 4311 of the shift register during the first round, and stores a set value (referred to as the previous output value) outputted one frame prior from the selector 4103 for the second round onward.

When the top-3-bit signal is inputted from the SRAM 4100, the autonomous exposure processing unit 4101 specifies the top-3-bits 4501 with reference to the lookup table 4500 and reads the associated measure 4502. The autonomous exposure processing unit 4101 updates the previous output value using the read measure 4502.

If the previous output value is "0011," then if the top-3-bits 4501 are "000," then the measure 4502 is "one step up." In this case, the autonomous exposure processing unit 4101 increases the previous output value "0011" by one step to "0100," and outputs the updated setting value "0100" to the selector 4103.

Also, if the top-3-bits 4501 are "001," then the measure 4502 is "keep," signifying maintaining the value. In this case, the autonomous exposure processing unit 4101 outputs the previous output value "0011" to the selector 4103. Also, if the top-3-bits 4501 are "011," for example, then the measure 4502 is "one step down." In this case, the autonomous exposure processing unit 4101 decreases the previous output value "0011" by one step to "0010," and outputs the updated setting value "0010" to the selector 4103.

Similar to the usage example 1, what is important is whether the pixels 201 are saturated, and thus, the counter latch 502 need not output all 13 bits of the digital pixel signal to the autonomous exposure processing unit 4101. Also, the bottom 10 bits include noise, and thus, are not important in determining whether the pixels 201 are saturated.

Thus, the autonomous exposure processing unit 4101 executes the measure 4502 for the exposure time 4302 by the top-3-bit signal with reference to the lookup table 4500. As a result, it is possible to realize increased processing speed for the autonomous exposure processing unit 4101.

In usage example 2, the autonomous exposure processing unit 4101 executes the measure 4502 that is increasing or decreasing the exposure time 4312 by one step, and thus, it is sufficient to handle 3 of the top bits instead of 4. Thus, compared to usage example 1, it is possible to reduce the bit width transferred from the counter latch 502 to the autonomous exposure processing unit 4101.

Also, the lookup table 4500 is one example, and the range for one step up, keep, and one step down may be expanded or contracted. Also, the measure 4502 for a top-3-bit 4501 value of "1xx" may be "two-steps down," for example. Additionally, any one of the values "one step up," "one step down," and "keep" for the value of the measure 4502 may be omitted.

Next, a speed increase example 3 of autonomous exposure control in the control block 400A will be described. In the speed increase example 3 for autonomous exposure control in the control block 400A, unlike the above-mentioned speed increase examples 1 and 2, an analog pixel signal is outputted from the signal line 202 to the autonomous exposure processing unit 4101, where autonomous exposure control is executed.

Figure 46:
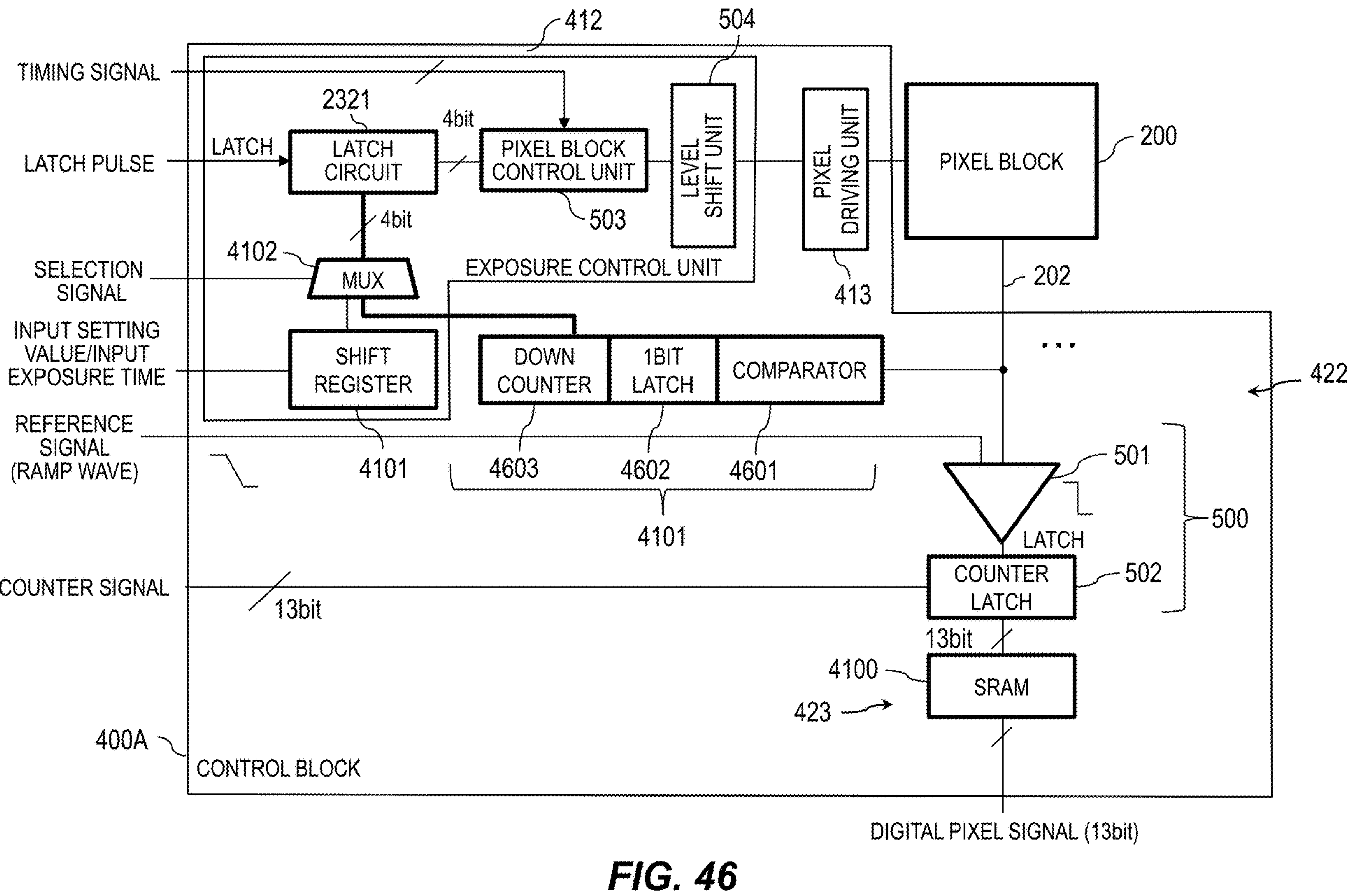
FIG. 46 is a block view showing a speed increase example 3 for autonomous exposure control in the control block.

FIG. 46 is a block view showing a speed increase example 3 for autonomous exposure control in the control block 400A. The autonomous exposure processing unit 4101 is connected to the signal line 202 of each pixel column of the pixel block 200. The autonomous exposure processing unit 4101 has a comparator 4601, a 1-bit latch 4602, and a down counter 4603.

Figure 47:
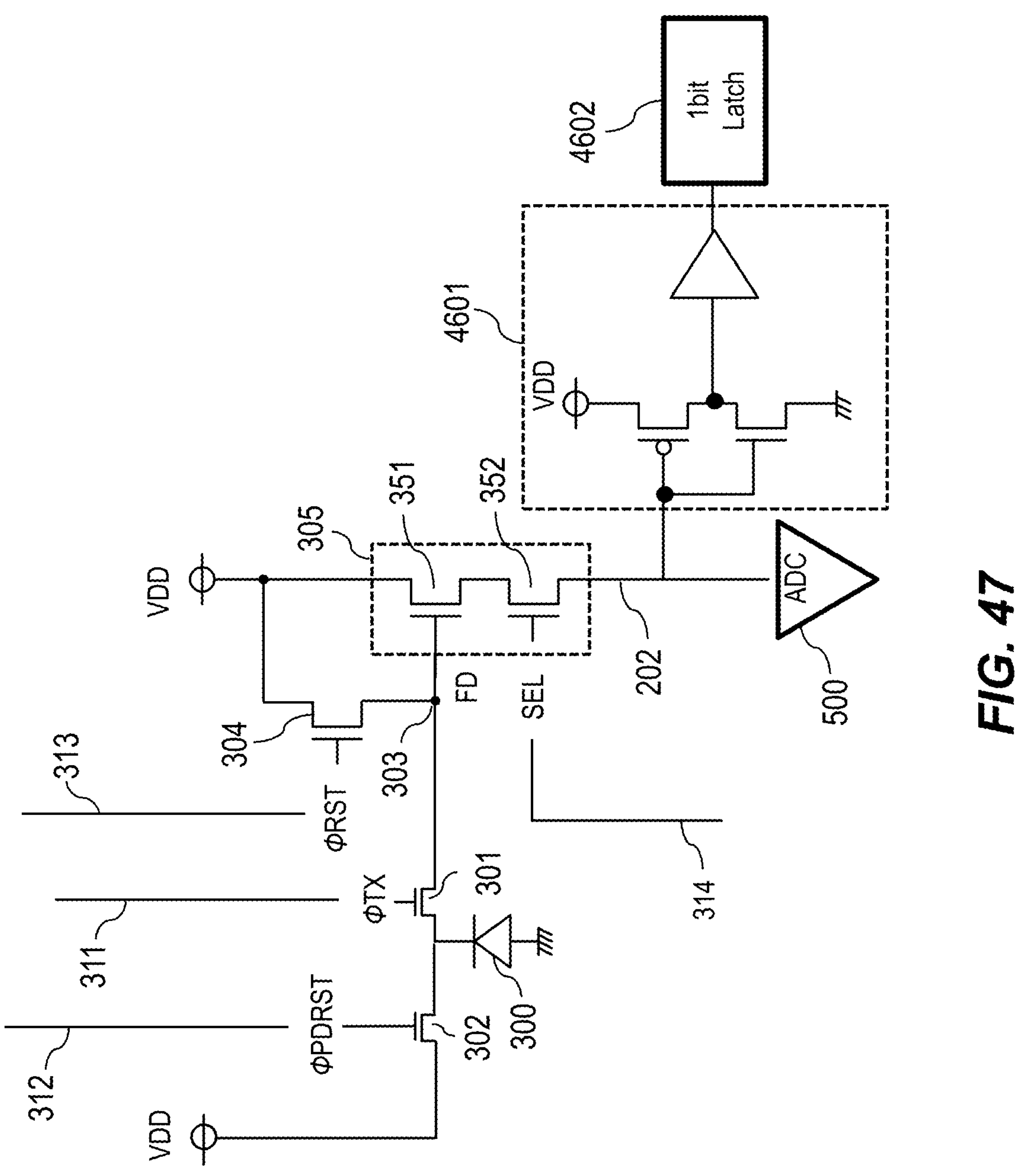
FIG. 47 is a circuit diagram showing an example of the comparator.

FIG. 47 is a circuit diagram showing an example of the comparator 4601. The comparator 4601 is a so-called CMOS inverter that compares the voltage of an analog pixel signal to a voltage threshold. The less the electric charge accumulated in the photoelectric conversion unit 300 is, the higher the potential is for the analog pixel signal flowing through the signal line 202 from the pixel 201 to the comparator 4601. If the voltage of the analog pixel signal exceeds the threshold voltage, the comparator 4601 outputs "0" to the 1-bit latch 4602. The 1-bit latch 4602 then stores "0."

The more the electric charge accumulated in the photoelectric conversion unit 300 is, the lower the potential is for the analog pixel signal flowing through the signal line 202 from the pixel 201 to the comparator 4601. If the voltage of the analog pixel signal is at or below threshold voltage, the comparator 4601 outputs "1" to the 1-bit latch 4602. The 1-bit latch 4602 then stores "1" and outputs this value to the down counter 4603.

Returning to FIG. 46, the down counter 4603 does not output a signal to the selector 4103 until a 1-bit signal indicating "1" is inputted from the 1-bit latch 4602. As a result, the selector 4103 selects the set exposure value in the shift register 4102 and outputs the selected exposure value to the latch circuit 2321. If the down counter 4603 receives input of a 1-bit signal indicating "1" from the 1-bit latch 4602, then the setting value 4311 indicating the set exposure value of the shift register 4102 is reduced by one step. If, for example, the setting value 4311 of the set exposure value is "0111," then the shift register 4102 reduces this value by one step from "0111" to "0110" and outputs the reduced value to the selector 4103 as the set exposure value. The selector 4103 selects the updated set value "0110" and outputs the set value to the latch circuit 2321.

According to the usage example of the signal line 202, the analog pixel signal prior to digital conversion is used to detect the saturation of the pixels 201 and autonomously control the exposure time so as to shorten the same, and thus, it is possible to increase processing speed compared to a case in which autonomous exposure control is performed using a digital pixel signal.

Also, if a 1-bit signal of "0" is inputted a plurality of times consecutively to the 1-bit latch 4602, then the 1-bit latch 4602 may output the 1-bit signal indicating "1" to the down counter 4603. In this case, the pixel 201 is in a continuously dark state, and thus, the down counter 4603 may control the set exposure value so as to raise the same by one step.

[Exposure Control by Switching of Exposure Values Between Inside/Outside of Control Block 400]

Next, exposure control by switching the exposure values between the inside and outside of the control block 400 will be described with reference to FIGS. 48 to 51. The exposure control by switching the exposure values between the inside and outside of the control block 400 is executed by an external system.

Figure 48:
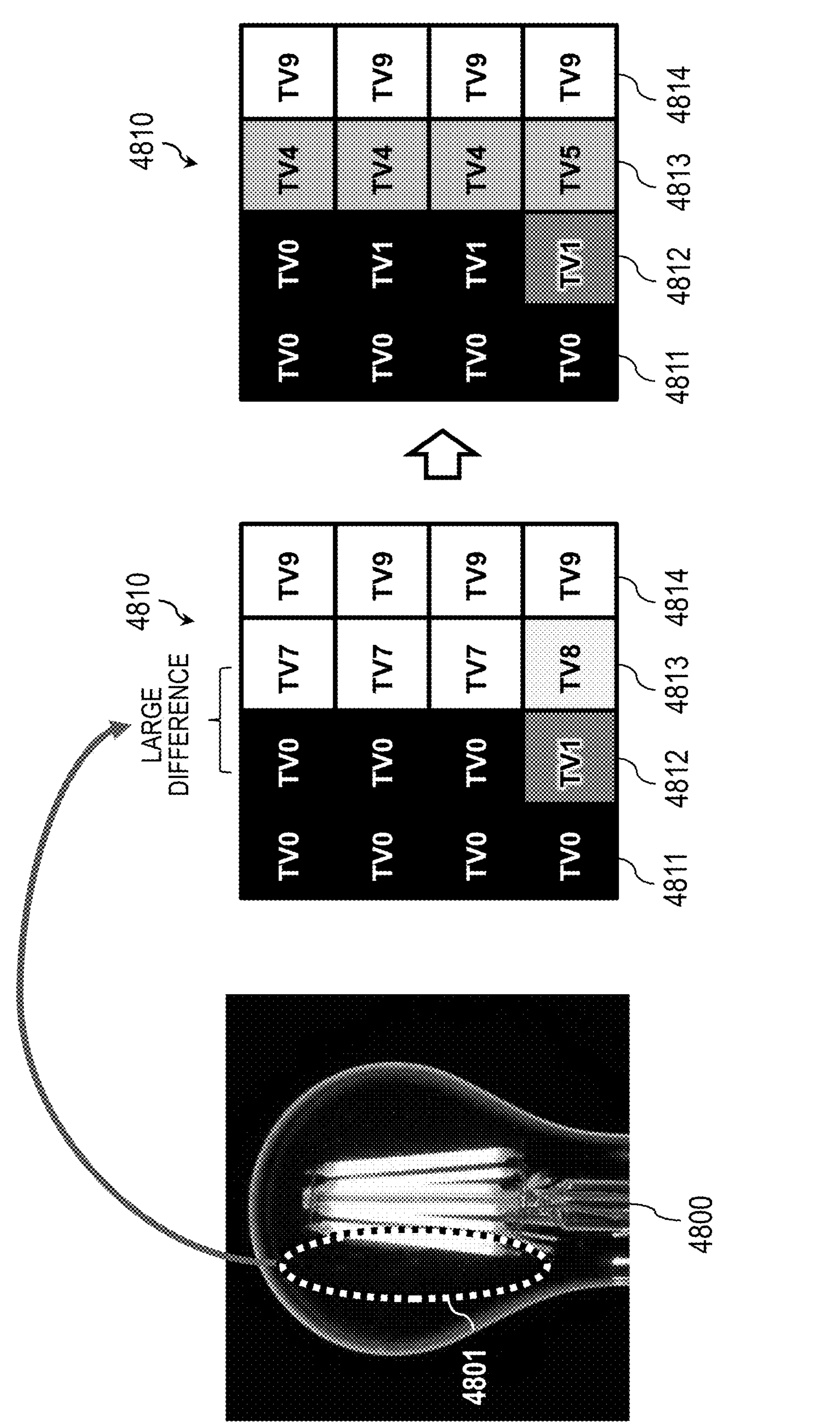
FIG. 48 is a descriptive view showing an exposure control example 1 for switching the exposure values between the inside and outside of the second semiconductor substrate.

FIG. 48 is a descriptive view showing an exposure control example 1 for switching the exposure values between the inside and outside of the second semiconductor substrate 120. In the exposure control example 1, precision of exposure control is increased by reducing the exposure time difference (step) between adjacent pixel blocks 200. The external system creates an exposure table 4810 for image data 4800 acquired from the pixel unit 101. The exposure table 4810 is a table that calculates the TV value for each pixel block 200. The TV value indicates the exposure time set for the pixel block 200.

The external system identifies areas where the difference between TV values is greater than or equal to a threshold at a boundary between one or more pixel blocks arranged in the column direction (pixel block column) or between one or more pixel blocks arranged in the row direction (pixel block row). In an image region 4801 including a filament emitting light and a black background as in the image data 4800, the difference in TV values is greater than or equal to a threshold at the boundary, which increases noise.

Thus, the external system specifies a pixel block column or a pixel block row at the boundary and updates the TV values such that the difference therebetween is no longer greater than or equal to the threshold. In FIG. 48, the difference between the TV values at a pixel block column 4812, which is the second column from the left in the exposure table 4810, and the TV values at a pixel block column 4813, which is the third column, is greater than or equal to the threshold, and thus, the pixel block column 4812 and the pixel block column 4813 are designated as the boundary. The TV values of the third from the left pixel block column 4813 are thus updated. The external system sets, as the TV values for the third from the left pixel block column 4813, the average of the TV values of the second from the left pixel block column 4812 and the TV values of the fourth from the left pixel block column 4814 (fractions in the average may be rounded up or down).

The external system may alternatively set, as the TV values for the second from the left pixel block column 4812, the average of the TV values of the leftmost pixel block column 4811 and the TV values of the third from the left pixel block column 4813 (fractions in the average may be rounded up or down).

The external system writes the updated TV values as the set exposure values to the shift register 4102 for the control block 400 handling the pixel block 200 with the updated TV values, and outputs the selection signal for selecting the set exposure value from the shift register 4102 to the selector 4103. As a result, it is possible to attain image data with reduced noise at the boundary between light and dark.

Figure 49:
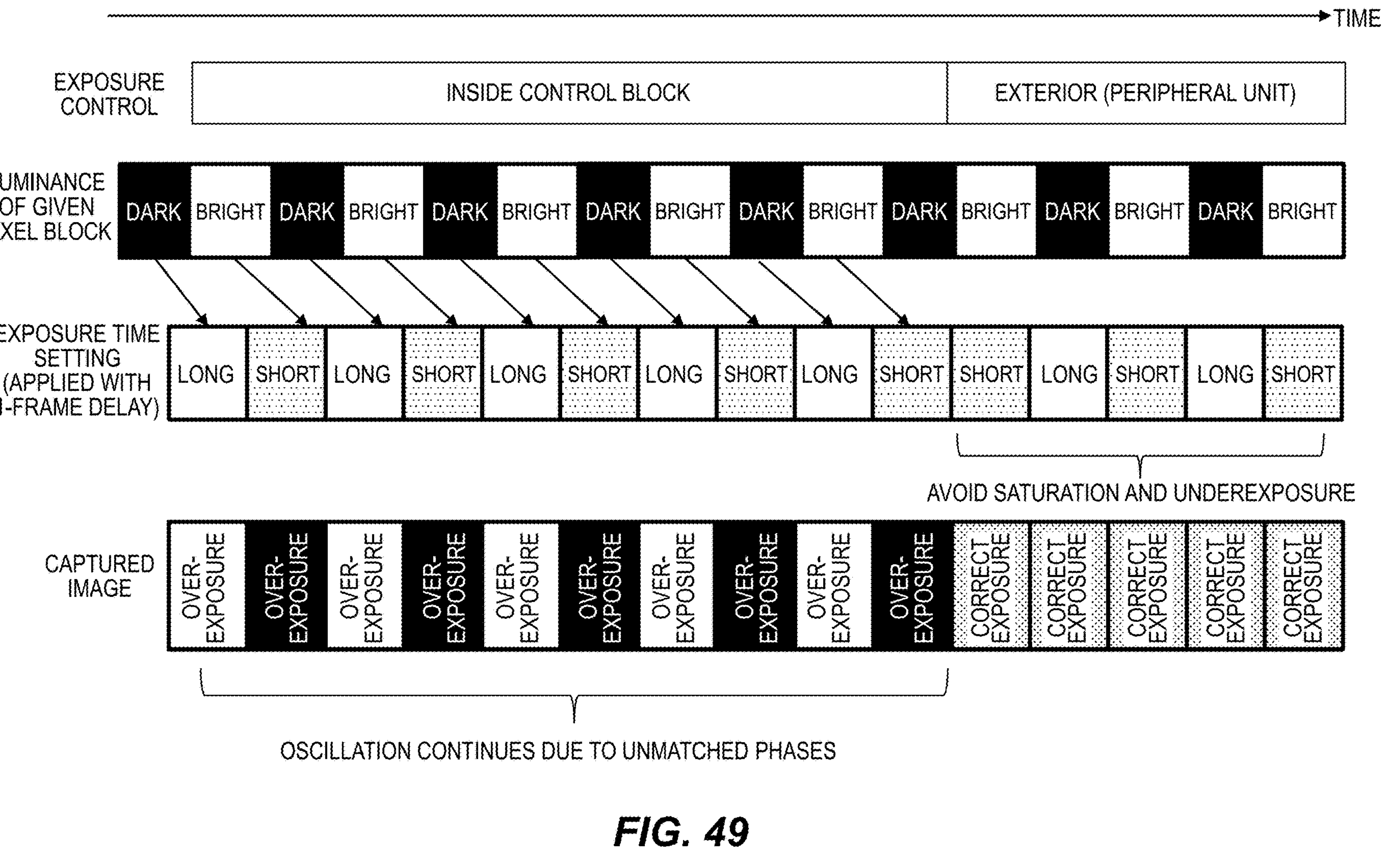
FIG. 49 is a descriptive view showing an exposure control example 2 for switching the exposure values between the inside and outside of the second semiconductor substrate.

FIG. 49 is a descriptive view showing an exposure control example 2 for switching the exposure values between the inside and outside of the second semiconductor substrate 120. In the exposure control example 2, if the phases do not match between the light emission frequency of a subject such as a light-emitting body, a moving body, or a rotating body, and a sampling frequency of the imaging element 100, it is possible to switch from autonomous exposure control by the control blocks 400 to exposure control by an external system, thereby stabilizing exposure.

If phases do not match between the light emission frequency, a moving frequency, or a rotational frequency of a subject, and the sampling frequency of the imaging element 100, the luminance of a given pixel block 200 is repeatedly cycled between light and dark. The exposure value in the autonomous exposure processing unit is used at a one-frame delay, and thus, when the luminance of the pixel block 200 is "bright," then due to the one-frame delay, a long exposure value is used, causing the pixel block 200 to be overexposed during image capture.

Also, when the luminance of the pixel block 200 is "dark," then due to the one-frame delay, a short exposure value is used, causing the pixel block 200 to be underexposed during image capture. Thus, in the pixel block 200, the frequency of the above-mentioned subject and the phase of the exposure value does not match, causing under- and overexposure to be alternately appear and continue to oscillate.

In such a case, the external system detects the repeat count or repeat time for under- and overexposure for each pixel block 200, and for pixel blocks 200 where oscillation is detected, a selection signal to select a set exposure value from the shift register 4102 is outputted to the selector 4103. As a result, such oscillation between under- and overexposure is avoided, thereby stabilizing exposure of the pixel block 200. After stabilization of exposure, the external system may output a selection signal for selecting an exposure value from the autonomous exposure processing units 411 and 4101 to the selector 4103.

Figure 50:
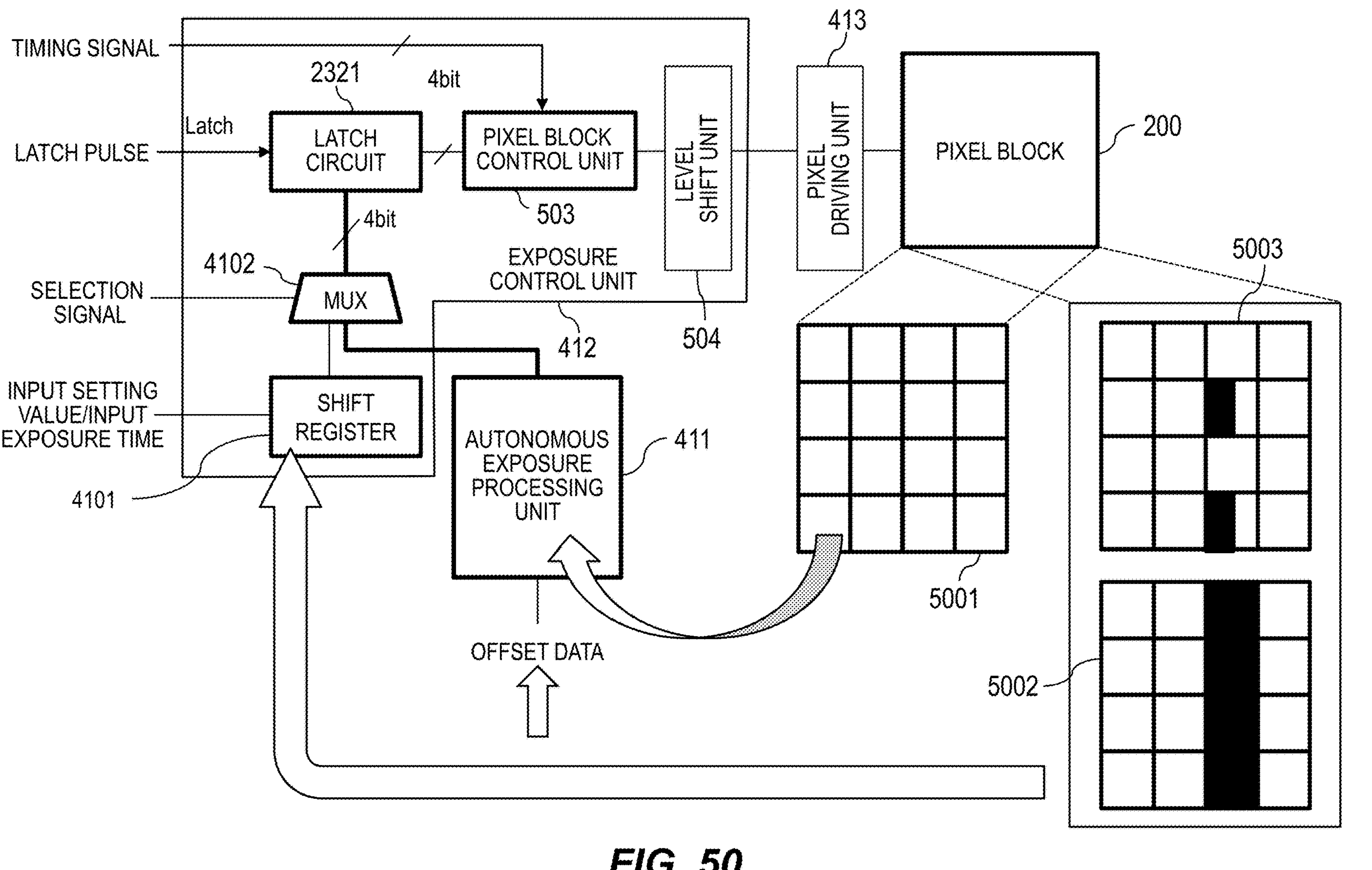
FIG. 50 is a descriptive view showing an exposure control example 3 for switching the exposure values between the inside and outside of the control block.

FIG. 50 is a descriptive view showing an exposure control example 3 for switching the exposure values between the inside and outside of the control block 400. In the exposure control example 3, whether to use autonomous exposure control within the control block 400 or to use exposure control by an external system is set for each pixel block 200, thereby optimizing exposure.

The external system outputs to the selector 4103*a* selection signal for selecting an exposure value attained by the autonomous exposure processing unit 411 for pixel blocks 200 for which the number of defective pixels is less than or equal to an allowable value (hereinafter referred to as first pixel blocks 5001). On the other hand, the external system outputs to the selector 4103*a* selection signal for selecting a set exposure value from the shift register 4102 for pixel blocks 200 where the number of defective pixels is not less than or equal to the allowable value (hereinafter referred to as second pixel blocks 5002) or pixel blocks 200 including AF pixels, a portion of which are shielded from light (hereinafter referred to as third pixel blocks 5003).

For a pixel block 200 that was initially the first pixel block 5001 but where defective pixels are identified after shipping and therefore was switched to the second pixel block 5002, the external system outputs a selection signal that selects the set exposure value from the shift register 4102 to the selector 4103 of the control block 400 handling the pixel block 200.

Also, for second pixel blocks 5002 and third pixel blocks 5003 where the number of defective pixels is known at the time of shipping, offset data is set to the autonomous exposure processing unit 411 of the corresponding control block 400. For pixel blocks 200 provided with the offset data, the external system outputs a selection signal for selecting an exposure value provided from the autonomous exposure processing unit 411 to the selector 4103.

Here, the offset data is a parameter for correcting the exposure value in the pixel block 200, and in the case of the second pixel block 5002 is the position of the defective pixels. As a result, the autonomous exposure processing unit 411 can omit the defective pixels in the pre-processing unit and calculate the maximum value or average of the values of the digital pixel signal.

In the case of the third pixel block 5003, the offset data is the position and weight of the AF pixel. In AF pixels, a portion of the light-receiving area is shielded from light, and thus, if the light-shielding area is half of the normal light-receiving area of the AF pixel, then the digital pixel signal from the AF pixel needs to be doubled, and thus, the weight is 2.

Similarly, if the light-shielding area is ⅓ of the normal light-receiving area of the AF pixel, then the digital pixel signal from the AF pixel needs to be tripled, and thus, the weight is 3. Thus, the weight is calculated as the light-receiving area of the pixel 201 divided by the light-shielding area of the AF pixel. In the case of the third pixel block 5003 as well, similar to the second pixel block 5002, the offset data may be the position of AF pixel. The autonomous exposure processing unit 411 can omit the AF pixels in the pre-processing unit 2311 and calculate the maximum value or average of the values of the digital pixel signal.

For a pixel block 200 that was initially the first pixel block 5001 but where defective pixels are identified after shipping and therefore was switched to the second pixel block 5002, the external system may set offset data for defective pixels to the autonomous exposure processing unit 411 of the control block 400 handling the pixel block 200.

In this manner, according to the pixel defect state in the pixel block 200, it is possible to set whether to use autonomous exposure control within the control block 400 or to use exposure control by the external system, enabling optimization of exposure for each pixel block 200.

<Read Method for Exposure Value for Each Control Block 400>

Next, a read method for the exposure value for each control block 400 will be described. If outputting an exposure value for each pixel block 200 to the external system to generate an image, the external system outside of the imaging element 100 needs to demodulate (gain) the digital image signal of each pixel 201 of the pixel block 200 on the basis of the exposure value for each pixel block 200. In this case, the imaging element 100 sets additional information including an image block ID and an exposure value to the digital image signal of each pixel 201 of the pixel block 200 (hereinafter, the image signal of the pixel block 200), and outputs the resulting signal to the external system.

When additional information is set to the image signal of the pixel block 200, the data transmission volume to the external system increases due to the addition of the additional information, which can result in a decreased communication speed or an increase in power consumption. Also, the smaller the size of the pixel block 200 is as a result of more precise exposure control (that is, the lower the pixel count per pixel block 200 is), the greater the impact of decreased communication speed and increased power consumption is. Below, a read method for the exposure value for each control block 400 for mitigating a decrease in communication speed and an increase in power consumption will be described.

Figure 51:
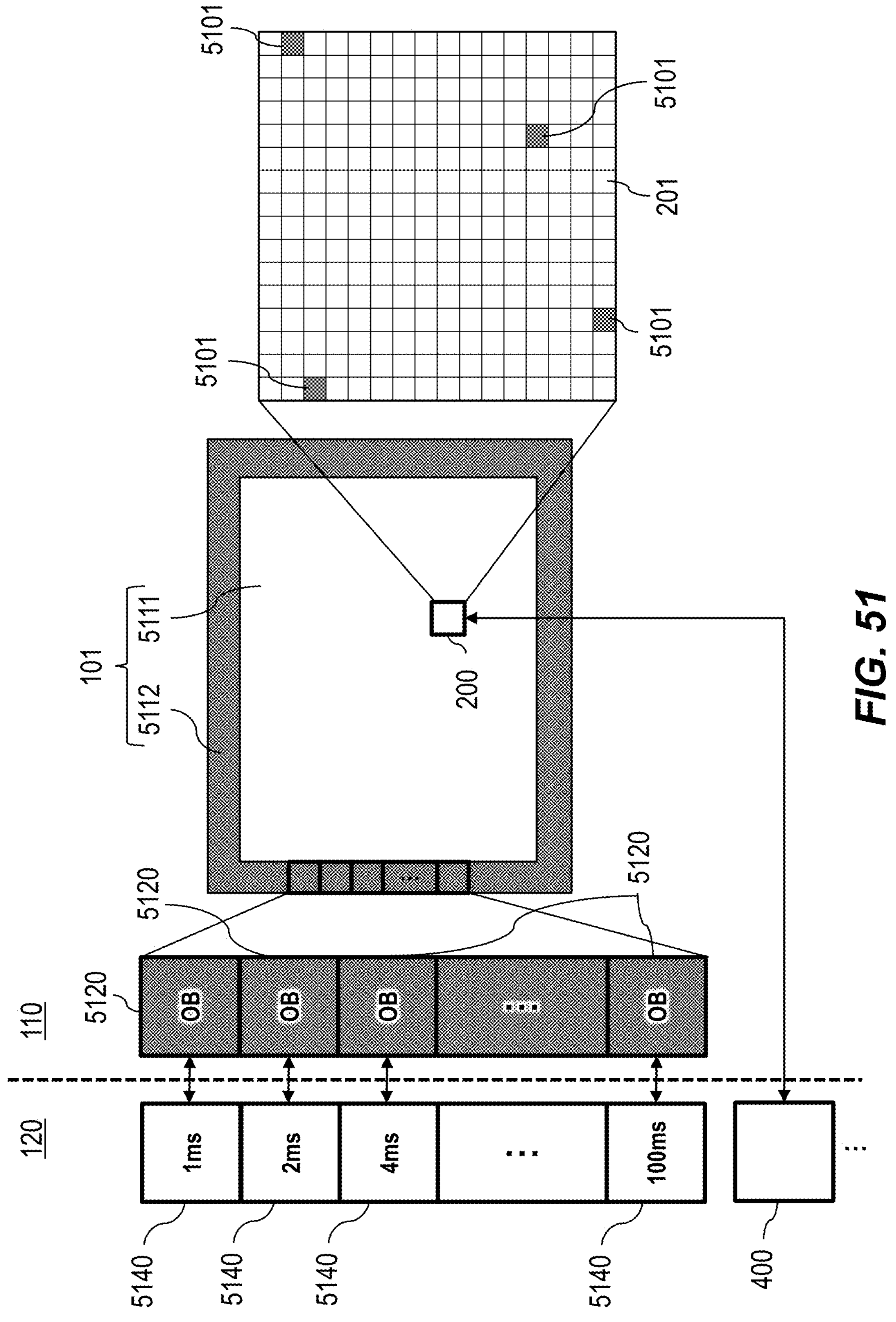
FIG. 51 is a descriptive view showing a read example 1 for reading the exposure values for each control block.

FIG. 51 is a descriptive view showing a read example 1 for reading the exposure values for each control block 400. The pixel unit 101 of the first semiconductor substrate 110 has an active pixel area 5111 that receives light from a subject, and an optical black pixel area 5112 formed to surround the active pixel area 5111. The active pixel area 5111 is constituted of the above-described plurality of pixel blocks 200.

The optical black pixel area 5112 is a collection of optical black pixels. The optical black pixels are pixels 201 for which the light-receiving area where the photoelectric conversion unit 300 can receive light is shielded. The optical black pixels do not receive light, and thus, the exposure time of the optical black pixels is defined solely by the light-receiving time regardless of the incident light quantity. Similar to the active pixel area 5111, the optical black pixel area 5112 is also constituted of a plurality of pixel blocks 200. The pixel blocks 200 in the optical black pixel area 5112 are referred to as OB pixel blocks 5120.

An exposure value corresponding to the exposure time (e.g., any one of 1 ms, 2 ms, 4 ms . . . 100 ms) is set as the set exposure value for the shift registers 4102 of the exposure control units 412 of control blocks 400 corresponding to one or more OB pixel blocks 5120 (hereinafter referred to as OB control blocks 5140) among all of the OB pixel blocks 5120. The OB control block 5140 is connected to the control block 400 in a manner enabling communication therewith.

One or more reference pixels 5101 are provided in at least one pixel block 200 among all the pixel blocks 200 within the active pixel area 5111. Like the optical black pixels, the reference pixel 5101 is a pixel 201 for which the light-receiving area where the photoelectric conversion unit 300 can receive light is shielded. Also, like the optical black pixels, the reference pixel 5101 does not receive light, and thus, the exposure time of the optical black pixels is defined solely by the light-receiving time regardless of the incident light quantity.

In the pixel block 200, each pixel 201 outputs a pixel signal to the control block 400. The pre-processing unit 2311 of the control block 400 calculates a statistical value for the pixel signal of the reference pixel 5101 (e.g., the mean, medium, maximum, or minimum; referred to as the reference pixel pre-processing result), and outputs the statistical value to the exposure value computation unit 2313.

In each OB pixel block 5120 as well, the optical black pixels output pixel signals to the OB control block 5140. The pre-processing unit 2311 of each OB control block 5140 calculates the statistical value of the pixel signal of each optical black pixel (hereinafter referred to as the black pixel pre-processing result).

The exposure value computation unit 2313 of the control block 400 acquires the black pixel pre-processing result by the pre-processing unit 2311 of each OB control block 5140. Then, the exposure value computation unit 2313 of the control block 400 compares the reference pixel calculation result to the black pixel pre-processing result. The exposure value computation unit 2313 of the control block 400 identifies the black pixel pre-processing result with the lowest difference from the reference pixel calculation result.

The exposure value computation unit 2313 of the control block 400 acquires the exposure value stored by the OB control block 5140 from the OB control block 5140 where the specified black pixel pre-processing result was calculated. The exposure value computation unit 2313 of the control block 400 outputs the acquired exposure value to the exposure control unit 412.

Thus, by comparing the pixel signals from the reference pixel 5101 and the optical black pixels for each control block 400, it is possible to read the exposure value determined solely by the light-receiving time regardless of the incident light quantity. Also, the control block 400 outputs the exposure value read in the manner described to the external system together with the digital pixel signal of each pixel 201 in the corresponding pixel block 200. As a result, it is possible to mitigate a decrease in communication speed and an increase in power consumption.

Also, by disposing a plurality of reference pixels 5101 per pixel block 200, it is possible to compensate with other reference pixels 5101 even if any of the reference pixels 5101 were to have a defect. Also, the plurality of reference pixels 5101 are disposed in different rows or different columns. As a result, it is possible to avoid a pixel defect in a plurality of reference pixels 5101 arranged in the same row or same column resulting from a line defect in the pixel block 200. Also, the plurality of reference pixels 5101 may be disposed apart from each other. As a result, it is possible to compensate for the reference 5101 with digital pixel signals of surrounding pixels.

Figure 52:
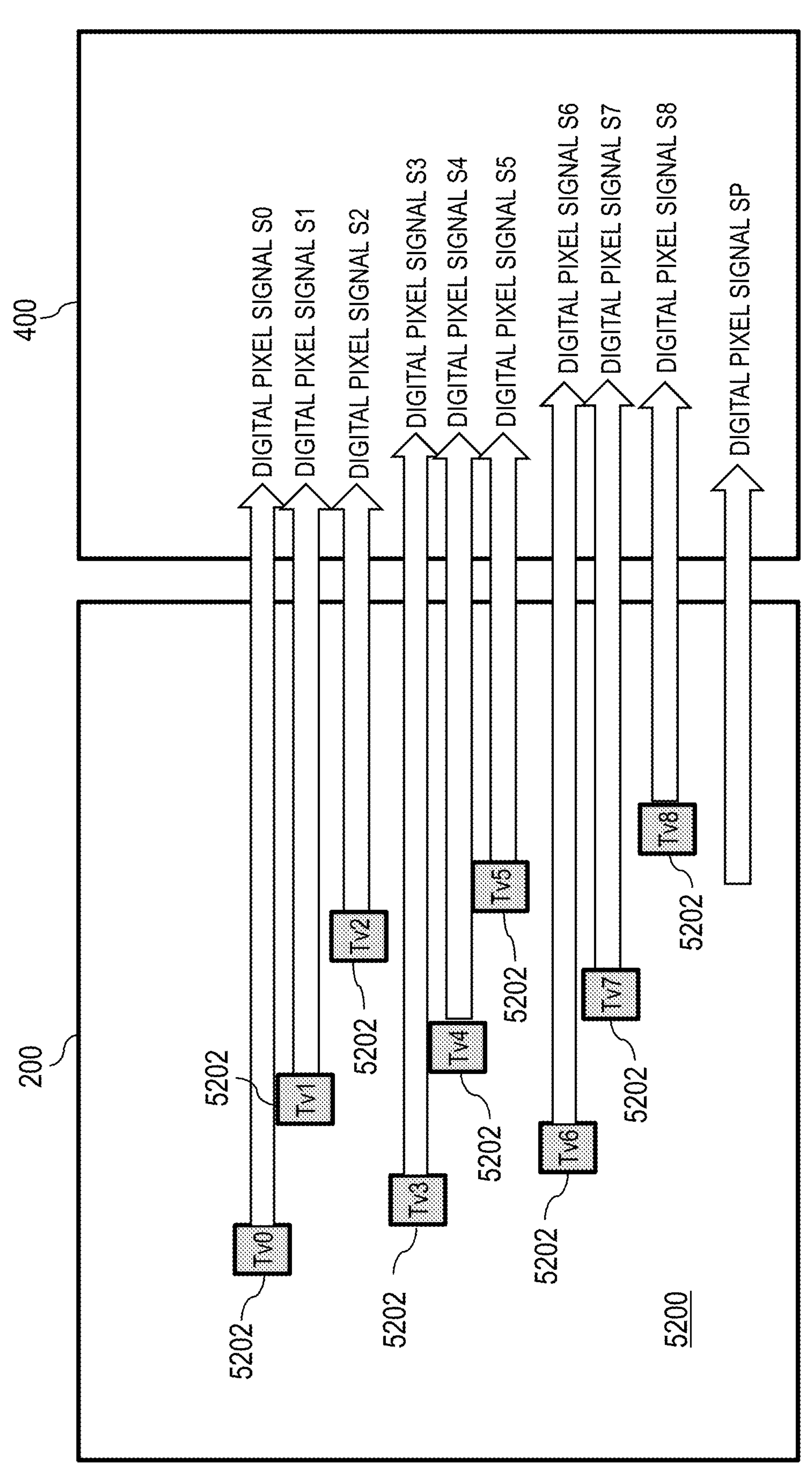
FIG. 52 is a descriptive view showing a read example 2 for reading the exposure values for each control block.

FIG. 52 is a descriptive view showing a read example 2 for reading the exposure values for each control block 400. The read example 2 differs from the read example 1 in that the exposure value is read by the control blocks 400.

The pixel blocks 200 each have a one or more reference pixels 5202. If a plurality of reference pixels 5202 are disposed, the exposure values of the reference pixels 5202 are set to differ from each other (e.g., TvO to Tv8). In the read example 2, the exposure values of a pixel area 5200 excluding the reference pixels 5202 in the pixel block 200 are determined by the exposure values attained for the reference pixels 5202. The reference pixels 5202 are not shielded from light unlike the reference pixels 5101 shown in FIG. 51.

In the control block 400, the autonomous exposure processing unit 411 acquires values S0 to S8 of the digital pixel signals from the reference pixels 5202, and a value SP of digital pixel signals from a target pixel area 5200. The value SP of the digital pixel signals of the target pixel area 5200 is a statistical value of the digital pixel signals of all pixels 201 excluding the reference pixels 5202 in the target pixel area 5200, for example.

Figure 53:
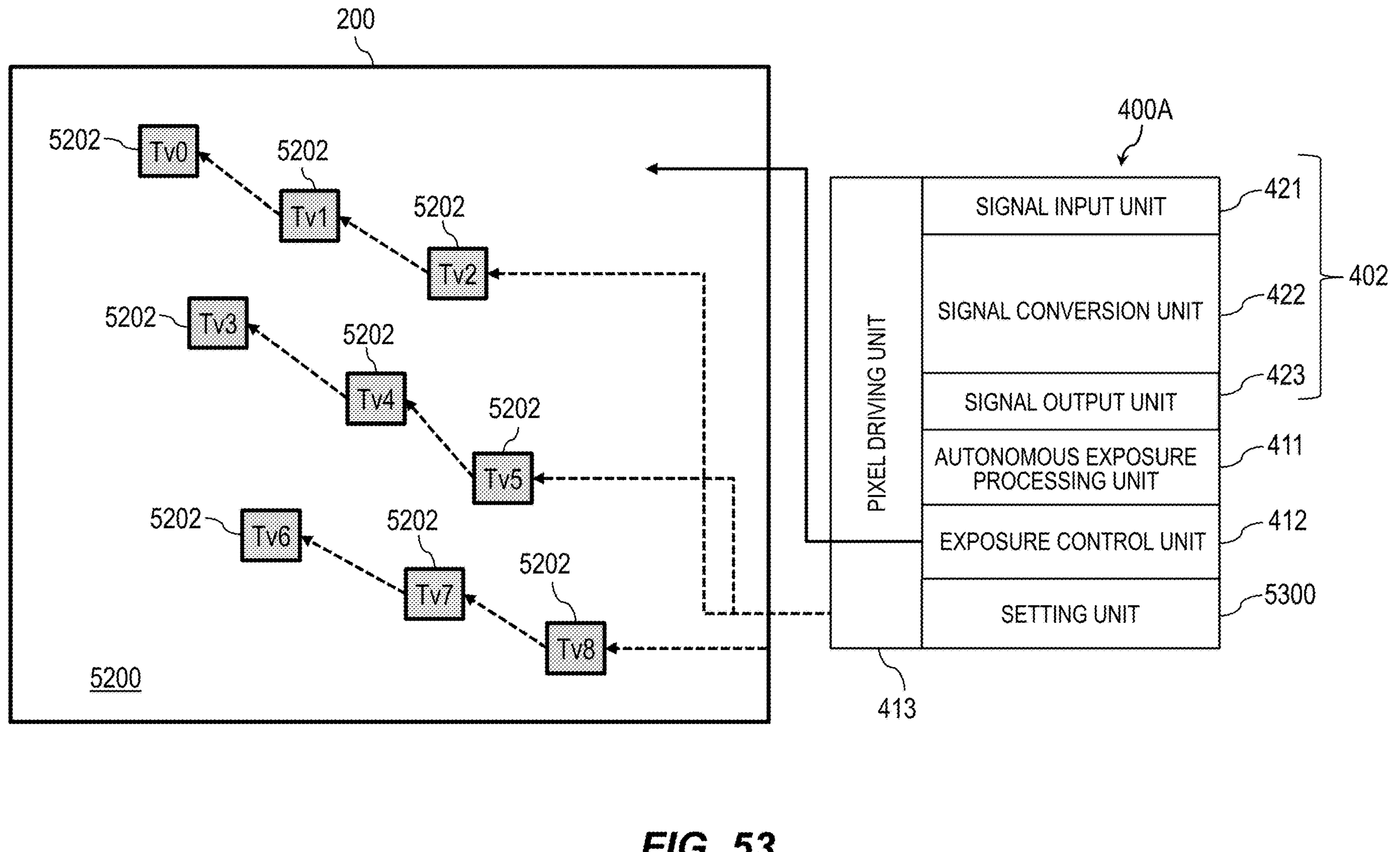
FIG. 53 is a block view showing a detailed block configuration example of the control block according to the read example 2 for reading the exposure values for each control block.

FIG. 53 is a block view showing a detailed block configuration example of the control block 400 according to the read example 2 for reading the exposure values for each control block 400. In FIG. 53, the control block 400A is used as the example, but in the case of the control block 400B, a similar configuration to the signal processing unit 402 would be used for the signal processing unit 1602, and thus, the configuration can be implemented in the control block 400B. The control block 400A has a setting unit 5300 in addition to the signal processing unit 402 (signal input unit 421, signal conversion unit 422, signal output unit 423), the autonomous exposure processing unit 411, the exposure control unit 412, and the pixel driving unit 413.

The setting unit 5300 generates and outputs reset signals (TX2) that start exposure at different reset timings for the respective reference pixels 5202. Each of the reference pixels 5202 starts (or ends) exposure (the accumulation of electric charge by the photoelectric conversion unit 300) when the reset signal from the setting unit 5300 is inputted thereto.

The autonomous exposure processing unit 411 identifies, from among S0 to S8, the value of the digital pixel signal of the reference pixel 5202 with the lowest difference from the value SP of the digital pixel signals of the target pixel area 5200. The autonomous exposure processing unit 411 sets, as the exposure value for the target pixel area 5200, an exposure value (e.g., Tv0 to Tv8) set for the reference pixel 5202 that outputted a digital pixel signal of a specific value.

Each pixel 201 in the target pixel area 5200 performs a reset operation such as starting exposure according to the exposure value set by the autonomous exposure processing unit 411 as described above.

In this manner, as a result of the exposure value being read for each control block 400, it is possible to output to the external system the exposure value together with the digital pixel signal of each pixel 201 in the corresponding pixel block 200. Thus, it is possible to mitigate a decrease in communication speed and an increase in power consumption.

Also, a plurality of reference pixels 5202 set to the same exposure value may be disposed in one pixel block 200. As a result, it is possible to compensate with other reference pixels 5202 even if the reference pixel 5202 were to have a defect. Also, the plurality of reference pixels 5202 are disposed in different rows or different columns. As a result, it is possible to avoid a pixel defect in a plurality of reference pixels 5202 arranged in the same row or same column resulting from a line defect in the pixel block 200.

<Reduction in Color Offset During Autonomous Exposure for Each Control Block 400>

In the imaging element 100, when the color of R pixels, G pixels, or B pixels is saturated, a color offset occurs during demosaiced color image processing. For example, there are cases in which, even if the average value of the digital pixel signals of all pixels 201 in the pixel block 200 were not saturated, the average value of a single RGB color is saturated. On the other hand, providing the function of detecting saturation in each individual RGB color would result in an increased circuit size.

The imaging element 100 performs autonomous exposure control for each pixel block 200 but needs to avoid image quality issues such as the color offset described above. Here, a color offset reduction example performed by an imaging element 100 for which an optimal exposure time is set in order for each RGB color not to be saturated in each pixel block 200 will be described.

Color Offset Reduction Example 1

Figure 54:
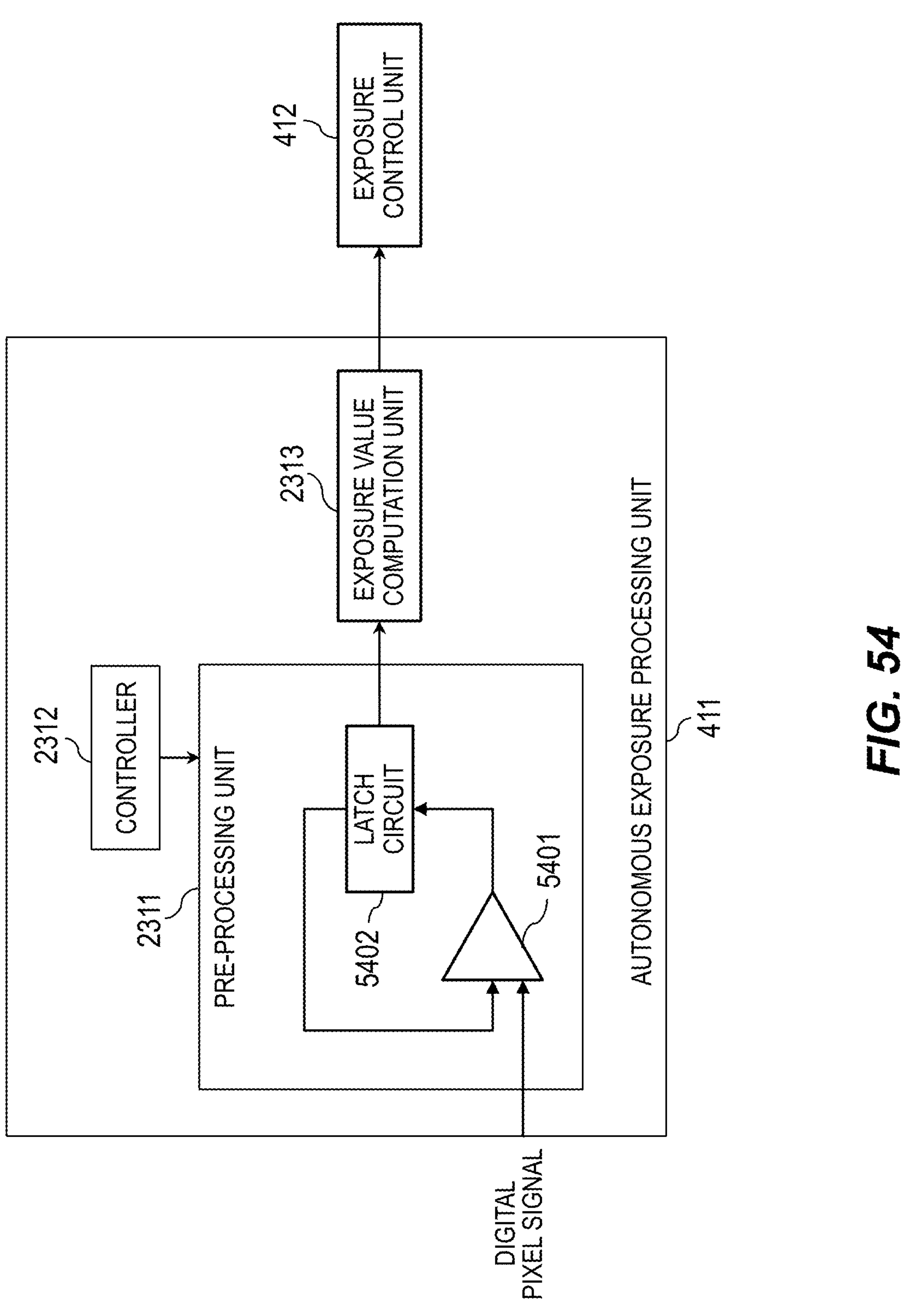
FIG. 54 is a block diagram showing an internal configuration example of the pre-processing unit in the color offset reduction example 1.

FIG. 54 is a block diagram showing an internal configuration example of the pre-processing unit 2311 in the color offset reduction example 1. The pre-processing unit 2311 has a comparator 5401 and a latch circuit 5402. The comparator 5401 receives input of digital pixel signals from the pixel block 200 without distinguishing between R pixels, G pixels, and B pixels (hereinafter referred to as the first pixel signal) and a digital pixel signal (hereinafter referred to as the second pixel signal) latched by the latch circuit 5402.

The comparator 5401 compares the first pixel signal to the second pixel signal and outputs the larger value pixel signal to the latch circuit 5402.

The latch circuit 5402 starts overwriting with the digital pixel signal from the comparator 5401 upon being internally reset by a reset pulse from the controller 2312. The latch circuit 5402 receives, from the controller 2312, input of a timing signal for when all digital pixel signals for one pixel block 200 are inputted prior to the next reset pulse, and outputs the latest saved digital pixel signal to the exposure value computation unit 2313.

The digital pixel signal outputted to the exposure value computation unit 2313 is a digital pixel signal having a maximum value in the pixel block 200 for each frame. As a result, the control block 400 can calculate an optimal exposure value for the pixel block 200 handled thereby such that each RGB color of each frame is not saturated. Thus, it is possible to mitigate color offset in the output image data from the imaging element 100 for each pixel block 200.

Color Offset Reduction Example 2

In the color offset reduction example 2, one or more white pixels are disposed in the pixel block 200. White pixels are pixels 201 having a transparent filter instead of the color filter 703.

FIG. 55 is a descriptive diagram showing an example of the pixel block 200 in the color offset reduction example 2. In FIG. 55, pixels 201 marked with R are red (R) pixels, pixels 201 marked with B are blue (B) pixels, pixels 201 marked with Ga and Gb are green (G) pixels, and pixels 201 marked with W are white pixels. The pixels 201 with a black left half are AF pixels. The AF pixels are marked with W, and thus, such pixels 201 are AF pixels and white pixels. Some pixel blocks 200 do not have AF pixels.

The pre-processing unit 2311 discards digital pixel signals of the R pixels, the B pixels, the Ga pixels, and the Gb pixels. If only one white pixel is disposed in the pixel block 200, the pre-processing unit 2311 outputs the digital pixel signal from the white pixel to the exposure value computation unit 2313. If two or more white pixels are disposed in the pixel block 200, the pre-processing unit 2311 calculates the maximum or average value of the digital pixel signals from the two or more white pixels, and outputs the calculated value to the exposure value computation unit 2313.

The white pixels are not impacted by color unlike the R pixels, the B pixels, the Ga pixels, and the Gb pixels, and thus, by using the digital pixel signals from the white pixels for exposure control, it is possible to mitigate saturation of any one RGB color in the pixel block 200.

Also, if AF pixels are included in the pixel block 200, by having the AF pixels double as white pixels, it is possible to reduce the number of RGB pixels to be replaced with white pixels. Also, in the pixel block 200, the plurality of white pixels may be disposed in a scattered fashion. In this case, the plurality of white pixels may be disposed in different rows or different columns. As a result, it is possible to avoid a pixel defect in a plurality of white pixels arranged in the same row or same column resulting from a line defect in the pixel block 200. Also, the plurality of white pixels may be disposed apart from each other. As a result, it is possible to compensate for white pixels with digital pixel signals of surrounding pixels.

Also, the plurality of white pixels may be pixels 201 for which the sensitivity has been adjusted by a plurality of steps. Specifically, an ND filter or a light-shielding metal may be used for the white pixels, for example. If adjusting the sensitivity using the light-shielding metal, such white pixels may be set as AF pixels. In this case, the width of the light-shielding metal in the row direction may be set to be greater, the wider the primary light beam angle of the lens is. As a result, the phase difference detection accuracy of the AF pixels is improved.

Color Offset Reduction Example 3

The defective pixels in the pixel block 200 are saturated, and thus, if pre-processing is performed by the pre-processing unit 2311 using the digital pixel signals of the defective pixels, the exposure time would be set to be short. Thus, in the color offset reduction example 3, the pre-processing unit 2311 eliminates the digital pixel signals of the defective pixels.

Figure 56:
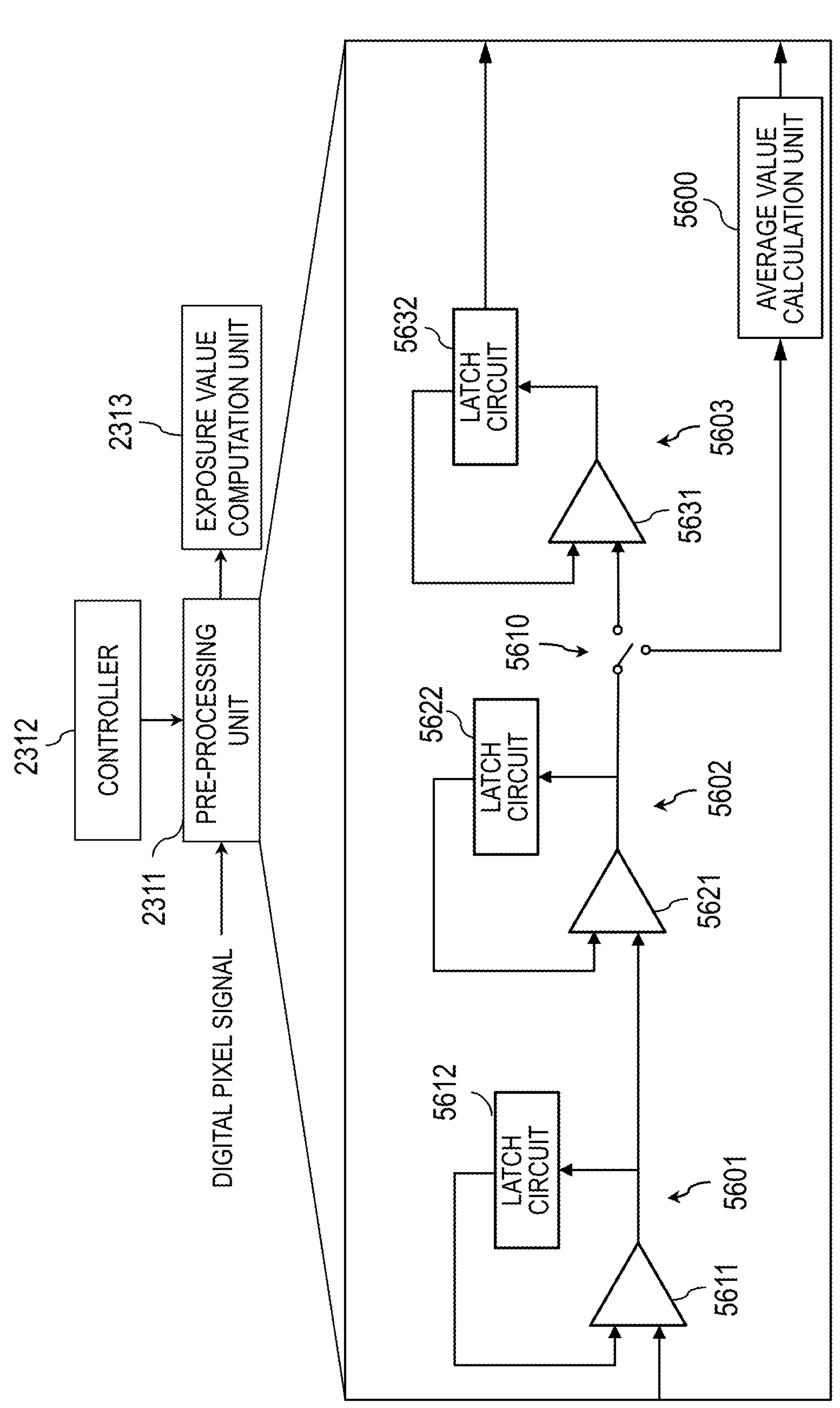
FIG. 56 is a block diagram showing an internal configuration example of the pre-processing unit in the color offset reduction example 3.

FIG. 56 is a block diagram showing an internal configuration example of the pre-processing unit 2311 in the color offset reduction example 3. Where the number of defective pixels estimated at the time of shipping is d (d being an integer of 1 or greater), the pre-processing unit 2311 connects in series d+1 data retention units that retain the digital pixel signals of the defective pixels. FIG. 56 is an example where d=2, and thus, three data retention units 5601, 5602, and 5603 are provided.

The data retention units 5601, 5602, and 5603 have comparators 5611, 5621, and 5631 and latch circuits 5612, 5622, and 5632.

In the data retention unit 5601, the comparator 5611 receives input of digital pixel signals from the pixel block 200 without distinguishing between R pixels, G pixels, and B pixels (hereinafter referred to as the first pixel signal) and a digital pixel signal (hereinafter referred to as the second pixel signal) latched by the latch circuit 5612.

The comparator 5611 compares the first pixel signal to the second pixel signal and outputs the value of the larger value pixel signal to the latch circuit 5612. The latch circuit 5612 starts overwriting with the digital pixel signal from the comparator 5611 upon being internally reset by a reset pulse from the controller 2312. The latch circuit 5402 receives, from the controller 2312, input of a timing signal for when all digital pixel signals for one pixel block 200 are inputted prior to the next reset pulse, and outputs the latest saved digital pixel signal to the exposure value computation unit 2313.

That is, for a given frame, upon input of the digital pixel signals of all pixels 201 in the pixel block 200 to the comparator 5611 as the first pixel signals, the digital pixel signal with the largest value among the digital pixel signals of all of the pixels 201 is retained in the latch circuit 5612.

In the data retention unit 5602, the comparator 5621 and the latch circuit 5622 execute the same operation as the comparator 5611 and the latch circuit 5612 for digital pixel signals not retained in the latch circuit 5612.

As a result, for a given frame, upon input of the digital pixel signals not retained in the latch circuit 5612 in the pixel block 200 to the comparator 5621 as the first pixel signals, the digital pixel signal with the largest value among the digital pixel signals that were not retained in the latch circuit 5612 is retained in the latch circuit 5622.

Even for the data retention unit 5603, the comparator 5631 and the latch circuit 5632 execute the same operation as the comparator 5611 and the latch circuit 5612 for digital pixel signals not retained in the latch circuits 5612 and 5622.

As a result, for a given frame, upon input of the digital pixel signals not retained in the latch circuits 5612 and 5622 in the pixel block 200 to the comparator 5631 as the first pixel signals, the digital pixel signal with the largest value among the digital pixel signals that were not retained in the latch circuits 5612 and 5622 is retained in the latch circuit 5632.

For a given frame, among the values of the digital pixel signals of all pixels 201 in the pixel block 200, the maximum value is retained in the latch circuit 5612, the second largest value is retained in the latch circuit 5622, and the third largest value is retained in the latch circuit 5632.

Thus, if outputting the largest value excluding the d (2) defective pixels, the pre-processing unit 2311 outputs the value of the digital pixel signal retained in the latch circuit 5632 to the exposure value computation unit 2313.

Also, the output terminal of the comparator 5621 is connected to an input terminal of the comparator 5631 and an average value calculation unit 5600 so as to be able to switch therebetween via a switch 5610. The switch 5610 is controlled by the controller 2312 so as to switch therebetween. When the comparators 5621 and 5631 are connected to each other by the switch 5610, the value of the digital pixel signal retained in the latch circuit 5632 is outputted to the exposure value computation unit 2313 as described above.

When the comparator 5621 is connected to the average value calculation unit 5600 by the switch 5610, the average value calculation unit 5600 calculates the average of digital pixel signals not retained in the latch circuits 5612, 5622, and 5632, and outputs the calculated average to the exposure value computation unit 2313.

As a result, it is possible to perform pre-processing in consideration of the number d of defective pixels, and to eliminate digital pixel signals of the defective pixels. Thus, it is possible to mitigate color offset in the output image data from the imaging element 100 for each pixel block 200.

Color Offset Reduction Example 4

The color offset reduction example 4 is a modification example of the color offset reduction example 3. In the color offset reduction example 3, the circuit configuration of the pre-processing unit 2311 took into consideration the number d of defective pixels at the time of shipping, but in the color offset reduction example 4, the number d of defective pixels is taken into consideration not only at the time of shipping, but also for calibration during use.

Figure 57:
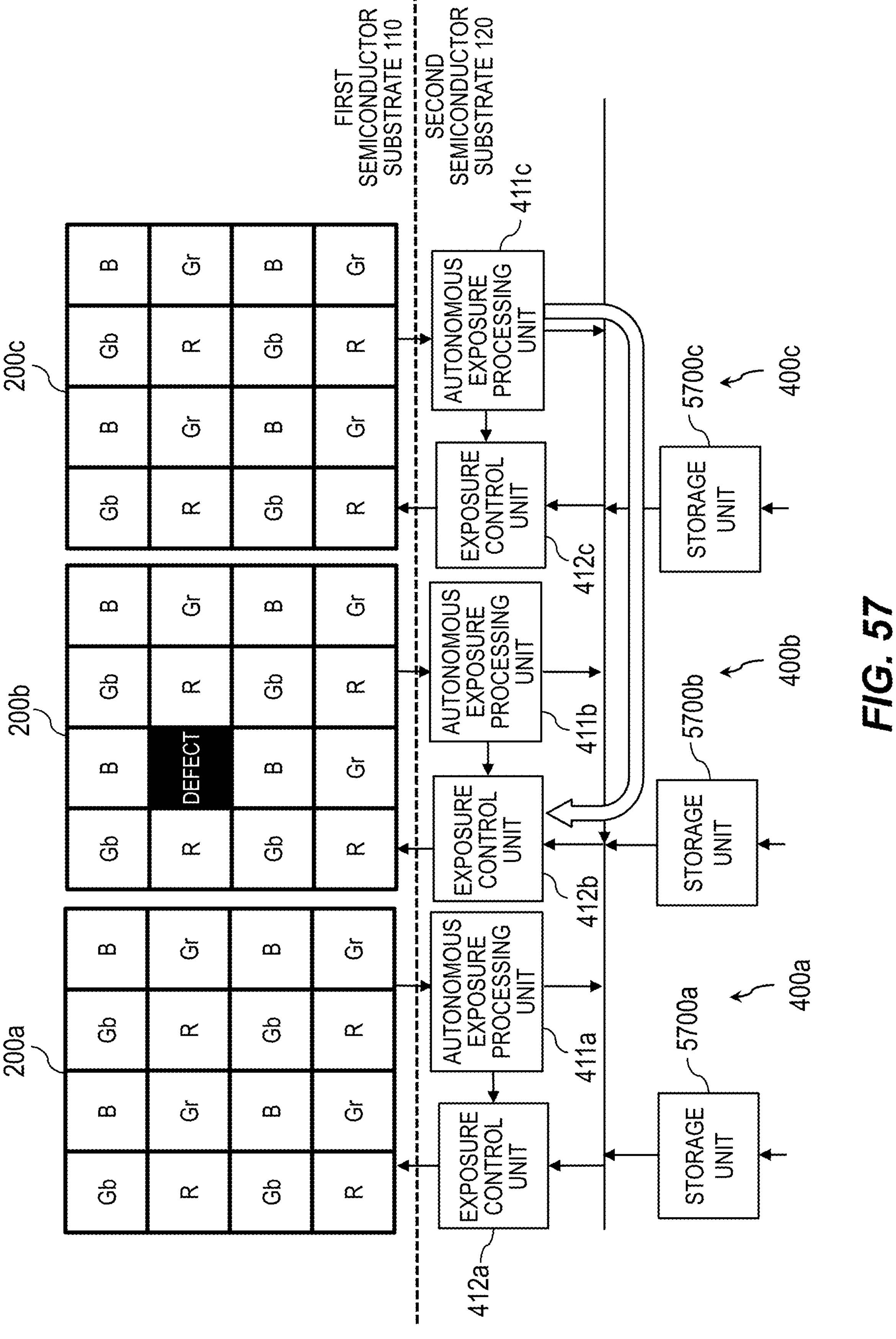
FIG. 57 is a block diagram showing an internal configuration example of the imaging element in the color offset reduction example 4.

FIG. 57 is a block diagram showing an internal configuration example of the imaging element 100 in the color offset reduction example 4. In FIG. 57, the control block 400*a* controls the pixel block 200*a*, the control block 400*b* controls the pixel block 200*b*, and the control block 400*c* controls the pixel block 200*c*. The control blocks 400*a*, 400*b*, and 400*c* are connected to each other in the second semiconductor substrate 120 in a manner enabling communication therebetween.

The control blocks 400*a*, 400*b*, and 400*c* each have the autonomous exposure processing units 411*a*, 411*b*, and 411*c*, the exposure control units 412*a*, 412*b*, and 412*c*, and the storage units 5700*a*, 5700*b*, and 5700*c*.

Here, the pixel blocks 200*a* and 200*c* have an allowable number t or less (t being an integer of 0 or greater) of defective pixels, and in this example, the pixel block 200*b* has a number of defective pixels exceeding the allowable number. The allowable number t is a value set in advance. The storage units 5700*a*, 5700*b*, and 5700*c* store the number of defective pixels in the pixel blocks 200*a*, 200*b*, and 200*c*. The initial value for the number of defective pixels is the value at the time of shipping, and is set respectively for the pixel blocks 200*a*, 200*b*, and 200*c*, but the number of defective pixels can be updated when performing calibration during use.

The pixel block 200*b* includes a number of defective pixels exceeding the allowable number t, and thus, the control block 400*b* does not calculate the exposure values from the digital pixel signals from the pixel block 200*b*, and acquires the exposure values calculated by the control block 400 of the pixel block 200*a* or 200*c* adjacent thereto. The control block 400*b* acquires the exposure value calculated by the control block 400 that controls the pixel block 200 adjacent thereto and with the lower number of defective pixels, for example. In this manner, by using the exposure values of the adjacent pixel blocks 200*a* and 200*c* where the number of defective pixels is less than or equal to the allowable number, it is possible to mitigate color offset in the pixel block 200*b*.

The adjacent pixel blocks 200 are the pixel blocks 200*a* and 200*c* to the left and right of the pixel block 200*b* in FIG. 57, but may include pixel blocks 200 thereabove and therebelow (not shown). Also, the adjacent pixel blocks may be the eight pixel blocks surrounding the pixel block 200*b*.

Also, if all of the adjacent pixel blocks 200 have a number of defective pixels exceeding the allowable number t, the control block 400*b* may acquire the exposure value calculated by the control block 400 that controls the pixel block 200 where the number of defective pixels is less than or equal to the allowable number t and that is closest in distance, among pixel block groups that are two or more pixel blocks away.

<Analysis of Defects in Junction Unit 610 Between Semiconductor Substrates>

Next, analysis of defects in the junction pad between semiconductor substrates will be described. One measure to avoid a decrease in yield from a junction defect in the junction unit 610 between the semiconductor substrates is to provide a plurality of junction units 610 for each signal path passing between the semiconductor substrates. However, it is difficult to detect the junction quality of the individual junction units 610.

In this example, a control switch is provided for each junction unit 610 joining the semiconductor substrates, and confirmation of operations is enabled between switching between the control switches, thereby enabling analysis of defects in the junction units 610 between the semiconductor substrates.

Figure 58:
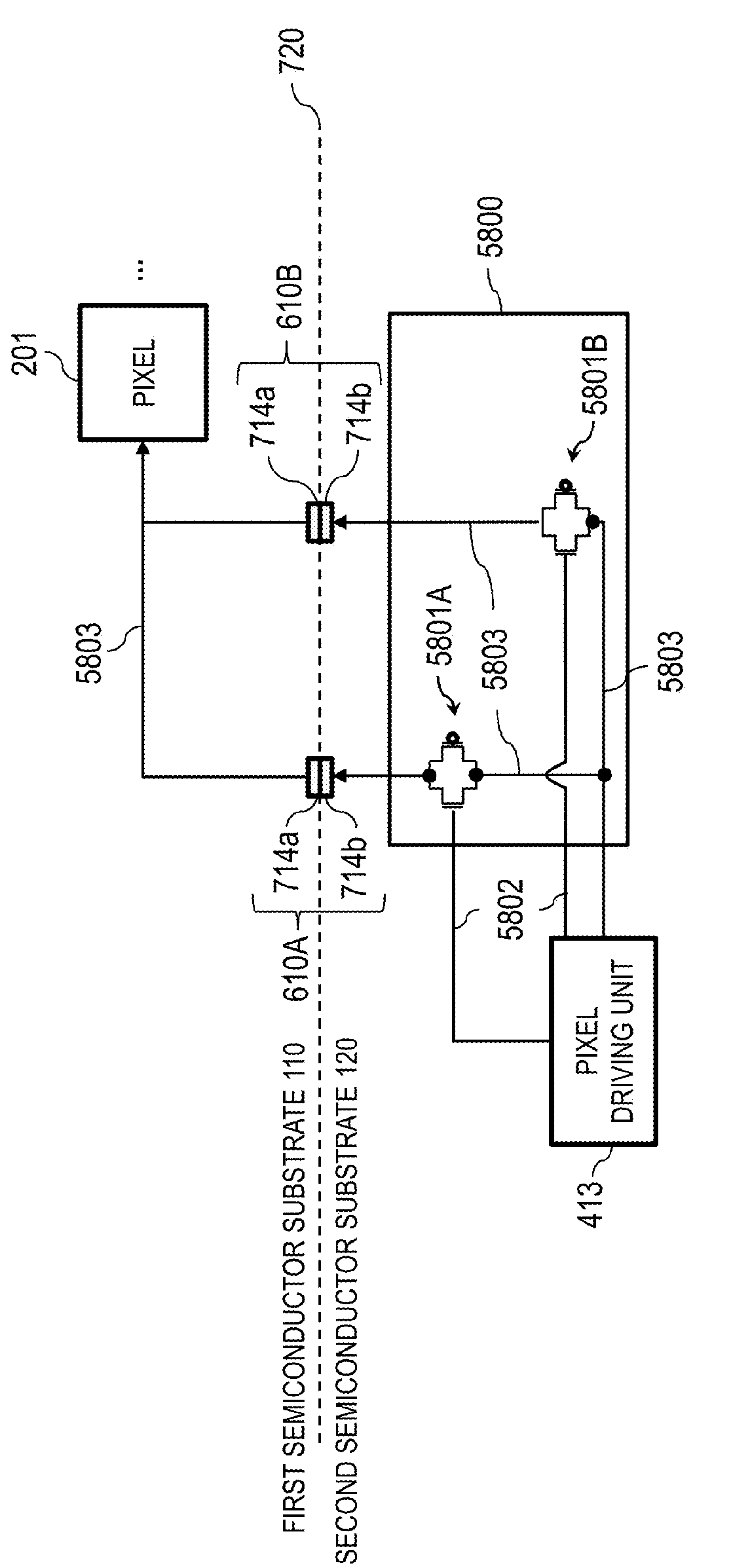
FIG. 58 is a circuit diagram showing a defect analysis example for the junction pads between the semiconductor substrates in the pixel driving signal lines.

Defect Analysis Example for Junction Pads 714 Between Semiconductor Substrates in Pixel Driving Signal Lines FIG. 58 is a circuit diagram showing a defect analysis example for the junction pads 714 between the semiconductor substrates in the pixel driving signal lines. The plurality of pixels 201 in the row direction of the first semiconductor substrate 110 and the pixel driving unit 413 of the second semiconductor substrate 120 are connected to each other by pixel driving signal lines 5803. A plurality of junction units 610A and 610B are provided at the boundary surface 720 between the first semiconductor substrate 110 and the second semiconductor substrate 120.

The junction units 610A and 610B are each constituted of a pair of junction pads 714*a* and 714*b*. The junction pad 714*a* is provided to the first semiconductor substrate 110 and the junction pad 714*b* is provided to the second semiconductor substrate 120. The pixel driving signal lines 5803 have a signal path passing through the junction unit 610A and a signal path passing through the junction unit 610B.

In the second semiconductor substrate 120, a testing circuit 5800 is provided between the two junction pads 714*b* and the pixel driving unit 413. The testing circuit 5800 has two switches 5801A and 5801B. The pixel control signal from the pixel driving unit 413 has a wide amplitude, and thus, the switches 5801A and 5801B are constituted of CMOS switches. Also, the first semiconductor substrate 110 is configured by a process dedicated to only NMOS pixels, and thus, the switches 5801A and 5801B constituted of CMOS switches are provided to the second semiconductor substrate 120.

The switch 5801A is provided between the pixel driving unit 413 and the junction unit 610A, and is connected by the pixel driving signal line 5803. The switch 5801B is provided between the pixel driving unit 413 and the junction unit 610B, and is connected by the pixel driving signal line 5803. The gate terminals of the switches 5801A and 5801B are both connected to the pixel driving unit 413 by switch control lines 5802.

When the control signal from the pixel driving unit 413 is inputted to the gate terminal of the switch 5801A, the pixel driving signal is outputted from the pixel driving unit 413 to the junction unit 610A. When the control signal from the pixel driving unit 413 is inputted to the gate terminal of the switch 5801B, the pixel driving signal is outputted from the pixel driving unit 413 to the junction unit 610B.

During confirmation of operations prior to shipping, a control signal is applied from the pixel driving unit 413 only to the gate terminal of the switch 5801A among the switches 5801A and 5801B, via the switch control line 5802, and it is confirmed whether the pixel driving signal from the pixel driving unit 413 passes through the junction unit 610A and arrives at the plurality of pixels 201 in the row direction. Similarly, a control signal is applied from the pixel driving unit 413 only to the gate terminal of the switch 5801B, via the switch control line 5802, and it is confirmed whether the pixel driving signal from the pixel driving unit 413 passes through the junction unit 610B and arrives at the plurality of pixels 201 in the row direction.

If it is detected that conduction occurs in at least one of the two signal paths passing through the junction units 610A and 610B of the pixel driving signal lines 5803, the junction between the pixel driving unit 413 and the plurality of pixels 201 in the row direction is deemed to be non-defective.

Defect Analysis Example for Junction Pads 714 Between Semiconductor Substrates at Signal Line 202

Figure 59:
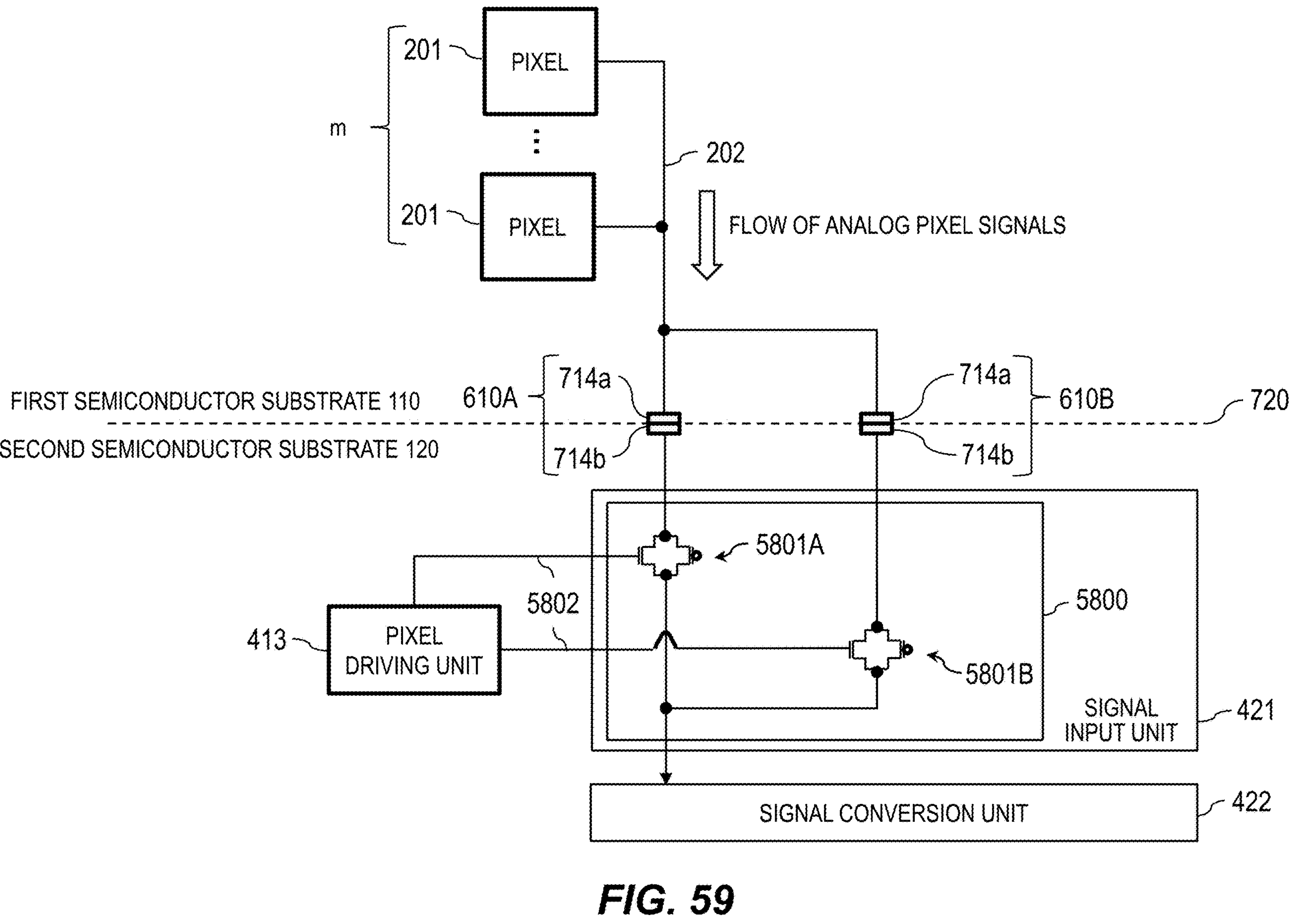
FIG. 59 is a circuit diagram showing a defect analysis example 1 for the junction pads between the semiconductor substrates at the signal line.

FIG. 59 is a circuit diagram showing a defect analysis example 1 for the junction pads 714 between the semiconductor substrates at the signal line 202. The plurality of pixels 201 of the first semiconductor substrate 110 and the pixel driving unit 413 of the second semiconductor substrate 120 are connected to each other by the signal line 202. The signal line 202 is shared among m pixels 201 in the column direction.

Similar to FIG. 58, a plurality of junction units 610A and 610B are provided at the boundary surface 720 between the first semiconductor substrate 110 and the second semiconductor substrate 120. The junction units 610A and 610B are each constituted of a pair of junction pads 714*a* and 714*b*. The junction pad 714*a* is provided to the first semiconductor substrate 110 and the junction pad 714*b* is provided to the second semiconductor substrate 120. The signal line 202 has a signal path passing through the junction unit 610A and a signal path passing through the junction unit 610B.

A test circuit 5800 is provided to the signal input unit 421, for example. In considering the symmetry of the pixel structure and the number of transistors, it is preferable that the testing circuit 5800 be provided on the second semiconductor substrate 120. That is, if the testing circuits 5800 were provided on the first semiconductor substrate 110, the pixel structure layout and number of transistors would differ between pixels 201 closest to the second semiconductor substrate 120 and other pixels 201, among the plurality of pixels 201 in the column direction, which would result in a decrease in production yield.

The switch 5801A is provided between the pixel driving unit 413 and the junction unit 610A, and is connected by the signal line 202. The switch 5801B is provided between the pixel driving unit 413 and the junction unit 610B, and is connected by the signal line 202. The gate terminals of the switches 5801A and 5801B are both connected to the pixel driving unit 413 by switch control lines 5802.

When the control signal from the pixel driving unit 413 is inputted to the gate terminal of the switch 5801A, the switch 5801A outputs the analog pixel signals from the pixels 201 to the signal conversion unit 422 via the junction unit 610A. When the control signal from the pixel driving unit 413 is inputted to the gate terminal of the switch 5801B, the switch 5801B outputs the analog pixel signals from the pixels 201 to the signal conversion unit 422 via the junction unit 610B.

During confirmation of operations prior to shipping, a control signal is applied from the pixel driving unit 413 only to the gate terminal of the switch 5801A among the switches 5801A and 5801B, via the switch control line 5802, and it is confirmed whether the analog pixel signals from the pixels 201 pass through the junction unit 610A and arrives at signal conversion unit 422. Similarly, a control signal is applied from the pixel driving unit 413 only to the gate terminal of the switch 5801B, via the switch control line 5802, and it is confirmed whether the analog pixel signals from the pixels 201 pass through the junction unit 610B and arrive at the signal conversion unit 422.

If it is detected that conduction occurs in at least one of the two signal paths passing through the junction units 610A and 610B of the signal line 202, the junction between the pixels 201 and the signal conversion unit 422 is deemed to be non-defective.

Figure 60:
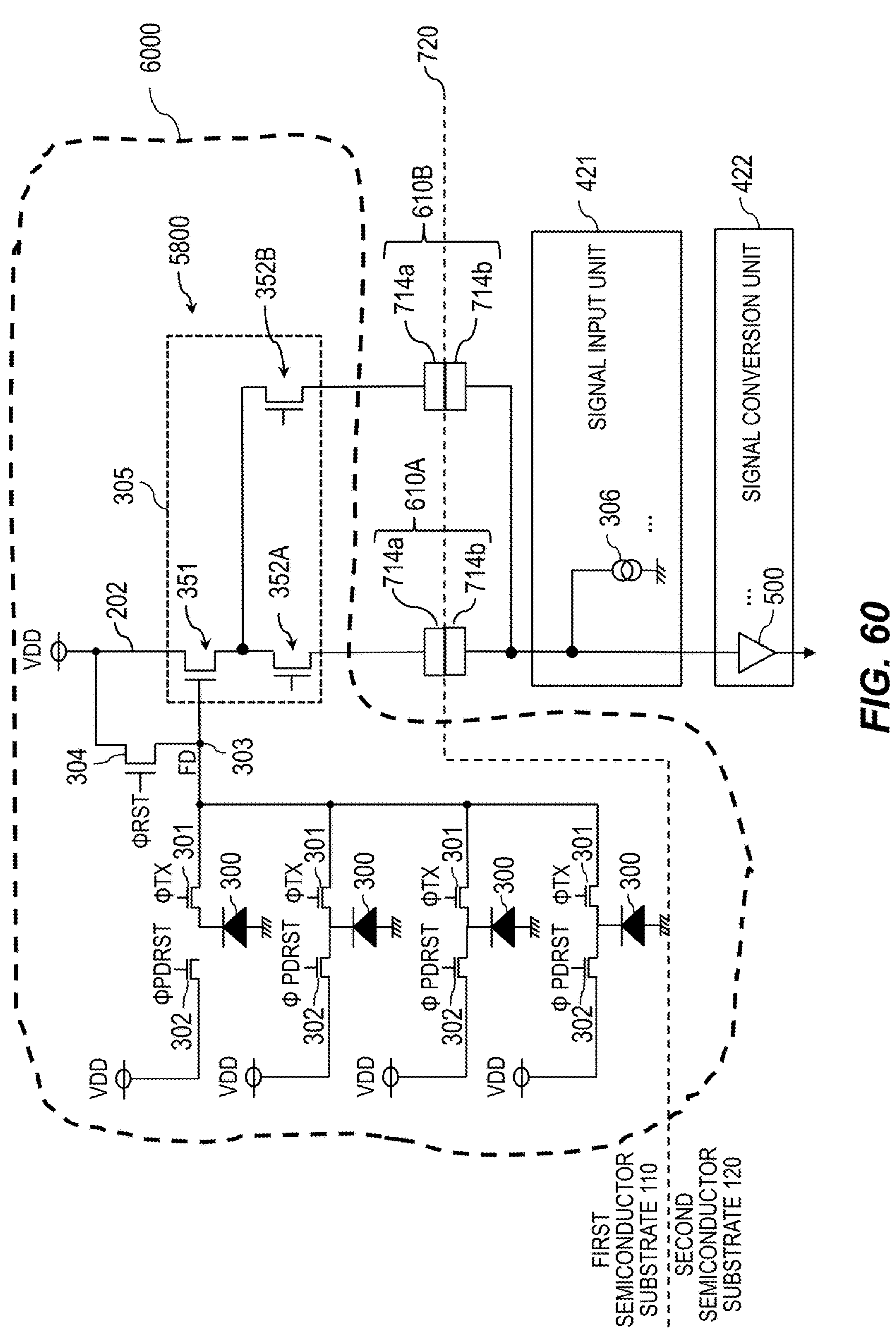
FIG. 60 is a circuit diagram showing a defect analysis example 2-1 for the junction pads 714 between the semiconductor substrates at the signal line.

FIG. 60 is a circuit diagram showing a defect analysis example 2-1 for the junction pads 714 between the semiconductor substrates at the signal line 202. In the defect analysis example 1 of FIG. 59, the testing circuit 5800 was provided to the second semiconductor substrate 120, but in the defect analysis example 2-1 of FIG. 60, the testing circuit 5800 is provided to the first semiconductor substrate 110.

This configuration is useful for a case when the circuit size of the second semiconductor substrate 120 is increased. Specifically, for example, the first semiconductor substrate 110 has a shared FD pixel group 6000. In the shared FD pixel group 6000, the FD 303 and the pixel output unit 305 are shared by a plurality (four in FIG. 60) of photoelectric conversion units 300.

The pixel output unit 305 has the amplification unit 351 and selection units 352A and 352B, and constitutes the testing circuit 5800. The selection units 352A and 352B serve as switches in the testing circuit 5800. The junction unit 610A joins the selection unit 352A to the signal input unit 421. The junction unit 610B joins the selection unit 352B to the signal input unit 421.

When the selection control signal φSEL is inputted to the gate terminal of the selection unit 352A, the selection unit 352A outputs the analog pixel signals from the shared FD pixel group 6000 to the signal conversion unit 422 via the junction unit 610A. When the selection control signal φSEL is inputted to the gate terminal of the selection unit 352B, the selection unit 352B outputs the analog pixel signals from the shared FD pixel group 6000 to the signal conversion unit 422 via the junction unit 610B.

During confirmation of operations prior to shipping, the selection control signal φSEL is applied only to the gate terminal of selection unit 352A among the selection units 352A and 352B, and it is confirmed whether the analog pixel signals from the shared FD pixel group 6000 pass through the junction unit 610A and arrives at signal conversion unit 422. Similarly, the selection control signal φSEL is applied only to the gate terminal of the selection unit 352B, and it is confirmed whether the analog pixel signals from the shared FD pixel group 6000 pass through the junction unit 610B and arrive at the signal conversion unit 422.

If it is detected that conduction occurs in at least one of the two signal paths passing through the junction units 610A and 610B of the signal line 202, the junction between the shared FD pixel group 6000 and the signal conversion unit 422 is deemed to be non-defective.

Figure 61:
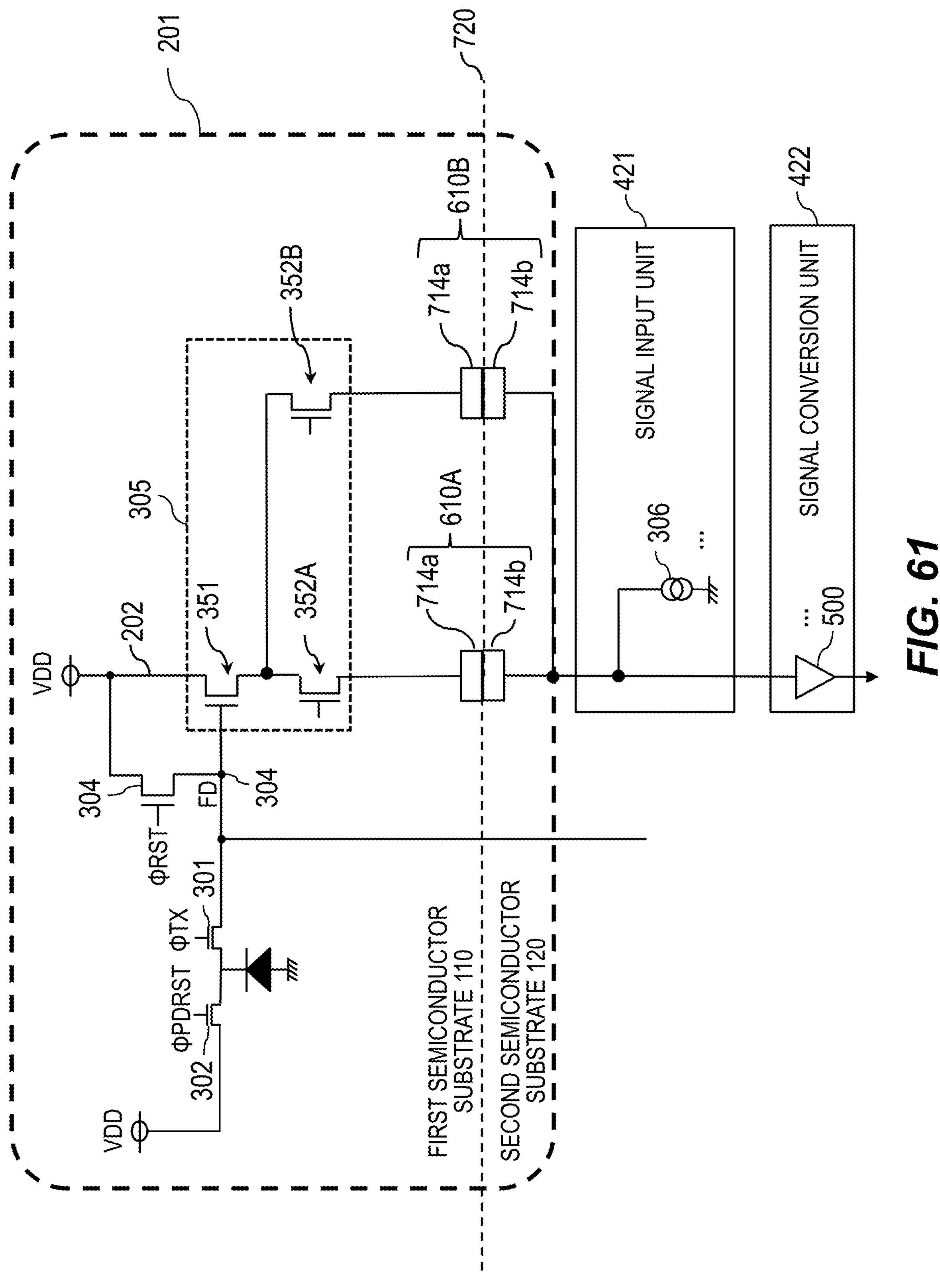
FIG. 61 is a circuit diagram showing a defect analysis example 2-2 for the junction pads 714 between the semiconductor substrates at the signal line.

FIG. 61 is a circuit diagram showing a defect analysis example 2-2 for the junction pads 714 between the semiconductor substrates at the signal line 202. In the defect analysis example 2-1 of FIG. 60, a configuration using the shared FD pixel group 6000 was described, but in the defect analysis example 2-2 of FIG. 61, an ADC 500 is provided for each pixel 201. In this case as well, if it is detected that conduction occurs in at least one of the two signal paths passing through the junction units 610A and 610B of the signal line 202, the junction between the pixels 201 and the signal conversion unit 422 is deemed to be non-defective.

Figure 62:
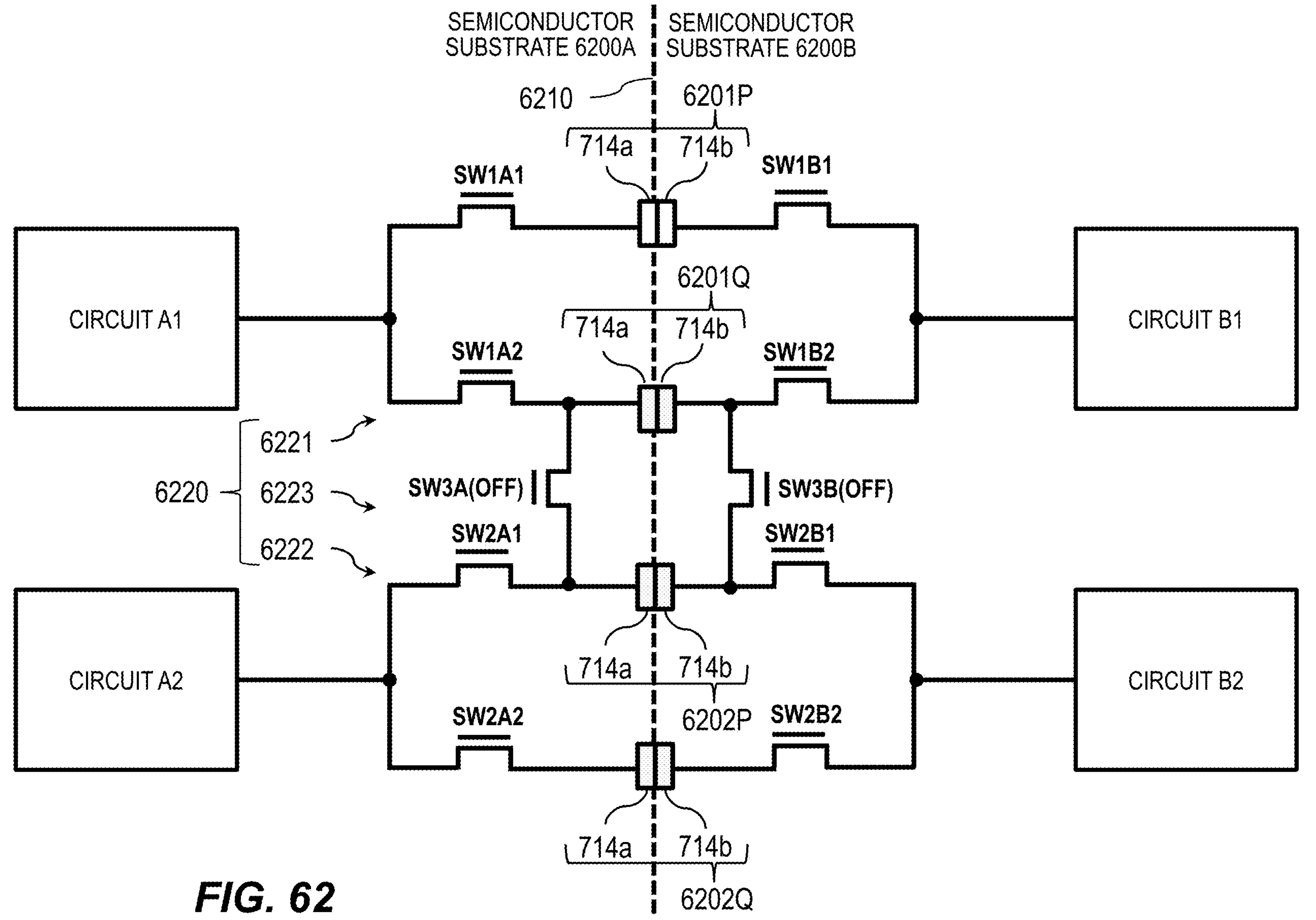
FIG. 62 is a circuit diagram showing a defect analysis example for the junction pads between the semiconductor substrates for when the signal path is shared between a plurality of circuits.

Defect Analysis Example for Junction Pads Between Semiconductor Substrates when Signal Path is Shared Between Plurality of Circuits FIG. 62 is a circuit diagram showing a defect analysis example for the junction pads between the semiconductor substrates for when the signal path is shared between a plurality of circuits. FIG. 62 shows a defect analysis example for the junction pads between semiconductor substrates 6200A and 6200B. If the semiconductor substrate 6200A is the first semiconductor substrate 110, then the semiconductor substrate 6200B is the second semiconductor substrate 120, and if the semiconductor substrate 6200A is the second semiconductor substrate 120, then the semiconductor substrate 6200B is the third semiconductor substrate 130.

The semiconductor substrate 6200A has circuits A1 and A2. If the semiconductor substrate 6200A is the first semiconductor substrate 110, then the circuits A1 and A2 are the pixels 201, for example. If the semiconductor substrate 6200A is the second semiconductor substrate 120, then the circuits A1 and A2 are the ADCs 500, for example.

The semiconductor substrate 6200B has circuits B1 and B2. If the semiconductor substrate 6200B is the first semiconductor substrate 110, then the circuits B1 and B2 are the ADCs 500, for example. If the semiconductor substrate 6200B is the third semiconductor substrate 130, then the circuits B1 and B2 are digital circuits within the data processing unit 103, for example.

Junction units 6201P, 6201Q, 6202P, and 6202Q are provided at the boundary surface 6210 between the first semiconductor substrate 110 and the second semiconductor substrate 120. The junction units 6201P, 6201Q, 6202P, and 6202Q are each constituted of a pair of junction pads 714*a* and 714*b*. The junction pad 714*a* is provided to the semiconductor substrate 6200A and the junction pad 714*b* is provided to the semiconductor substrate 6200B.

Between the semiconductor substrates 6200A and 6200B, which sandwich the boundary surface 6210, a testing circuit 6220 is provided. The testing circuit 6220 has a first testing circuit 6221 that performs defect analysis of the pair of junction pads 714*a* and 714*b* between the circuits A1 and B1, a second testing circuit 6222 that performs defect analysis of the pair of junction pads 714*a* and 714*b* between the circuits A2 and B2, and a connecting line 6223 that connects the first testing circuit 6221 to the second testing circuit 6222.

The first testing circuit 6221 has the following in a parallel connection: switches SW1A1 and SW1B1 connected in series via the junction unit 6201P between the circuits A1 and B1; and switches SW1A2 and SW1B2 connected in series via the junction unit 6201Q between the circuits A1 and B1.

The second testing circuit 6222 has the following in a parallel connection: switches SW2A1 and SW2B1 connected in series via the junction unit 6202P between the circuits A2 and B2; and switches SW2A2 and SW2B2 connected in series via the junction unit 6202Q between the circuits A2 and B2.

The connecting line 6223 connects the switch SW1A2 of the first testing circuit 6221 to the switch SW2A1 of the second testing circuit 6222 on the semiconductor substrate 6200A, and connects the switch SW1B2 of the first testing circuit 6221 to the switch SW2B1 of the second testing circuit 6222 on the semiconductor substrate 6200B.

Figure 63:
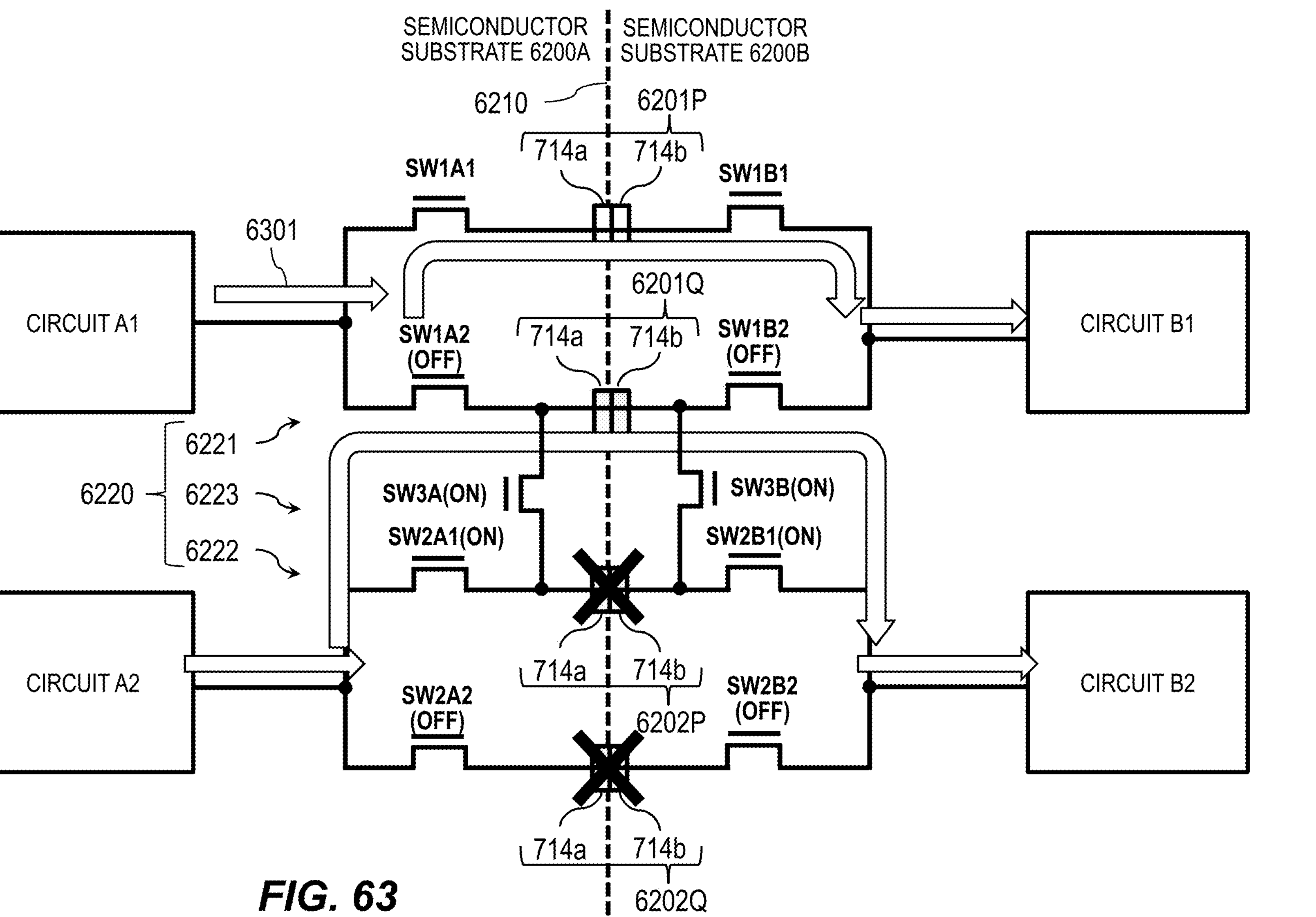
FIG. 63 is a circuit diagram showing a setting example after defect analysis for the junction pads between the semiconductor substrates for when the signal path is shared between a plurality of circuits.

In FIGS. 62 and 63, the path that links the circuit A1, the switch SW1A1, the junction unit 6201P, the switch SW1B1, and the circuit B1 is referred to as a first wiring line. The path that links the circuit A1, the switch SW1A1, the junction unit 6201Q, the switch SW1B1, and the circuit B1 is referred to as a second wiring line. The path that links the circuit A2, the switch SW2A1, the junction unit 6202P, the switch SW2B1, and the circuit B2 is referred to as a third wiring line. The path that links the circuit A2, the switch SW2A2, the junction unit 6202Q, the switch SW2B2, and the circuit B2 is referred to as a fourth wiring line.

In the first testing circuit 6221, the gates of the switches SW1A1 and SW1B1 are set ON and the gates of the switches SW1A2 and SW1B2 are set OFF, thereby executing defect analysis on the junction unit 6201P regarding whether there is conduction on the first wiring line between the circuits A1 and B1.

Similarly, the gates of the switches SW1A2 and SW1B2 are set ON and the gates of the switches SW1A1 and SW1B1 are set OFF, thereby executing defect analysis on the junction unit 6201Q regarding whether there is conduction on the second wiring line between the circuits A1 and B1.

In the second testing circuit 6222, the gates of the switches SW2A1 and SW2B1 are set ON and the gates of the switches SW2A2 and SW2B2 are set OFF, thereby executing defect analysis on the junction unit 6202P regarding whether there is conduction on the third wiring line between the circuits A2 and B2.

Similarly, the gates of the switches SW2A2 and SW2B2 are set ON and the gates of the switches SW2A1 and SW2B1 are set OFF, thereby executing defect analysis on the junction unit 6202Q regarding whether there is conduction on the fourth wiring line between the circuits A2 and B2.

FIG. 63 is a circuit diagram showing a setting example after defect analysis for the junction pads between the semiconductor substrates for when the signal path is shared between a plurality of circuits. If, due to the defect analysis of FIG. 62, a junction defect is detected in the junction units 6202P and 6202Q, for example, then signal transmission between the circuits A2 and B2 cannot be completed on the third wiring line and the fourth wiring line of the second testing circuit 6222. Thus, in the first testing circuit 6221, the switches SW1A1 and SW1B1 are set ON, enabling transmission on the first wiring line 6301 between the circuits A1 and B1.

Also, the first testing circuit 6221 sets OFF the switches SW1A2 and SW1B2, the second testing circuit 6222 sets ON the switches SW2A1 and SW2B1 and sets OFF the switches SW2A2 and SW2B2, and the connecting line 6223 sets ON the switches SW3A and SW3B. As a result, it is possible to transmit signals between the circuits A2 and B2 via a bypass path 6302 that passes through the junction unit 6000 determined not to be defective by the analysis. Thus, by using paths of adjacent circuits, it is possible to avoid conduction defects when the junction pads 714 is defective.

Figure 64:
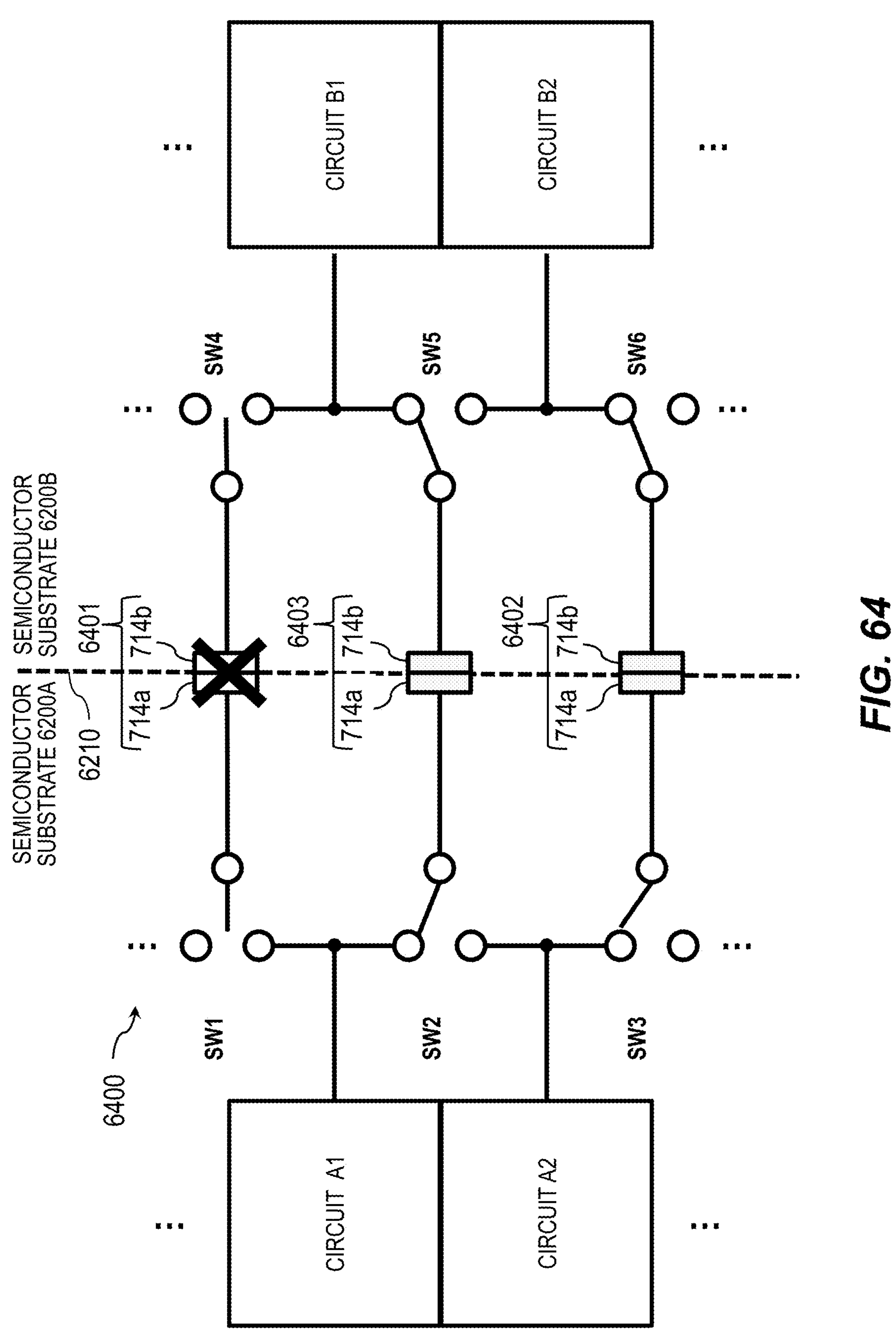
FIG. 64 is a circuit diagram showing a defect analysis example 1 for the junction pads between the semiconductor substrates for when the junction unit is shared between a plurality of circuits.
Figure 65:
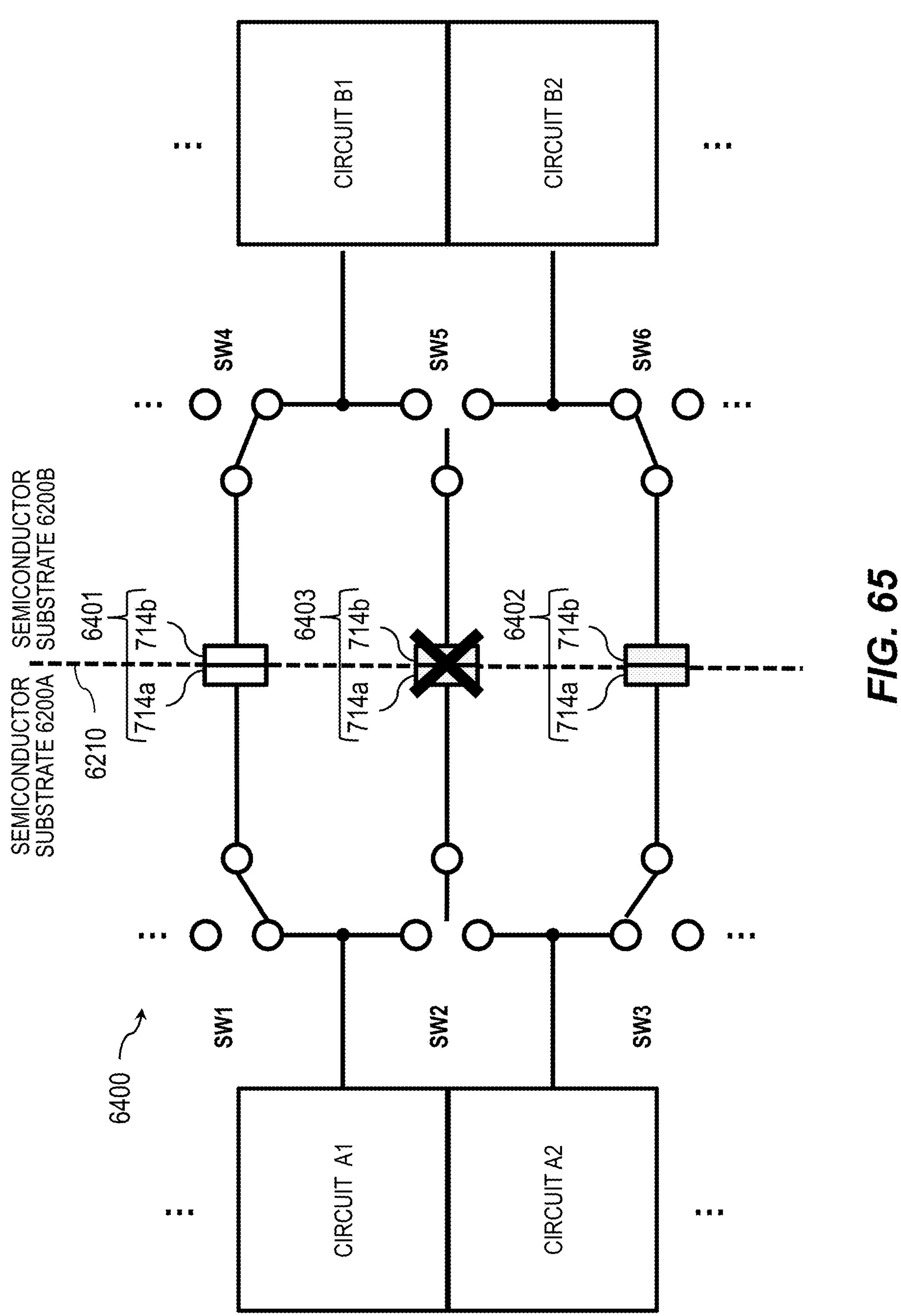
FIG. 65 is a circuit diagram showing a defect analysis example 2 for the junction pads between the semiconductor substrates for when the junction unit is shared between a plurality of circuits.

Defect Analysis Example for Junction Pads Between Semiconductor Substrates when Junction Unit is Shared Between Plurality of Circuits FIG. 64 is a circuit diagram showing a defect analysis example 1 for the junction pads between the semiconductor substrates for when the junction unit is shared between a plurality of circuits, and FIG. 65 is a circuit diagram showing a defect analysis example 2 for the junction pads between the semiconductor substrates for when the junction unit is shared between a plurality of circuits. FIGS. 64 and 65 have the same circuit configuration, but differ in terms of the junction unit where the defect is detected. First, the circuit configuration of FIGS. 64 and 65 will be explained below.

The testing circuit 6400 has switches SW1, SW2, and SW3 of the semiconductor substrate 6200A and switches SW4, SW5, and SW6 of the semiconductor substrate 6200B. The boundary surface 6210 is provided with junction units 6401 to 6403.

The switch SW1 switches between connection between the circuit A1 and the junction pad 714*a* of the junction unit 6401, and connection between another circuit (not shown) and the junction pad 714*a* of the junction unit 6401.

The switch SW2 switches between connection between the circuit A1 and the junction pad 714*a* of the junction unit 6403, and connection between the circuit A2 and the junction pad 714*a* of the junction unit 6403.

The switch SW3 switches between connection between the circuit A2 and the junction pad 714*a* of the junction unit 6402, and connection between another circuit (not shown) and the junction pad 714*a* of the junction unit 6402.

The switch SW4 switches between connection between the circuit B1 and the junction pad 714*a* of the junction unit 6401, and connection between another circuit (not shown) and the junction pad 714*b* of the junction unit 6401.

The switch SW5 switches between connection between the circuit B1 and the junction pad 714*b* of the junction unit 6403, and connection between the circuit B2 and the junction pad 714*b* of the junction unit 6403.

The switch SW6 switches between connection between the circuit B2 and the junction pad 714*b* of the junction unit 6402, and connection between another circuit (not shown) and the junction pad 714*b* of the junction unit 6402.

In FIGS. 64 and 65, the path that links the circuit A1, the switch SW1, the junction unit 6401, the switch SW4, and the circuit B1 is referred to as a first wiring line. The path that links the circuit A2, the switch SW3, the junction unit 6402, the switch SW6, and the circuit B2 is referred to as a second wiring line.

The path that links the circuit A1, the switch SW2, the junction unit 6403, the switch SW5, and the circuit B1 is referred to as a third wiring line. The path that links the circuit A1, the switch SW2, the junction unit 6403, the switch SW5, and the circuit B2 is referred to as a fourth wiring line.

The path that links the circuit A2, the switch SW2, the junction unit 6403, the switch SW5, and the circuit B1 is referred to as a fifth wiring line. The path that links the circuit A2, the switch SW2, the junction unit 6403, the switch SW5, and the circuit B2 is referred to as a sixth wiring line.

In FIG. 64, if the defect analysis by the testing circuit 6400 results in a junction defect in the junction unit 6401 being detected, the switches SW1 and SW4 are disconnected, the switch SW2 connects the circuit A1 to the junction pad 714*a* of the junction unit 6403, and the switch SW5 connects the circuit B1 to the junction pad 714*b* of the junction unit 6403, thereby forming the third wiring line.

Also, the switch SW3 connects the circuit A2 to the junction pad 714*a* of the junction unit 6402, and the switch SW6 connects the circuit B2 to the junction pad 714*b* of the junction unit 6402, thereby forming the second wiring line.

As a result, a signal is transmitted through the third wiring line via the junction unit 6403 between the circuits A1 and B1, and a signal is transmitted through the second wiring line via the junction unit 6402 between the circuits A2 and B2.

In FIG. 65, if the defect analysis by the testing circuit 6400 results in a junction defect in the junction unit 6403 being detected, the switches SW2 and SW5 are disconnected, the switch SW1 connects the circuit A1 to the junction pad 714*a* of the junction unit 6401, and the switch SW4 connects the circuit B1 to the junction pad 714*b* of the junction unit 6401, thereby forming the first wiring line.

Also, the switch SW3 connects the circuit A2 to the junction pad 714*a* of the junction unit 6402, and the switch SW6 connects the circuit B2 to the junction pad 714*b* of the junction unit 6402, thereby forming the second wiring line.

As a result, a signal is transmitted through the first wiring line via the junction unit 6401 between the circuits A1 and B1, and a signal is transmitted through the second wiring line via the junction unit 6403 between the circuits A2 and B2.

In this manner, a junction defect in the junction units 6401 to 6403 between the semiconductor substrates 6200A and 6200B is detected, and junction units that are found not to be defective are used to transmit signals.

Figure 66:
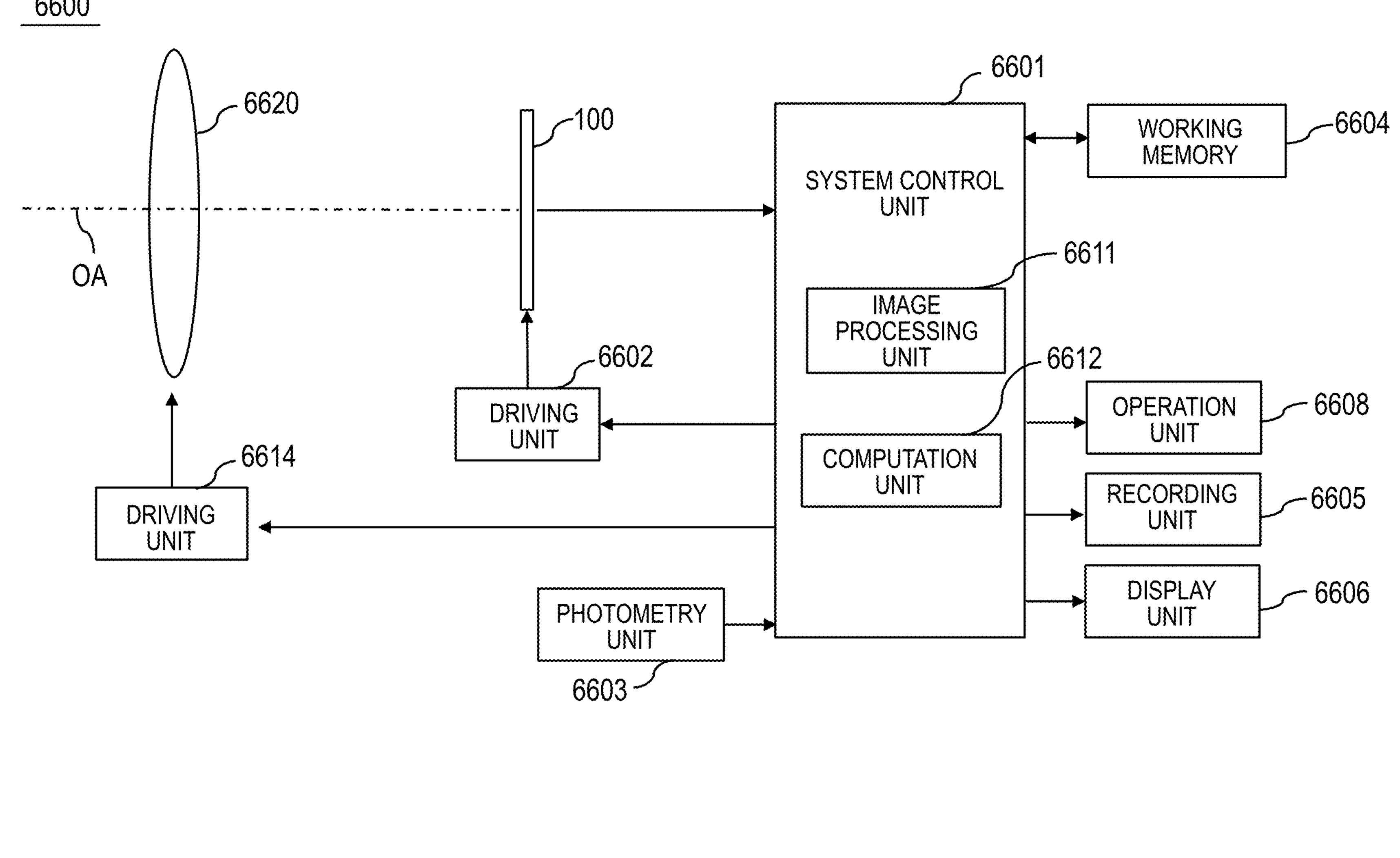
FIG. 66 is a block diagram showing a configuration example of an imaging device 6600 according to an embodiment.

FIG. 66 is a block diagram showing a configuration example of an imaging device 6600 according to an embodiment. The imaging device 6600 includes an imaging element 100, a system control unit 6601, a driving unit 6602, a photometry unit 6603, a working memory 6604, a recording unit 6605, a display unit 6606, an operation unit 6608, a driving unit 6614, and an imaging lens 6620.

The imaging lens 6620 guides a subject light beam entering along an optical axis OA towards the imaging element 100. The imaging lens 6620 is constituted of a plurality of optical lens groups, and causes the subject light beam from the scene to form an image near the focal plane. The imaging lens 6620 may be an interchangeable lens that can be installed to or removed from the imaging device 6600. In FIG. 66, one imaginary lens disposed near a pupil is shown as a representation of the imaging lens 6620.

The driving unit 6614 drives the imaging lens 6620. The driving unit 6614 changes the focal position by moving the optical lens groups of the imaging lens 6620, for example. The driving unit 6614 may drive an iris diaphragm in the imaging lens 6620 to control the quantity of the subject light beam entering the imaging element 100.

The driving unit 6602 has a control circuit that controls the timing of the imaging element 100 and controls the accumulation of electric charge through regional control or the like according to instructions from the system control unit 6601. Also, the operation unit 6608 receives instructions from the photographer/videographer through a shutter release button or the like.

The imaging element 100 delivers the pixel signal to the image processing unit 6611 of the system control unit 6601. The image processing unit 6611 generates image data subjected to various types of image processing, with the working memory 6604 as the workspace. If generating an image data in JPEG file format, for example, after generating a color image signal from a signal acquired as a Bayer array, the color image signal is compressed. The generated image data is recorded in the recording unit 6605, is converted to a display signal, and then is displayed in the display unit 6606 for a preset time.

The photometry unit 6603 detects the luminance distribution of a scene prior to an imaging sequence for generating image data. The photometry unit 6603 includes an AE sensor with approximately 1 million pixels, for example. A computation unit 6612 of the system control unit 6601 calculates the luminance for each region of a scene by receiving the output from the photometry unit 6603.

The computation unit 6612 determines the shutter speed, the aperture, and the ISO speed according to the calculated luminance distribution. The photometry unit 6603 may also be used by the imaging element 100. The computation unit 6612 also executes various computations for operating the imaging device 6600. The driving unit 6602 may be installed partially or entirely in the imaging element 100. A portion of the system control unit 6601 may be installed in the imaging element 100.

The present invention is not limited to the content above, and the content above may be freely combined. Also, other aspects considered to be within the scope of the technical concept of the present invention are included in the scope of the present invention.

DESCRIPTION OF REFERENCE CHARACTERS

100, 100A, 100B imaging element
101 pixel unit
102 control circuit unit
103 data processing unit
110 first semiconductor substrate
120 second semiconductor substrate
121 peripheral circuit unit
130 third semiconductor substrate
200 pixel block
201 pixel
202 signal line
210 pixel group
300 photoelectric conversion unit
301 transfer unit
302 discharge unit
304 reset unit
305 pixel output unit
306 load current source
310 read unit
351 amplification unit
352 selection unit
400, 400A, 400B control block
401 pixel control unit
402 signal transfer unit
411 autonomous exposure processing unit
412 exposure control unit
413 pixel driving unit
421 signal input unit
422 signal processing unit
423 signal output unit

What is claimed is:

1. An imaging element, comprising:

a first semiconductor substrate having a pixel unit the pixel unit including:

a first photoelectric conversion unit configured to convert light to an electric charge;

a second photoelectric conversion unit configured to convert light to an electric charge and disposed alongside the first photoelectric conversion unit in a row direction;

a first transfer unit configured to transfer the electric charge converted by the first photoelectric conversion unit;

a second transfer unit configured to transfer the electric charge converted by the second photoelectric conversion unit;

a first accumulation unit configured to accumulate the electric charge transferred from the first photoelectric conversion unit by the first transfer unit;

a second accumulation unit configured to accumulate the electric charge transferred from the second photoelectric conversion unit by the second transfer unit;

a first output unit including a first selection unit electrically connected to a first signal line, the first output unit being configured to output a first signal based on the electric charge transferred to the first accumulation unit to the first signal line; and a second output unit including a second selection unit electrically connected to a second signal line, the second output unit being configured to output a second signal based on the electric charge transferred to the second accumulation unit to the second signal line; and a second semiconductor substrate stacked with the first semiconductor substrate, the second semiconductor substrate having:

a first exposure processing unit configured to use the first signal to calculate a first evaluation value regarding an accumulation time for accumulating the electric charge converted by the first photoelectric conversion unit;

a second exposure processing unit configured to use the second signal to calculate a second evaluation value regarding an accumulation time for accumulating the electric charge converted by the second photoelectric conversion unit;

a first pixel driving unit configured to output a first transfer control signal for controlling the first transfer unit based on the first evaluation value;

a second pixel driving unit configured to output a second transfer control signal for controlling the second transfer unit based on the second evaluation value; and a driving unit configured to output a selection control signal for controlling the first selection unit and the second selection unit, wherein the first transfer unit is electrically connected to a first transfer control line to which the first transfer control signal is output, wherein the second transfer unit is electrically connected to a second transfer control line to which the second transfer control signal is output, and wherein the first selection unit and the second selection unit are electrically connected to a selection control line to which the selection control signal is output.

2. The imaging element according to claim 1, wherein the first exposure processing unit, the second exposure processing unit, the first pixel driving unit, and the second pixel driving unit are provided in a control circuit unit disposed at a position of the second semiconductor substrate opposing the pixel unit, and wherein the driving unit is disposed outside of the control circuit unit in the second semiconductor substrate.

3. The imaging element according to claim 2, wherein the pixel unit includes a first pixel block, which includes the first photoelectric conversion unit, the first transfer unit, the first accumulation unit, and the first output unit, and a second pixel block, which includes the second photoelectric conversion unit, the second transfer unit, the second accumulation unit, and the second output unit, wherein the control circuit unit includes a first control block, which includes the first exposure processing unit and the first pixel driving unit, and a second control block, which includes the second exposure processing unit and the second pixel driving unit, wherein the first control block is disposed at a position opposing the first pixel block in a stacking direction in which the first semiconductor substrate and the second semiconductor substrate are stacked, and wherein the second control block is disposed at a position opposing the second pixel block in the stacking direction.

4. The imaging element according to claim 3, wherein the first control block includes a first exposure control unit configured to output, to the first pixel driving unit, the first transfer control signal generated based on the first evaluation value, and wherein the second control block includes a second exposure control unit configured to output, to the second pixel driving unit, the second transfer control signal generated based on the second evaluation value.

5. The imaging element according to claim 4, wherein the first exposure control unit includes a first pixel block control unit configured to generate the first transfer control signal, and a first level shift unit configured to adjust a voltage level of the first transfer control signal generated by the first pixel block control unit, and wherein the second exposure control unit includes a second pixel block control unit configured to generate the second transfer control signal, and a second level shift unit configured to adjust a voltage level of the second transfer control signal generated by the second pixel block control unit.

6. The imaging element according to claim 5, wherein the first pixel driving unit is configured to output the first transfer control signal, for which the voltage level was adjusted by the first level shift unit, to the first transfer control line, and wherein the second pixel driving unit is configured to output the second transfer control signal, for which the voltage level was adjusted by the second level shift unit, to the second transfer control line.

7. The imaging element according to claim 3, wherein the first control block includes a first signal processing unit configured to perform signal processing on the first signal, and wherein the second control block includes a second processing unit configured to perform signal processing on the second signal.

8. The imaging element according to claim 7, wherein the first signal processing unit includes a first conversion unit configured to convert the first signal to a digital signal, and wherein the second signal processing unit includes a second conversion unit configured to convert the second signal to a digital signal.

9. The imaging element according to claim 8, wherein the first exposure processing unit is configured to calculate the first evaluation value using upper bits of a first digital signal converted from the first signal by the first conversion unit, and wherein the second exposure processing unit is configured to calculate the second evaluation value using upper bits of a second digital signal converted from the second signal by the second conversion unit.

10. The imaging element according to claim 3, wherein the second semiconductor substrate includes a first signal processing unit configured to perform signal processing on the first signal, and a second signal processing unit configured to perform signal processing on the second signal.

11. The imaging element according to claim 10, wherein the first signal processing unit includes a first conversion unit configured to convert the first signal to a digital signal, and wherein the second signal processing unit includes a second conversion unit configured to convert the second signal to a digital signal.

12. The imaging element according to claim 11, wherein the first exposure processing unit is configured to calculate the first evaluation value using upper bits of a first digital signal converted from the first signal by the first conversion unit, and wherein the second exposure processing unit is configured to calculate the second evaluation value using upper bits of a second digital signal converted from the second signal by the second conversion unit.

13. The imaging element according to claim 1, wherein the pixel unit includes a first discharge unit configured to discharge the electric charge of the first photoelectric conversion unit, and a second discharge unit configured to discharge the electric charge of the second photoelectric conversion unit, wherein the first pixel driving unit is configured to output a first discharge control signal for controlling the first discharge unit based on the first evaluation value, and wherein the second pixel driving unit is configured to output a second discharge control signal for controlling the second discharge unit based on the second evaluation value.

14. The imaging element according to claim 13, wherein the first discharge unit is electrically connected to a first discharge control line to which the first discharge control signal is output, and wherein the second discharge unit is electrically connected to a second discharge control line to which the second discharge control signal is output.

15. The imaging element according to claim 13, wherein the pixel unit includes a first reset unit configured to reset a potential of the first accumulation unit, and a second reset unit configured to reset a potential of the second accumulation unit, and wherein the driving unit is configured to output a reset control signal for controlling the first reset unit and the second reset unit.

16. The imaging element according to claim 15, wherein the first reset unit and the second reset unit are electrically connected to a reset control line to which the reset control signal is output.

17. The imaging element according to claim 1, wherein the pixel unit includes a first reset unit configured to reset a potential of the first accumulation unit, and a second reset unit configured to reset a potential of the second accumulation unit, and wherein the driving unit is configured to output a reset control signal for controlling the first reset unit and the second reset unit.

18. The imaging element according to claim 17, wherein the first reset unit and the second reset unit are electrically connected to a reset control line to which the reset control signal is output.

19. An imaging device, comprising:

the imaging element according to claim 1.

20. The imaging device according to claim 19, further comprising a lens driving unit configured to drive a lens unit that emits light to the imaging element.

21. The imaging device according to claim 20, further comprising the lens unit.

* * * * *